United States Patent
Lee et al.

(10) Patent No.: US 9,681,438 B2
(45) Date of Patent: *Jun. 13, 2017

(54) METHOD AND DEVICE FOR INFORMATION TRANSMISSION IN WIRELESS COMMUNICATION SYSTEM

(71) Applicant: LG Electronics Inc., Seoul (KR)

(72) Inventors: Hyunwoo Lee, Anyang-si (KR);
Seunghee Han, Anyang-si (KR);
Jinmin Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 2 days.

This patent is subject to a terminal disclaimer.

(21) Appl. No.: 14/995,783

(22) Filed: Jan. 14, 2016

(65) Prior Publication Data
US 2016/0135156 A1 May 12, 2016

Related U.S. Application Data

(63) Continuation of application No. 14/124,640, filed as application No. PCT/KR2012/004305 on May 31, 2012, now Pat. No. 9,271,265.

(Continued)

(51) Int. Cl.
*H04L 27/26* (2006.01)
*H04L 5/00* (2006.01)
*H04W 72/04* (2009.01)

(52) U.S. Cl.
CPC ......... *H04W 72/044* (2013.01); *H04L 5/0094* (2013.01); *H04L 27/2636* (2013.01);
(Continued)

(58) Field of Classification Search
CPC ... H04L 5/0055; H04L 5/0051; H04L 5/0094; H04L 5/0007; H04L 72/0046;
(Continued)

(56) References Cited

U.S. PATENT DOCUMENTS 8,520,619 B2 * 8/2013 Hong et al. .................. 370/329
8,942,192 B2 * 1/2015 Damnjanovic et al. ...... 370/329

FOREIGN PATENT DOCUMENTS

CN 101578837 A 11/2009
CN 101843153 A 9/2010
(Continued)

OTHER PUBLICATIONS

Research in Motion, et al.: "PDCCH Interference Management for Heterogeneous Network", 3GPP TSG RAN VG1 Meeting #60, R1-101106, San Francisco, USA, Feb. 16, 2010, paragraph 0003.

(Continued)

*Primary Examiner* — Ayaz Sheikh
*Assistant Examiner* — Debebe Asefa
(74) *Attorney, Agent, or Firm* — Dentons US LLP

(57) ABSTRACT

The present invention relates to a wireless communication system and more specifically relates to a method and device for transmitting information. A wireless communication system can support carrier aggregation (CA). In one aspect of the present invention, a method, in which a terminal receives information from a base station in a wireless communication, comprises the steps of: receiving, from the base station, first information on the transmission method of a first channel; receiving the receiving the first channel, from the base station, via at least one serving cell formed in the terminal; and carrying out decoding on the first channel in accordance with the first information. Therein, the first channel is an enhanced physical downlink control channel (ePDCCH), and the terminal is capable of not carrying out decoding on the first channel in a frequency region in a present subframe.

17 Claims, 48 Drawing Sheets

Related U.S. Application Data

(60) Provisional application No. 61/494,422, filed on Jun. 8, 2011.

(52) U.S. Cl.
CPC ......... *H04W 72/04* (2013.01); *H04W 72/042* (2013.01); *H04L 5/001* (2013.01); *H04L 5/0053* (2013.01)

(58) Field of Classification Search
CPC ....... H04L 72/0042; H04L 2025/03426; H04L 2025/03343
See application file for complete search history.

(56) References Cited

FOREIGN PATENT DOCUMENTS

| CN | 102026393 A | 4/2011 |
|---|---|---|
| KR | 10-2010-0081360 | 7/2010 |
| KR | 10-2010-0096035 | 9/2010 |
| KR | 10-2010-0106504 | 10/2010 |
| WO | 2010/140825 | 12/2010 |

OTHER PUBLICATIONS

Niortel Networks: "Support of Wider Bandwith for LTE-Advanced", 3GPP Draft TSG-RAN1 #55, R1-084474, XP-050317728, Prague, Czech republic, Nov. 5, 2008, pp. 4, 6-8.

Samsung: "PDCCH Extension to Support Operation with Cross-Carrier Scheduling", 3GPP TSG RAN WG1 #60, R1-101142, San Francisco, USA, Feb. 16, 2010.

"LTE; Evolved Universal Terrestrial Radio Access (E-UTRA); Physical layer procedures (3GPP TS 36.213 version 10.1.0 Release 10)", ETSI TS 136.213 V.10.1.0, XP014065360, Apr. 1, 2011, pp. 24-25.

\* cited by examiner

FIG. 5
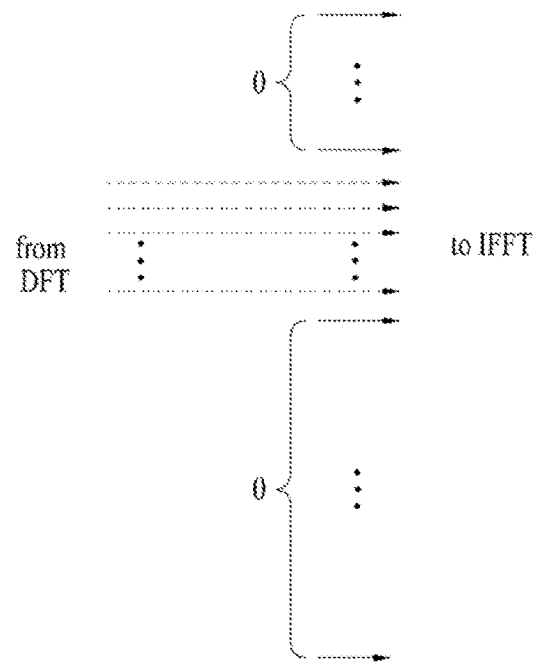
(a)
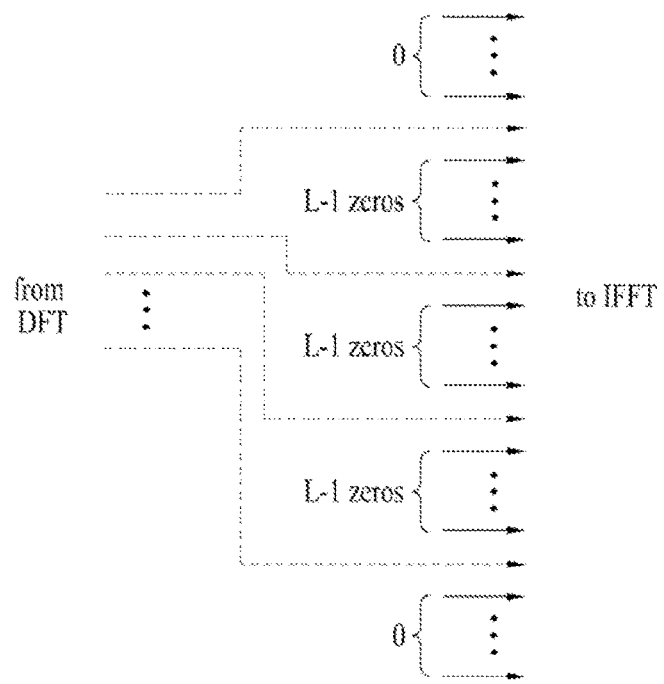
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | $n = 0$ | | 12 | $n = 0$ | | 12 |
| 2 | 1 | | 6 | 13 | | 6 | 13 |
| 3 | 2 | 1 | 7 | 14 | 1 | 7 | 14 |
| 4 | 3 | 2 | 8 | 15 | 2 | 8 | 15 |
| 5 | 4 | 3 | 9 | 16 | 3 | 9 | 16 |
| 6 | 5 | 4 | 10 | 17 | 4 | 10 | 17 |
| 7 | 6 | 5 | 11 | | 5 | 11 | |
| 8 | 7 | | | | | | |
| 9 | 8 | | | | | | |
| 10 | 9 | | | | | | |
| 11 | 10 | | | | | | |
| 0 | 11 | | | | | | |

Cell-specific Cyclic shift value of CAZAC sequence $\Delta_{shift}^{PUCCH} = \{1,2,3\}$ for normal cyclic prefix
$\{1,2,3\}$ for extended cyclic prefix $\delta_{offset}^{PUCCH} = \{0,1,...,\Delta_{shift}^{PUCCH} - 1\}$ Cell specific cyclic shift offset $n_{OC}$  Orthogonal sequence index for ACK/NACK
$\bar{n}_{OC}$  Orthogonal sequence index for RS
$n_{CS}$  Cyclic shift value of a CAZAC sequence
$n'$  ACK/NACK resource index used for the channelization in a RB

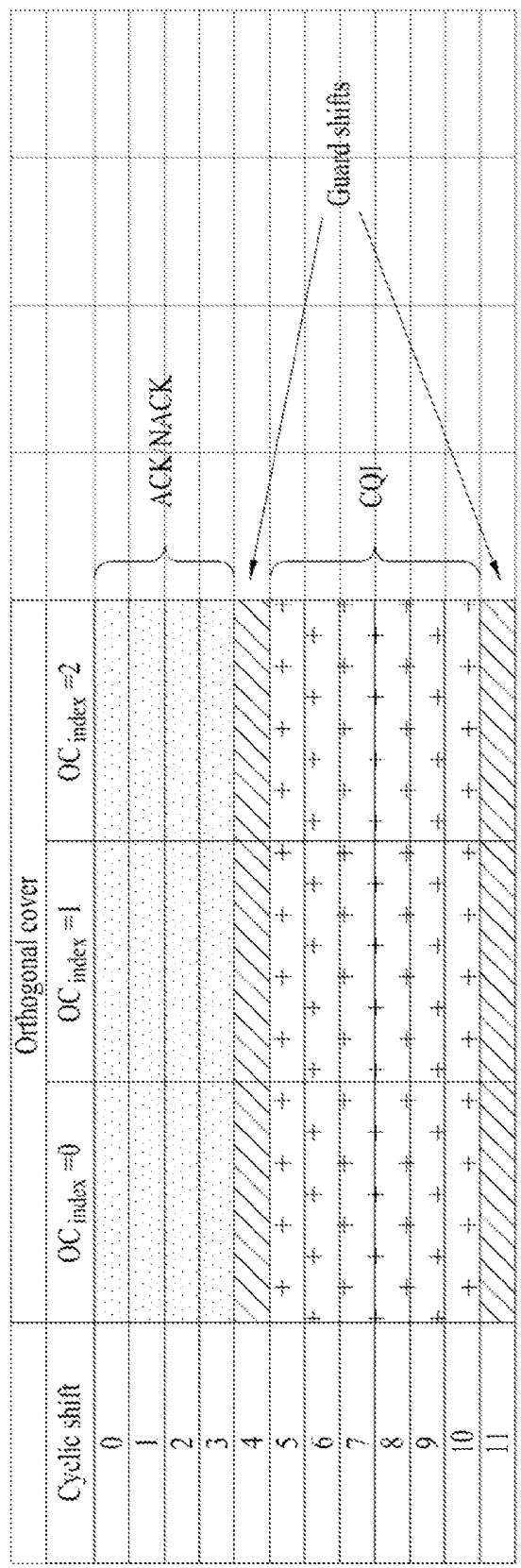

FIG. 33
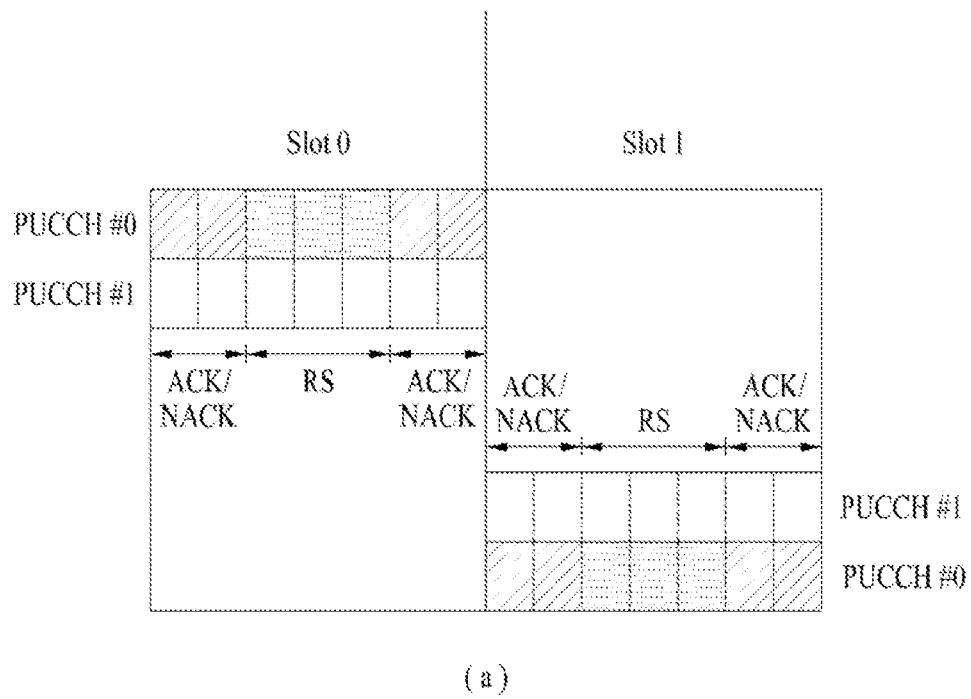
(a)
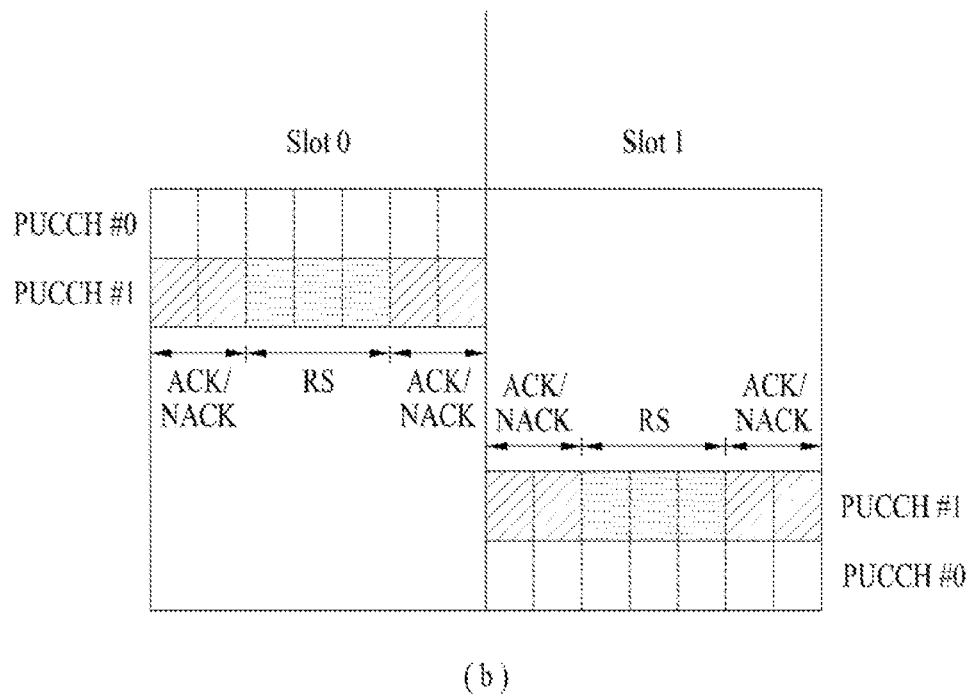
(b)

FIG. 34
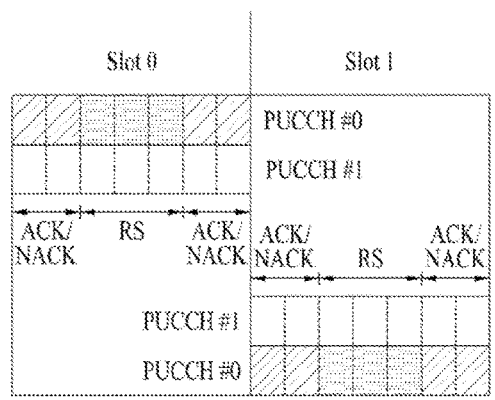
(a)
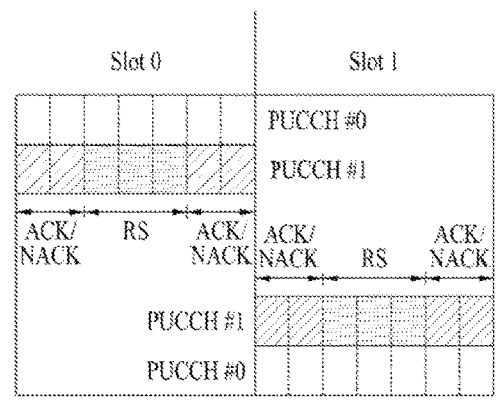
(a)
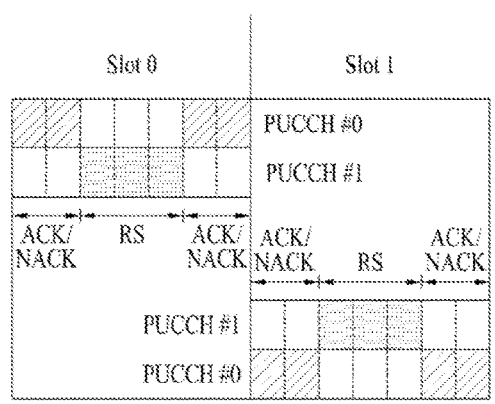
(c)
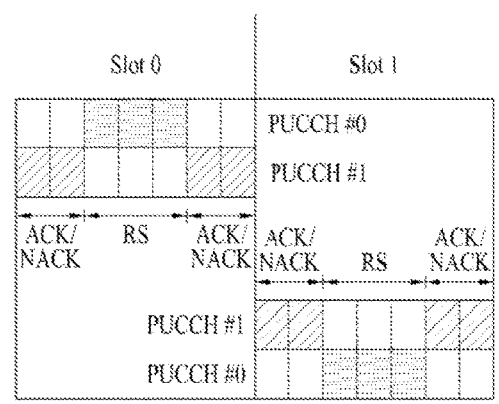
(d)

METHOD AND DEVICE FOR
INFORMATION TRANSMISSION IN
WIRELESS COMMUNICATION SYSTEM

This application is a Continuation of U.S. application Ser. No. 14/124,640 filed Dec. 6, 2013, which is a National Stage under 35 U.S.C. 371 of International Application No. PCT/KR2012/004305 filed May 31, 2012, which claims the benefit of U.S. Provisional Application No. 61/494,422 filed Jun. 8, 2011, all of which are hereby incorporated by reference in their entirety.

TECHNICAL FIELD

The present invention relates to a wireless communication system, and more particularly, to a method and device for transmitting information. The wireless communication system supports carrier aggregation (CA).

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for efficiently transmitting information in a wireless communication system and a device for the same. Another object of the present invention is to provide a channel format and signal processing scheme for efficiently transmitting information and a device for the same. A further object of the present invention is to provide a method for efficiently allocating resources for transmitting information and a device for the same.

The technical problems solved by the present invention are not limited to the above technical problems and those skilled in the art may understand other technical problems from the following description.

Technical Solution

The object of the present invention can be achieved by providing a method for a user equipment (UE) to receive information from a base station (BS) in a wireless communication system, the method including: receiving, from the BS, first information on a transmission method of a first channel; receiving the first channel from the BS via at least one serving cell configured to the UE; and decoding the first channel in accordance with the first information, wherein the first channel is an enhanced physical downlink control channel (ePDCCH), and wherein the UE does not perform decoding the first channel in a frequency region in a preset subframe.

In another aspect of the present invention, provided herein is a UE for receiving information from a BS in a wireless communication system, including: a reception module for receiving, from the BS, first information on a transmission method of a first channel and receiving the first channel from the BS via at least one serving cell configured to the UE; and a processor for decoding the first channel in accordance with the first information, wherein the first channel is an ePDCCH, and wherein the processor does not perform decoding the first channel in a frequency region in a preset subframe.

Advantageous Effects

According to the present invention, it is possible to efficiently transmit information in a wireless communication system. In addition, it is possible to provide a channel format and signal processing scheme for efficiently transmitting information. Furthermore, it is possible to efficiently allocate resources for transmitting information and a device for the same. The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates examples of mapping input symbols to subcarriers in the frequency domain while satisfying single carrier property;

FIG. 17 illustrates ACK/NACK channelization for PUCCH formats 1a and 1b;

FIG. 18 illustrates channelization for a hybrid structure of PUCCH format 1/1a/1b and PUCCH format 2/2a/2b in the same PRB;

FIG. 33 illustrates ACK/NACK information transmission structures using channel selection to which the present invention is applied;

FIG. 34 illustrates ACK/NACK information transmission structures using enhanced channel selection to which the present invention is applied;

BEST MODE

Figure 1:
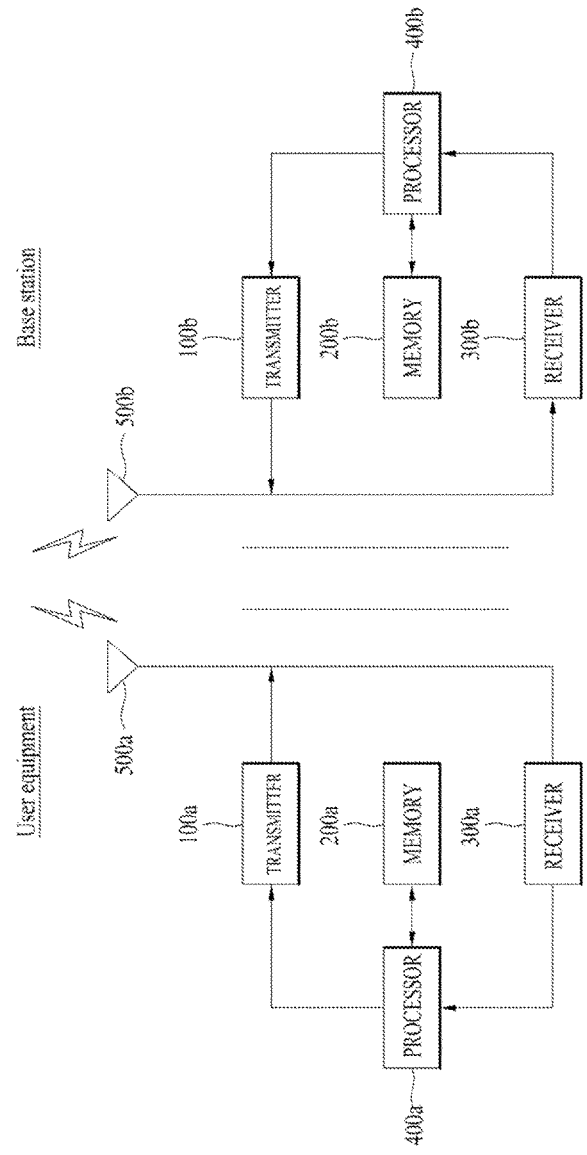
FIG. 1 illustrates configurations of user equipment (UE) and a base station (BS) to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is evolved from 3GPP LTE. For clarity, the following description focuses on 3GPP LTE/LTE-A. However, technical features of the present invention are not limited thereto. For example, even if the following description is made based on a wireless communication system corresponding to 3GPP LTE/LTT-A, the present invention is applicable to other wireless communication systems except for specific features of 3GPP LTE/LTE-A.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention a terminal refers to a device that can be fixed or mobile and communicates with a base station to transmit/receive various types of data and control information. The term "terminal" may be used interchangeably with terms "user equipment (UE)", "mobile station (MS)", "mobile terminal (MT)", "user terminal (UT)", "subscriber station (SS)", "wireless device", "personal digital assistant (PDA)", "wireless modem", "handheld device", etc.

A base station refers to a fixed station communicating with UEs or other base stations and communicates with UEs and other base stations to exchange various types of data and information with the same. The base station may be referred to as evolved-nodeB (eNB), base transceiver system (BTS), access point (AP), etc.

In the present invention, allocation of a specific signal to a frame/subframe/slot/carrier/subcarrier refers to transmission of the specific signal through the corresponding carrier/subcarrier for the duration or at the timing of the corresponding frame/subframe/slot.

In the present invention, a rank or a transport rank refers to the number of layers multiplexed or allocated to a single OFDM symbol or a single resource element.

In the present invention, PDCCH (physical downlink control channel)/PCFICH (physical control format indicator channel)/PHICH (physical hybrid automatic retransmit request indicator channel)/PDSCH (physical downlink shared channel) respectively refer to sets of resource elements carrying DCI (downlink control information)/CFI (control format indicator)/ACK/NACK (acknowledgement/negative ACK)/downlink data for uplink transmission.

In addition, PUCCH (physical uplink control channel)/PUSCH (physical uplink shared channel)/PRACH (physical random access channel) respectively refer to sets of resource elements carrying UCI (uplink control information)/uplink data/random access signal.

In particular, resource elements (REs) allocated or belonging to PDCCH/PCFICH/PHICH/PDSCH/PUCCH/PUSCH/PRACH are referred to as PDCCH/PCFICH/PHICH/PDSCH/PUCCH/PUSCH/PRACH REs or PDCCH/PCFICH/PHICH/PDSCH/PUCCH/PUSCH/PRACH resources.

Accordingly, transmission of PUCCH/PUSCH/PRACH by a UE corresponds to transmission of UCI/uplink data/random access signal on PUSCH/PUCCH/PRACH. In addition, transmission of PDCCH/PCFICH/PHICH/PDSCH by a BS corresponds to transmission of DCI/downlink data on PDCCH/PCFICH/PHICH/PDSCH.

Mapping of ACK/NACK information to a specific constellation point corresponds to mapping of the ACK/NACK information to a specific complex modulation symbol. In addition, mapping of ACK/NACK information to a specific complex modulation symbol corresponds to modulation of the ACK/NACK information into the specific complex modulation symbol.

FIG. 1 illustrates configurations of a UE and a BS to which the present invention is applicable. The UE serves as a transmitter on uplink and operates as a receiver on downlink. The BS operates as a receiver on uplink and functions as a transmitter on downlink.

Referring to FIG. 1, the UE and the BS respectively include antennas $500a$ and $500b$ for receiving information, data, signals or messages, transmitters $100a$ and $100b$ for transmitting information, data, signals or messages by controlling the antennas, receivers $300a$ and $300b$ for receiving information, data, signals or messages by controlling the antennas, and memories $200a$ and $200b$ temporarily or permanently storing information regarding the wireless communication system. In addition, the UE and the BS respectively include processors $400a$ and $400b$ connected to components such as the transmitters, receivers and memories and configured to control the components.

The transmitter $100a$, the receiver $300a$, the memory $200a$ and processor $400a$ included in the UE may be implemented as independent components by respective chips or two or more thereof may be implemented as a single chip. The transmitter $100b$, the receiver $300b$, the memory $200b$ and processor $400b$ included in the BS may be implemented as independent components by respective chips or two or more thereof may be implemented as a single chip. The transmitter and receiver may be integrated into a transceiver in the UE or BS.

The antennas $500a$ and $500b$ transmit signals generated in the transmitters $100a$ and $100b$ to the outside or receive external signals and deliver the received signals to the receivers $300a$ and $300b$. The antennas $500a$ and $500b$ are also called antenna ports. An antenna port may correspond to a physical antenna or a combination of a plurality of physical antennas. A transceiver supporting MIMO (multiple input multiple output) for transmitting/receiving data using multiple antennas may be connected to two or more antennas.

The processors $400a$ and $400b$ control the overall operation of components or modules included in the UE or BS. Particularly, the processors $400a$ and $400b$ may execute various control functions for performing the present invention, a MAC (medium access control) frame variation control function according to service characteristics and propagation environment, a power saving mode function for controlling idle operation, a handover function, authentication and encoding functions, etc. The processors $400a$ and $400b$ may be called controllers, microcontrollers, microprocessors or microcomputers. The processors $400a$ and $400b$ may be implemented by hardware, firmware, software or a combination thereof.

In hardware implementation, ASICs (application specific integrated circuits), DSPs (digital signal processors), DSPDs (digital signal processing devices), PLDs (programmable logic devices), FPGAs (field programmable gate arrays), etc. configured to implement the present invention may be included in the processors $400a$ and $400b$.

In a firmware or software configuration, the embodiments of the present invention may be implemented in the form of a module, a procedure, a function, etc. Firmware or software configured to implement the present invention may be included in the processors $400a$ and $400b$ or stored in the memories $200a$ and $200b$ and executed by the processors $400a$ and $400b$.

The transmitters $100a$ and $100b$ perform predetermined coding and modulation on a signal or data, which is scheduled by the processors $400a$ and $400b$ or a scheduler connected to the processors and transmitted to the outside, and transmit the modulated signal or data to the antennas $500a$ and $500b$. The transmitters $100a$ and $100b$ and the receivers 300a and 300b of the UE and BS may be configured in a different manner according to a procedure of processing a transmitted signal and a received signal.

The memories 200a and 200b may store programs for processing and control of the processors 400a and 400b and temporarily store input/output information. Furthermore, the memories 200a and 200b may be used as buffers. The memories may be implemented using flash memory, a hard disc, a multimedia card micro type or card type memory (e.g. SD or XD memory), a random access memory (RAM), a static RAM (SRAM), a read-only memory (ROM), an electrically erasable programmable read-only memory (EEPROM), a programmable ROM (PROM), a magnetic memory, a magnetic disc, an optical disc, etc.

Figure 2:
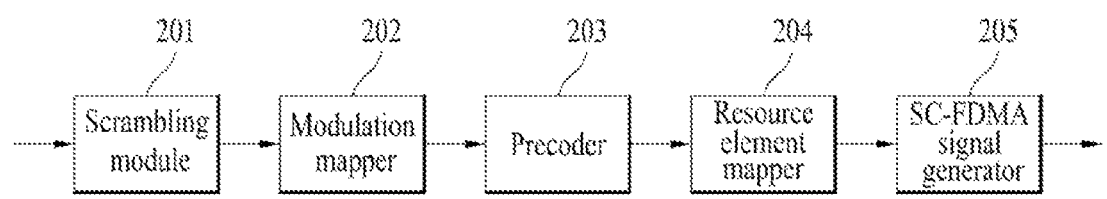
FIG. 2 illustrates a signal processing procedure through which a UE transmits an uplink signal.

FIG. 2 illustrates a signal processing procedure through which a UE transmits an uplink signal. Referring to FIG. 2, the transmitter 100a included in the UE may include a scrambling module 201, a modulation mapper 202, a precoder 203, a resource element mapper 204 and an SC-FDMA signal generator 205.

To transmit the uplink signal, the scrambling module 201 of the UE may scramble the uplink signal using a scramble signal. The scrambled signal is input to the modulation mapper 202 in which the scrambled signal is modulated into complex symbols using binary phase shift keying (BPSK), quadrature phase shift keying (QPSK) or 16-quadrature amplitude modulation (QAM)/64-QAM according to signal type and/or channel status. The modulated complex symbols are processed by the precoder 203, and then applied to the resource element mapper 204. The resource element mapper 204 may map the complex symbols to time-frequency resource elements. The signal processed in this manner may be subjected to the SC-FDMA signal generator 205 and transmitted to a BS through an antenna.

Figure 3:
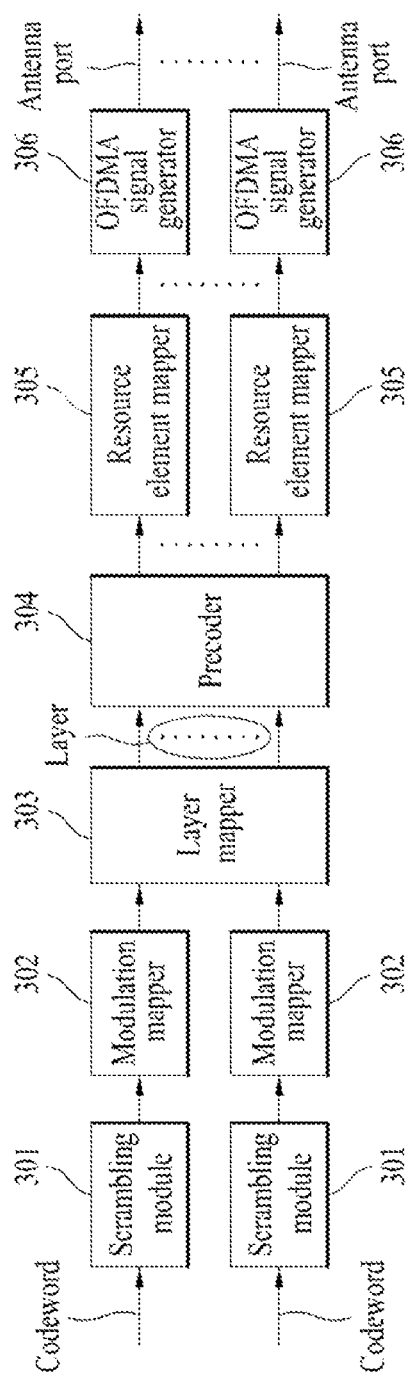
FIG. 3 illustrates a signal processing procedure through which a BS transmits a downlink signal.

FIG. 3 illustrates a signal processing procedure through which the BS transmits a downlink signal. Referring to FIG. 3, the transmitter 100b included in the BS may include a scrambling module 301, a modulation mapper 302, a layer mapper 303, a precoder 304, a resource element mapper 305 and an OFDMA signal generator 306.

To transmit a signal or one or more codewords on downlink, the signal or codewords may be modulated into complex symbols through the scrambling module 301 and the modulation mapper 302 as in the uplink shown in FIG. 2. Then, the complex symbols are mapped to a plurality of layers by the layer mapper 303. The layers may be multiplied by a precoding matrix in the precoder 304 and allocated to transport antennas. The processed signals for the respective antennas may be mapped to time-frequency resource elements by the resource element mapper 305 and subjected to the OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 2 and 3.

Figure 4:
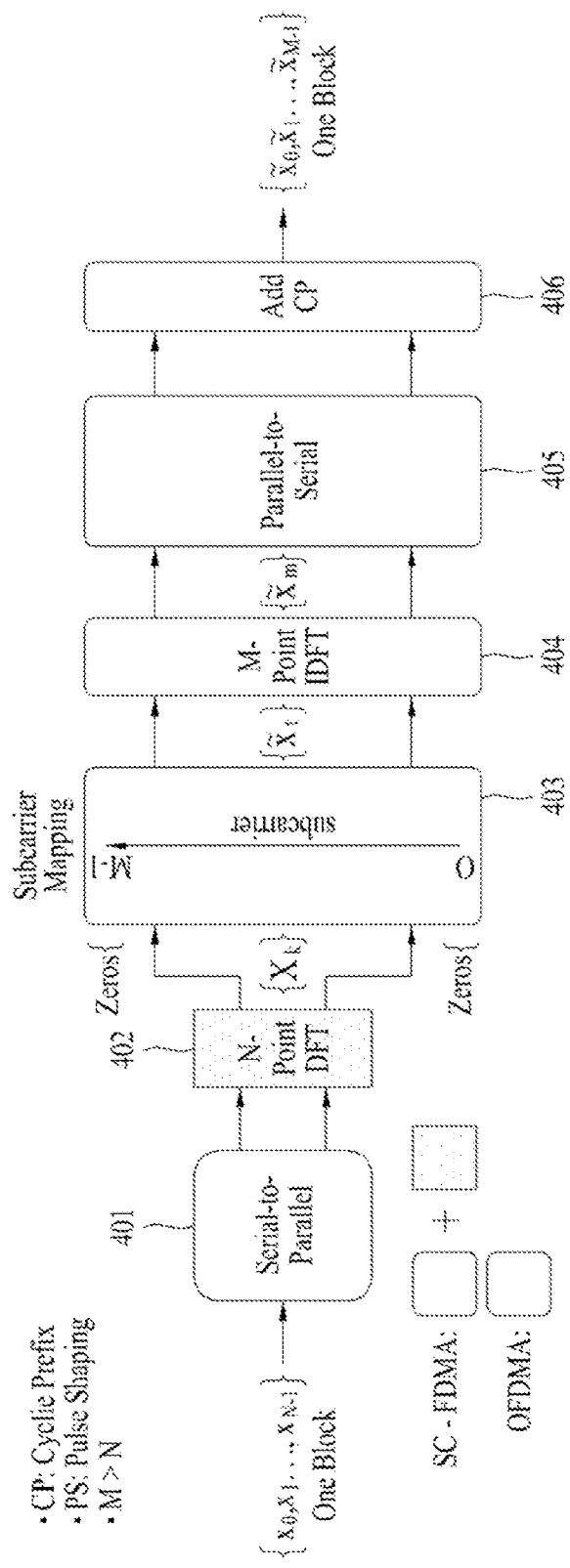
FIG. 4 illustrates SC-FDMA and OFDMA to which the present invention is applicable.

FIG. 4 illustrates SC-FDMA and OFDMA to which the present invention is applied. 3GPP employs OFDMA on downlink and uses SC-FDMA on uplink.

Referring to FIG. 4, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402. The N-point DFT module 402 cancels some parts of the influence of IDFT of the M-point IDFT module 404 such that a transmission signal has single carrier property.

SC-FDMA needs to satisfy single carrier property. FIG. 5 illustrates examples of mapping input symbols to subcarriers in the frequency domain, which satisfies single carrier property. When DFT symbols are allocated to subcarriers according to one of FIGS. 5(a) and 5(b), a transmission signal satisfying single carrier property can be obtained. FIG. 5(a) illustrates a localized mapping scheme and FIG. 5(b) illustrates a distributed mapping scheme.

Figure 8:
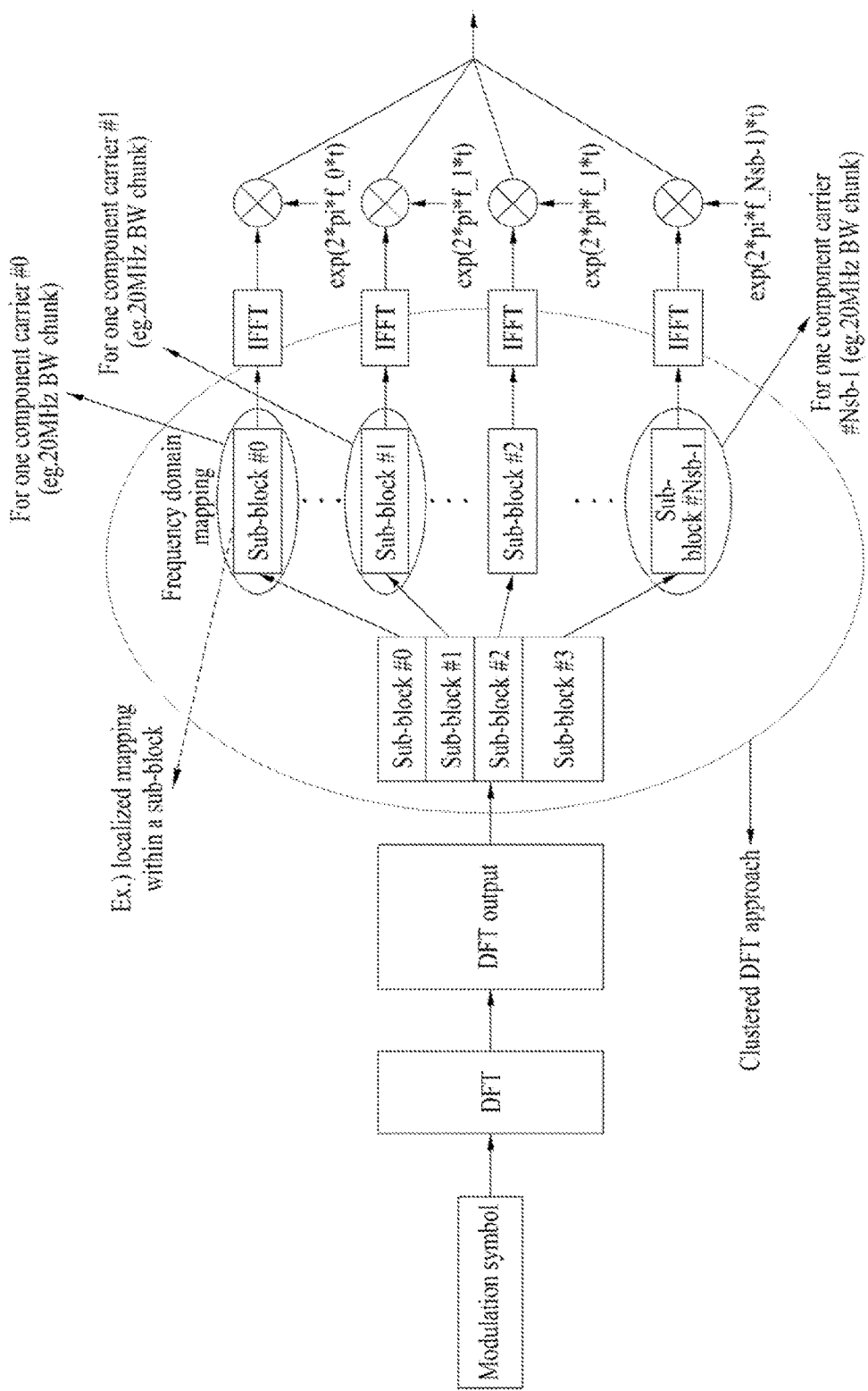

Clustered DFT-s-OFDM may be employed by the transmitters 100a and 100b. Clustered DFT-s-OFDM, which is a modified version of SC-FDMA, divides a signal that has passed through a precoder into several sub-blocks and discretely maps the sub-groups to subcarriers. FIG. 8 illustrates an example of mapping input symbols to a single carrier according to clustered DFT-s-OFDM.

Figure 6:
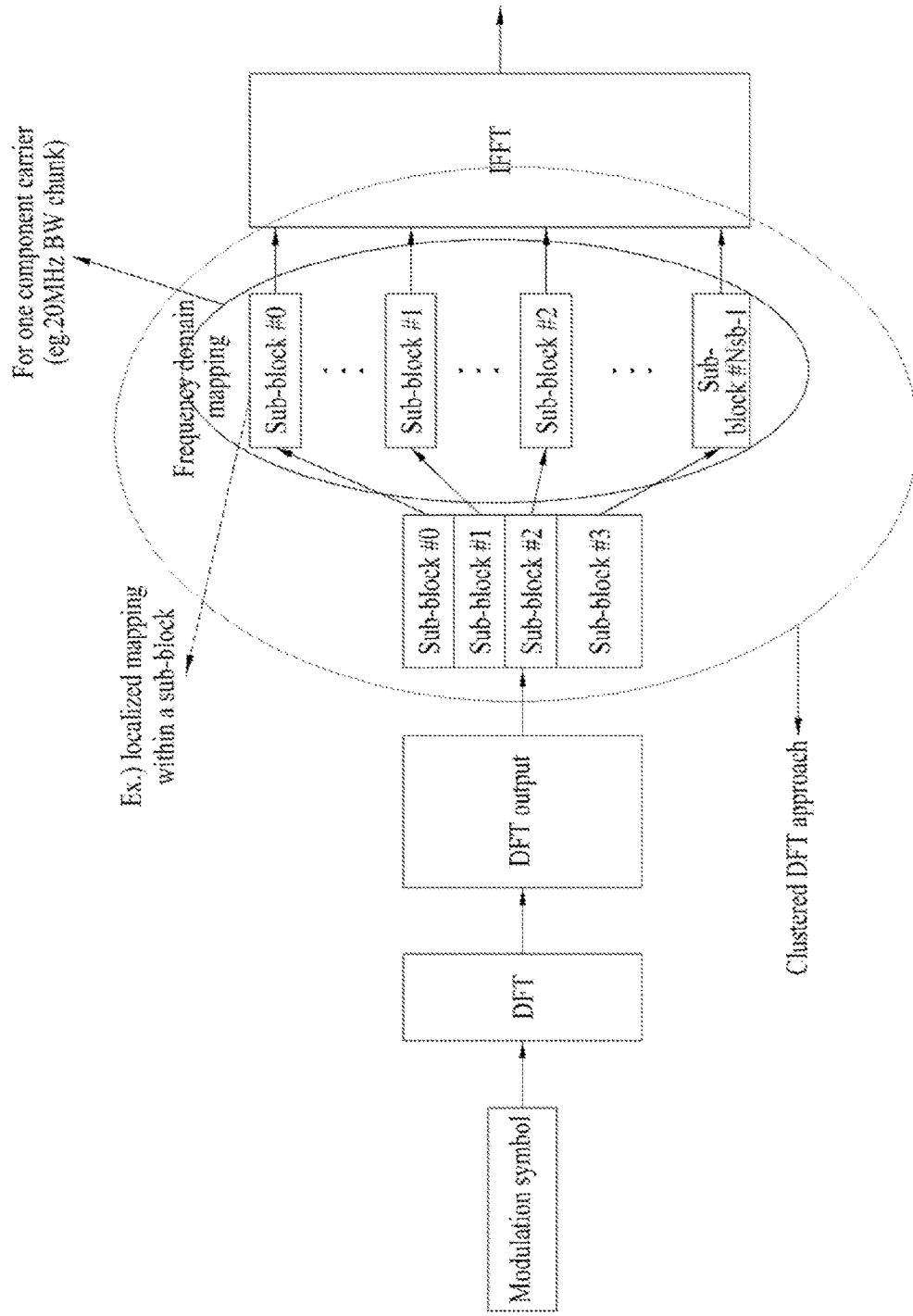
FIG. 6 illustrates a signal processing procedure of mapping DFT process output samples to a single carrier in clustered SC-FDMA.
Figure 7:
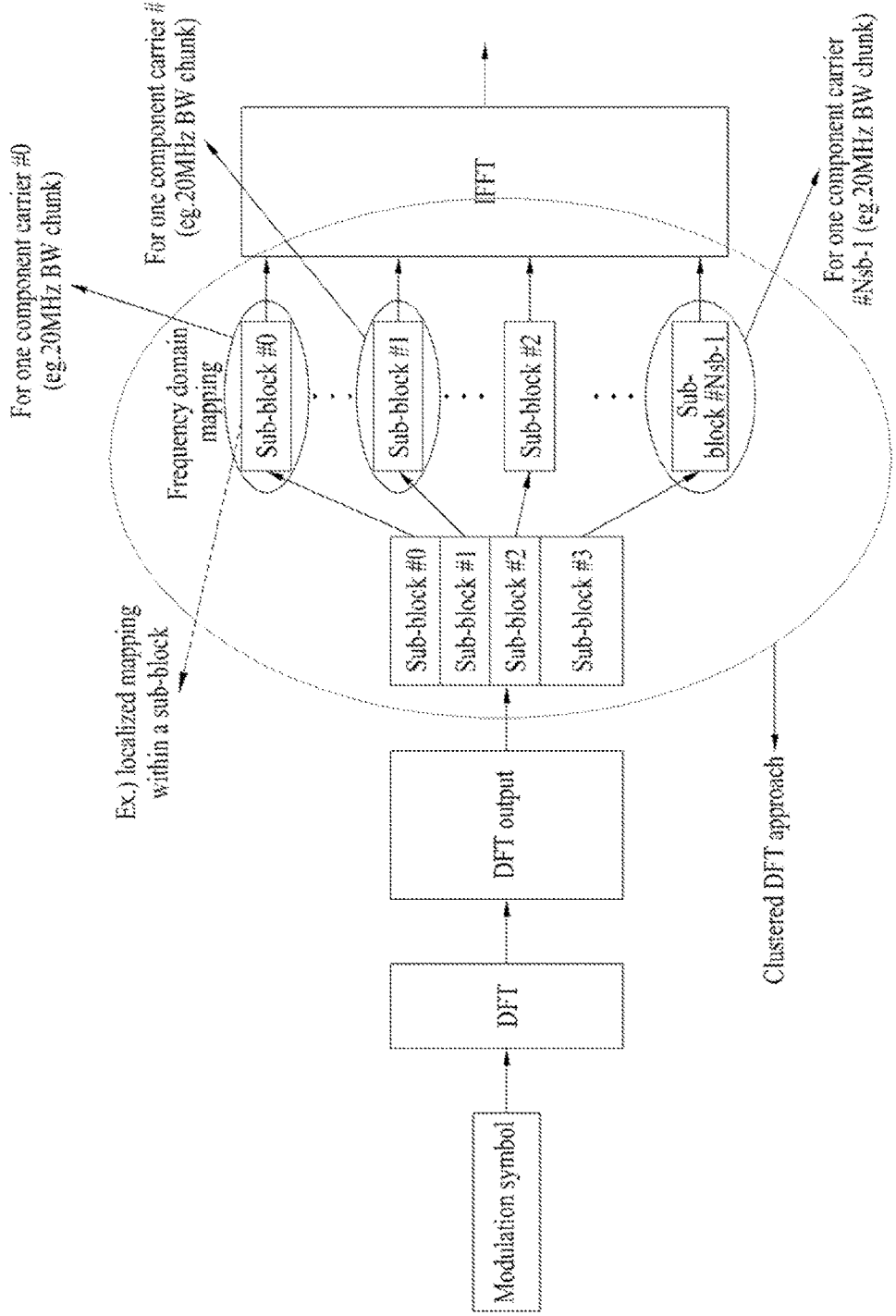
FIGS. 7 and 8 illustrate a signal processing procedure of mapping DFT process output samples to multiple carriers in clustered SC-FDMA.

FIG. 6 illustrates a signal processing procedure for mapping DFT process output samples to a single carrier in clustered SC-FDMA. FIGS. 7 and 8 illustrate signal processing procedures for mapping DFT process output samples to multiple carriers in clustered SC-FDMA. FIG. 6 shows an example of application of intra-carrier clustered SC-FDMA while FIGS. 7 and 8 show examples of application of inter-carrier clustered SC-FDMA. FIG. 7 illustrates a case in which a signal is generated through a single IFFT block when subcarrier spacing between neighboring component carriers is set while component carriers are contiguously allocated in the frequency domain. FIG. 8 shows a case in which a signal is generated through a plurality of IFFT blocks when component carriers are non-contiguously allocated in the frequency domain.

Figure 9:
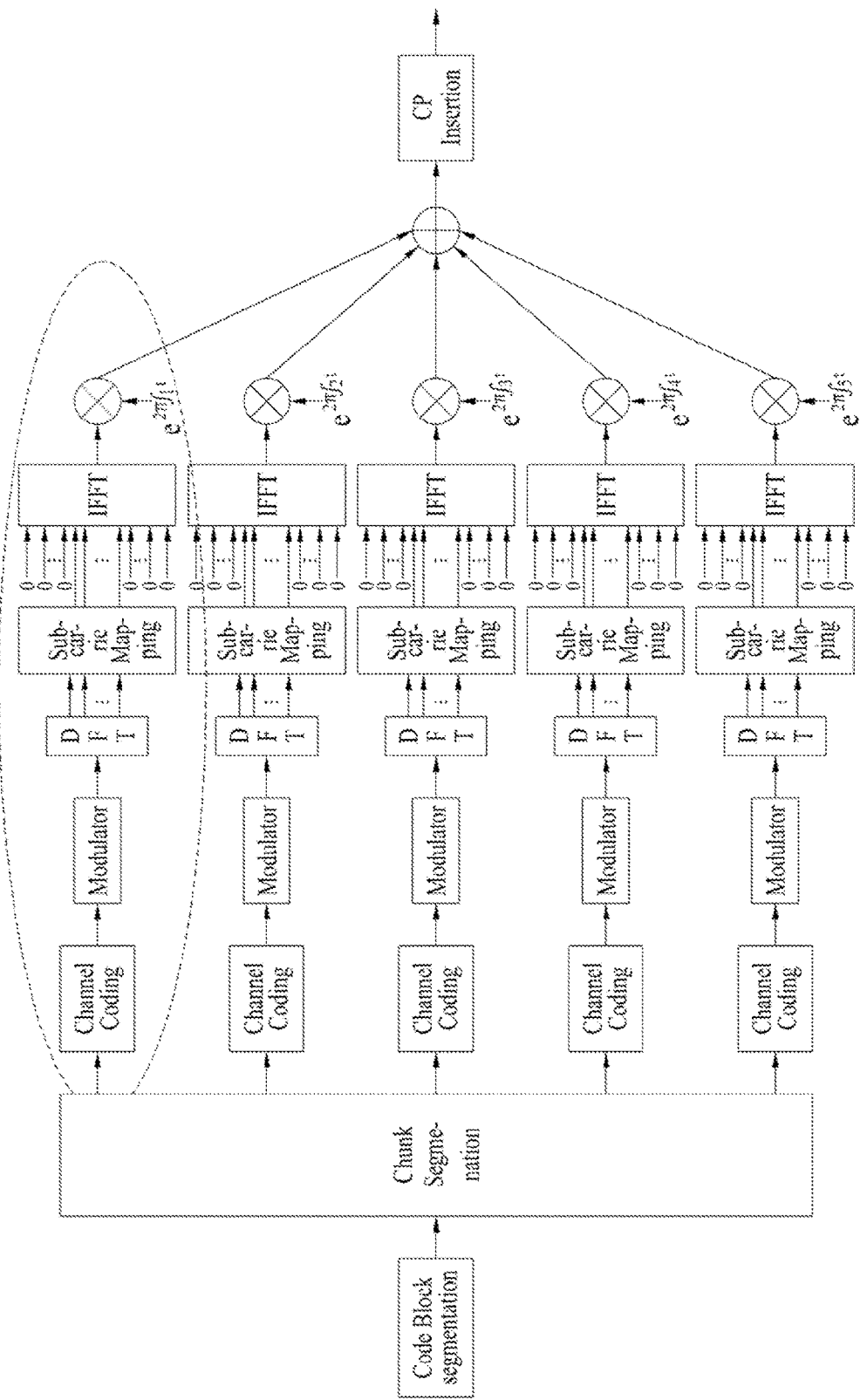
FIG. 9 illustrates a signal processing procedure in segmented SC-FDMA.

FIG. 9 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT-s-OFDMA. Referring to FIG. 9, the segmented SC-FDMA is characterized in that total time-domain modulation symbols are divided into N groups (N is an integer larger than 1) and a DFT process is performed on a group-by-group basis to relieve the single carrier property constraint.

Figure 10:
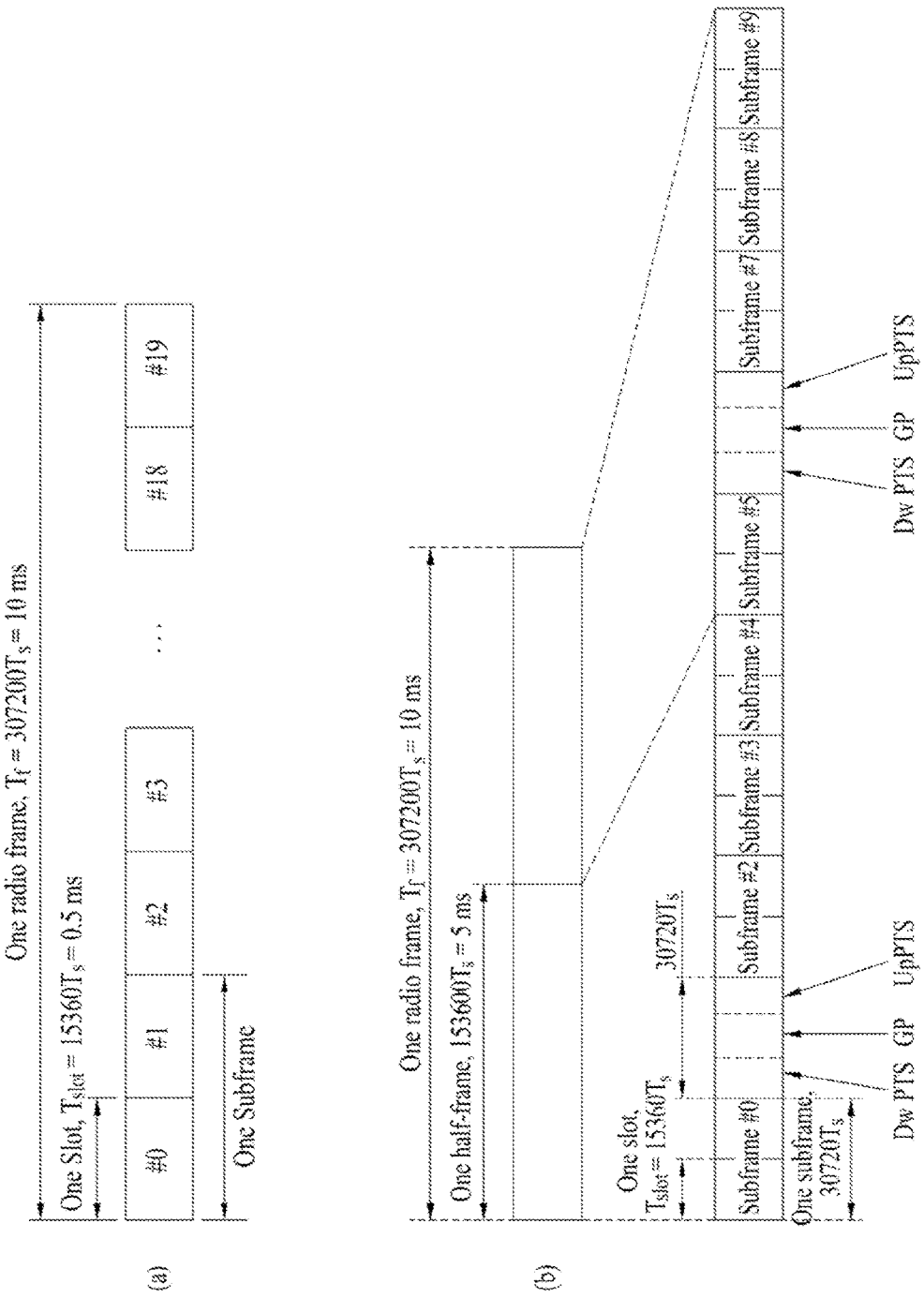
FIG. 10 illustrates exemplary radio frame structures used in a wireless communication system.

FIG. 10 illustrates exemplary radio frame structures used in a wireless communication system. FIG. 10(a) illustrates a radio frame according to frame structure type 1 (FS-1) of 3GPP LTE/LTE-A and FIG. 10(b) illustrates a radio frame according to frame structure type 2 (FS-2) of 3GPP LTE/LTE-A. The frame structure of FIG. 10(a) can be applied to FDD (frequency division duplex) mode and half FDD (H-FDD) mode. The frame structure of FIG. 10(b) can be applied to TDD (time division duplex) mode.

Referring to FIG. 10, a radio frame is 10 ms (307200 Ts) long in 3GPP LTE/LTE-A, including 10 equally sized subframes. The 10 subframes of the radio frame may be numbered. Herein, $T_s$ is a sampling time, expressed as $T_s=1/(2048\times15 \text{ kHz})$. Each subframe is 1 ms long, including two slots. The 20 slots of the radio frame may be sequentially numbered from 0 to 19. Each slot has a length of 0.5 ms. A time required to transmit one subframe is defined as a transmission time interval (TTI). Time resources may be identified by a radio frame number (or a radio frame index), a subframe number (or a subframe index), and a slot number (or a slot index).

Different radio frames may be configured for different duplex modes. For example, downlink transmission is distinguished from uplink transmission by frequency in the FDD mode. Therefore, a radio frame includes only downlink subframes or only uplink subframes.

On the other hand, since downlink transmission is distinguished from uplink transmission by time in the TDD mode, the subframes of a radio frame are divided into downlink subframes and uplink subframes.

Figure 11:
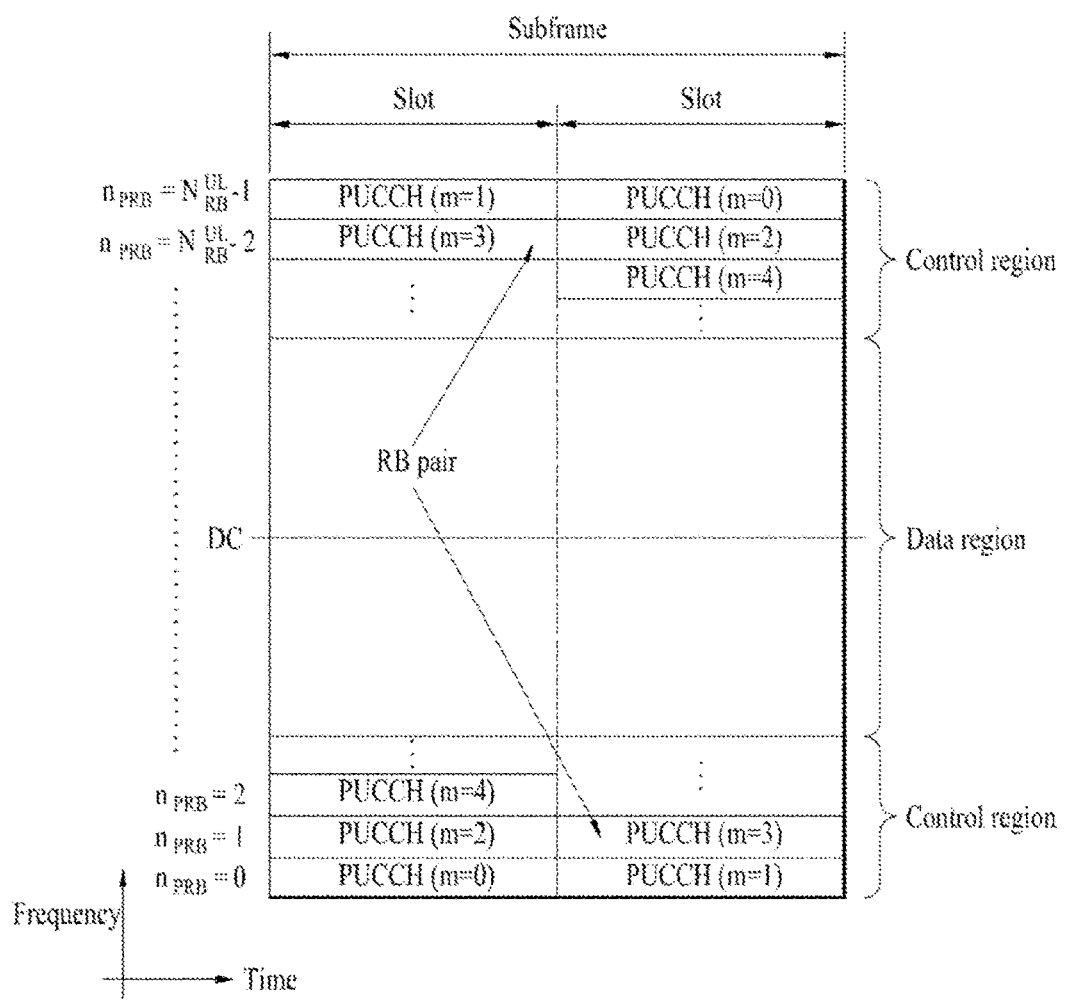
FIG. 11 illustrates an uplink subframe structure.

FIG. 11 illustrates an uplink subframe structure to which the present invention is applied. Referring to FIG. 11, an uplink subframe may be divided into a control region and a data region in the frequency domain. At least one PUCCH may be allocated to the control region to transmit uplink control information (UCI). In addition, at least one PUSCH may be allocated to the data region to transmit user data. If a UE adopts SC-FDMA in LTE release 8 or release 9, it cannot transmit a PUCCH and a PUSCH simultaneously in order to maintain the single carrier property.

UCI transmitted on a PUCCH differs in size and usage depending on PUCCH formats. The size of UCI may also vary according to coding rate. For example, the following PUCCH formats may be defined.

(1) PUCCH Format 1: used for On-Off keying (OOK) modulation and scheduling request (SR).

(2) PUCCH Formats 1a and 1b: used for transmission of ACK/NACK information.

1) PUCCH Format 1a: 1-bit ACK/NACK information modulated in BPSK

2) PUCCH Format 1b: 2-bit ACK/NACK information modulated in QPSK (3) PUCCH Format 2: modulated in QPSK and used for channel quality indicator (CQI) transmission.

(4) PUCCH Formats 2a and 2b: used for simultaneous transmission of a CQI and ACK/NACK information.

Table 1 lists modulation schemes and numbers of bits per subframe for PUCCH formats and Table 2 lists numbers of reference signals (RSs) per slot for PUCCH formats. Table 3 lists SC-FDMA symbol positions of RSs for PUCCH formats. In Table 1, PUCCH Formats 2a and 2b are for the case of a normal CP.

TABLE 1

| PUCCH Format | Modulation scheme | Number of Bits per Subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH Format | Normal CP | Extended CP |
|---|---|---|
| 1, 1a, 1b | 3 | 2 |
| 2 | 2 | 1 |
| 2a, 2b | 2 | N/A |

TABLE 3

| | SC-FDMA Symbol Position of RS | |
|---|---|---|
| PUCCH Format | Normal CP | Extended CP |
| 1, 1a, 1b | 2, 3, 4 | 2, 3 |
| 2, 2a, 2b | 1, 5 | 3 |

Subcarriers far from a DC (Direct Current) subcarrier are used for the control region in the uplink subframe. In other words, subcarriers at both ends of an uplink transmission bandwidth are allocated for transmission of UCI. The DC subcarrier is a component that is spared from signal transmission and mapped to carrier frequency $f_0$ during frequency upconversion performed by an OFDMA/SC-FDMA signal generator.

A PUCCH from one UE is allocated to an RB pair in a subframe and the RBs of the RB pair occupy different subcarriers in two slots. This PUCCH allocation is called frequency hopping of an RB pair allocated to a PUCCH over a slot boundary. However, if frequency hopping is not applied, the RB pair occupies the same subcarriers in two slots. Since a PUCCH from a UE is allocated to an RB pair in a subframe irrespective of frequency hopping, the same PUCCH is transmitted twice, each time in one RB of each slot in the subframe.

Hereinafter, an RB pair used for transmission of a PUCCH in a subframe is referred to as a PUCCH region. A PUCCH region and a code used therein are referred to as a PUCCH resource. That is, different PUCCH resources may have different PUCCH regions or may have different codes in the same PUCCH regions. For convenience, a PUCCH carrying ACK/NACK information is referred to as an ACK/NACK PUCCH, a PUCCH carrying CQI/PMI/RI information is referred to as a channel state information (CSI) PUCCH, and a PUCCH carrying SR information is referred to as an SR PUCCH.

A BS allocates PUCCH resources to a UE explicitly or implicitly, for transmission of UCI.

UCI such as ACK/NACK information, CQI information, PMI information, RI information, and SR information may be transmitted in the control region of an uplink subframe.

The UE and the BS transmit and receive signals or data from or to each other in the wireless communication system. When the BS transmits data to the UE, the UE decodes the received data. If data decoding is successful, the UE transmits an ACK to the BS. On the contrary, if data decoding fails, the UE transmits a NACK to the BS. The same applies to the opposite case, that is, the case where the UE transmits data to the BS. In the 3GPP LTE system, the UE receives a PDSCH from the BS and transmits an ACK/NACK for the received PDSCH on a PUCCH that is implicitly determined by a PDCCH carrying scheduling information for the PDSCH. A state in which the UE does not receive data may be regarded as a discontinuous transmission (DTX) state. In this case, the state may be processed as a case in which there is no received data according to a predetermined rule or a NACK case (in which decoding of data is not successful although the data is received).

Figure 12:
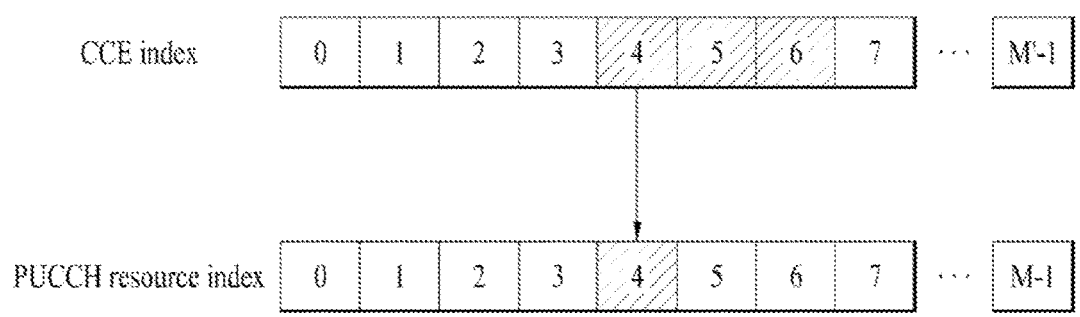
FIG. 12 illustrates determination of a PUCCH for ACK/NACK transmission.

FIG. 12 illustrates a structure for determining a PUCCH for ACK/NACK transmission, to which the present invention is applied.

A PUCCH that will carry ACK/NACK information is not allocated to a UE in advance. Rather, a plurality of PUCCHs is used separately at each time instant by a plurality of UEs within a cell. Specifically, a PUCCH that a UE will use to transmit ACK/NACK information is implicitly determined on the basis of a PDCCH carrying scheduling information for a PDSCH that delivers downlink data. An entire area carrying PDCCHs in a downlink subframe includes a plurality of control channel elements (CCEs) and a PDCCH transmitted to a UE includes one or more CCEs. A CCE includes a plurality of (e.g. 9) resource element groups (REGs). One REG includes four contiguous REs except for an RS. The UE transmits ACK/NACK information on an implicit PUCCH that is derived or calculated by a function of a specific CCE index (e.g. the first or lowest CCE index) from among the indexes of CCEs included in a received PDCCH.

Referring to FIG. 12, the lowest CCE index of a PDCCH corresponds to a PUCCH resource index for ACK/NACK transmission. As illustrated in FIG. 12, on the assumption that a PDCCH including CCEs #4, #5 and #6 delivers scheduling information for a PDSCH to a UE, the UE transmits an ACK/NACK to a BS on a PUCCH, for example, PUCCH #4 derived or calculated using the lowest CCE index of the PDCCH, CCE index 4.

In the illustrated case of FIG. 12, there are up to M' CCEs in a downlink subframe and up to M PUCCHs in an uplink subframe. Although M may be equal to M', M may be different from M' and CCEs may be mapped to PUCCHs in an overlapping manner. For instance, a PUCCH resource index may be calculated by the following equation.

$$n^{(1)}_{PUCCH} = n_{CCE} + N^{(1)}_{PUCCH}$$ [Equation 1]

Here, $n^{(1)}_{PUCCH}$ denotes the index of a PUCCH resource for transmitting ACK/NACK information, $N^{(1)}_{PUCCH}$ denotes a signal value received from a higher layer, and $n_{CCE}$ denotes the lowest of CCE indexes used for transmission of a PDCCH.

Figure 13:
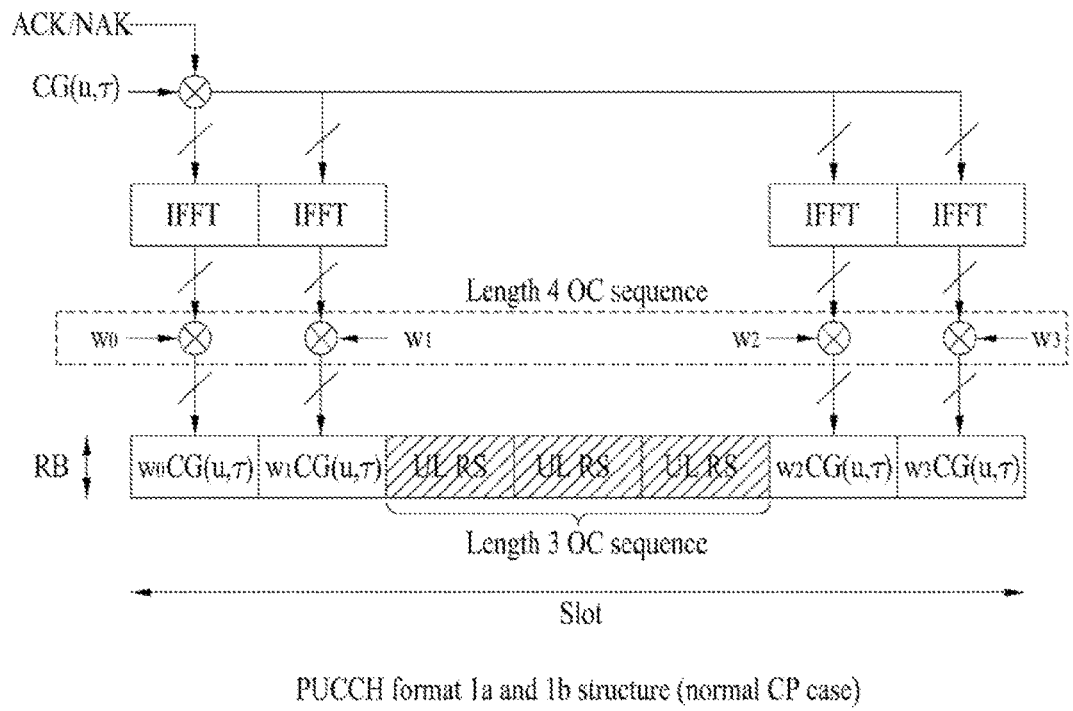
FIGS. 13 and 14 illustrate slot level structures of PUCCH formats 1a and 1b for ACK/NACK transmission.
Figure 14:
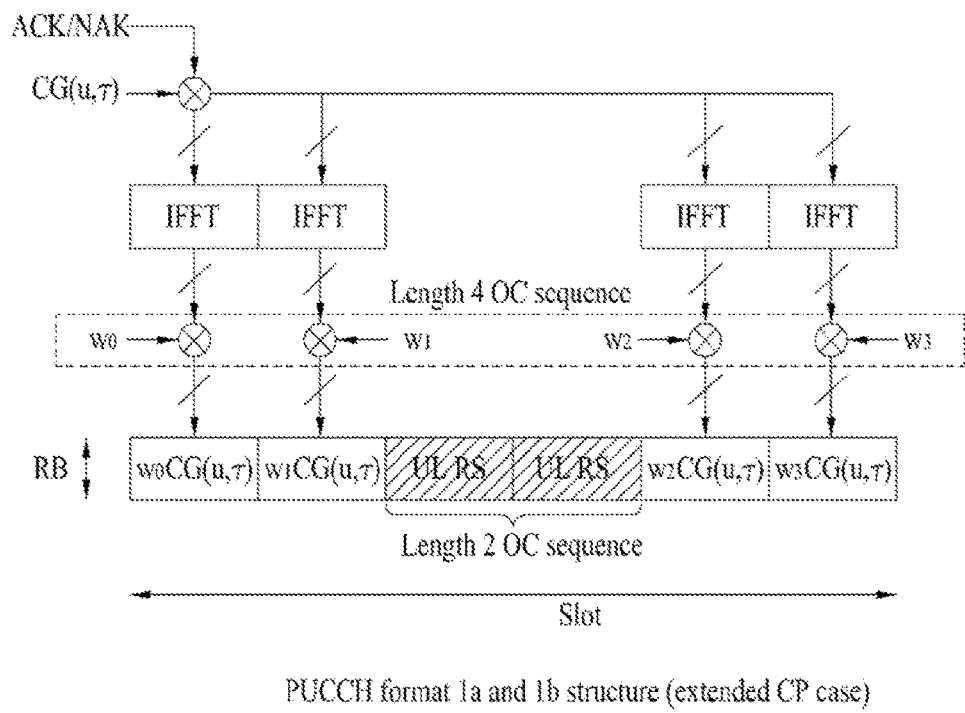

FIGS. 13 and 14 illustrate slot-level structures of PUCCH Formats 1a and 1b for ACK/NACK transmission.

FIG. 13 illustrates PUCCH Formats 1a and 1b in case of a normal CP and FIG. 14 illustrates PUCCH Formats 1a and 1b in case of an extended CP. The same UCI is repeated on a slot basis in a subframe in PUCCH Format 1a and 1b. A UE transmits an ACK/NACK signal in the resources of a different cyclic shift (CS) (a frequency-domain code) of a computer-generated constant amplitude zero auto correlation (CG-CAZAC) sequence and an orthogonal cover (OC) or orthogonal cover code (OCC) (a time-domain spreading code). The OC includes, for example, a Walsh/DFT orthogonal code. Given six CSs and three OCs, a total of 18 UEs may be multiplexed into the same PRB, for a single antenna. An OC sequence w0, w1, w2 and w3 is applicable to a time domain (after FFT modulation) or to a frequency domain (before FFT modulation). PUCCH Format 1 for transmitting SR information is the same as PUCCH Formats 1a and 1b in terms of slot-level structure and different from PUCCH Formats 1a and 1b in terms of modulation.

PUCCH resources composed of a CS, an OC, and a physical resource block (PRB) may be allocated to a UE by radio resource control (RRC) signaling, for transmission of SR information and an ACK/NACK for semi-persistent scheduling (SPS). As described before with reference to FIG. 12, PUCCH resources may be indicated to a UE implicitly using the lowest CCE index of a PDCCH corresponding to a PDSCH or the lowest CCE index of a PDCCH for SPS release, for dynamic ACK/NACK (or an ACK/NACK for non-persistent scheduling) feedback or ACK/NACK feedback for a PDCCH indicating SPS release.

Figure 15:
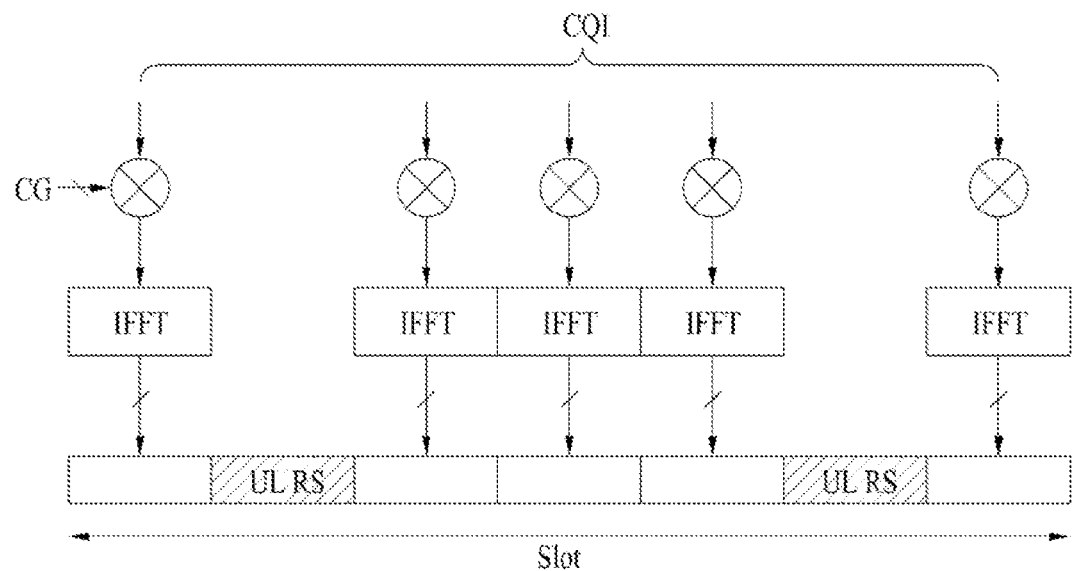
FIG. 15 illustrates PUCCH format 2/2a/2b in the case of normal cyclic prefix.
Figure 16:
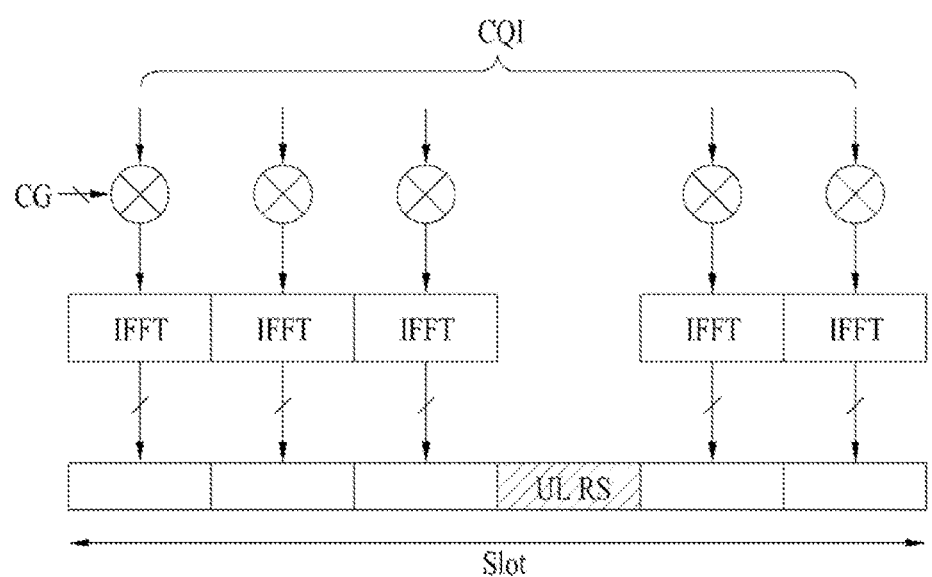
FIG. 16 illustrates PUCCH format 2/2a/2b in the case of extended cyclic prefix.

FIG. 15 illustrates PUCCH Format 2/2a/2b in case of a normal CP and FIG. 16 illustrates PUCCH Format 2/2a/2b in case of an extended CP. Referring to FIGS. 15 and 16, one subframe includes 10 QPSK symbols except for an RS symbol in case of a normal CP. Each QPSK symbol is spread with a CS in the frequency domain and then mapped to a corresponding SC-FDMA symbol. SC-FDMA symbol-level CS hopping may be used to randomize inter-cell interference. An RS may be code division multiplexed (CDM) using a CS. For example, if there are 12 or 6 available CSs, 12 or 6 UEs may be multiplexed in the same PRB. That is, a plurality of UEs may be multiplexed using CS+OC+PRB and CS+PRB in PUCCH Formats 1/1a/1b and 2/2a/2b.

OCs of length 4 or length 3 for PUCCH Format 1/1a/1b are illustrated in Table 4 and Table 5 below.

TABLE 4

| Sequence Index | Orthogonal sequence |
|---|---|
| 0 | [+1 +1 +1 +1] |
| 1 | [+1 −1 +1 −1] |
| 2 | [+1 −1 −1 +1] |

TABLE 5

| Sequence Index | Orthogonal sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

OCs for RSs in PUCCH Format 1/1a/1b are given in Table 6 below.

TABLE 6

| Sequence Index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH Formats 1a and 1b. In FIG. 14, $\Delta_{shift}^{PUCCH} = 2$.

FIG. 18 illustrates channelization for a hybrid structure of PUCCH Format 1/1a/1b and PUCCH Format 2/2a/2b in the same PRB.

CS hopping and OC re-mapping may be performed as follows.

(1) Symbol-based cell-specific CS hopping to randomize inter-cell interference (2) Slot-level CS/OS re-mapping
1) for randomization of inter-cell interference
2) slot-based approach for mapping between ACK/NACK channels and resources k Meanwhile, resources $n_r$ for PUCCH Format 1/1a/1b include the following combinations.

(1) CS(identical to DFT OC at symbol level) ($n_{cs}$)
(2) OC (OC at slot level) ($n_{oc}$)
(3) Frequency RB ($n_{rb}$)

Let the indexes of a CS, an OC, and an RB be denoted by $n_{cs}$, $n_{oc}$, and $n_{rb}$, respectively. Then, a representative index $n_r$ includes $n_{cs}$, $n_{oc}$, and $n_{rb}$. $n_r$ satisfies $n_r = (n_{cs}, n_{oc}, n_{rb})$.

A combination of an ACK/NACK and a CQI, PMI, RI and CQI may be delivered in PUCCH Format 2/2a/2b. Reed Muller (RM) channel coding may be applied.

For example, channel coding for an uplink CQI is described as follows in the LTE system. A bit stream $a_0$, $a_1$, $a_2$, $a_3$, ..., $a_{A-1}$ is channel-encoded with a (20, A) RM code. Table 7 lists base sequences for the (20, A) code. $a_0$ and $a_{A-1}$ are the Most Significant Bit (MS) and Least Significant Bit (LSB), respectively. Aside from simultaneous transmission of a CQI and an ACK/NACK, up to 11 bits can be transmitted in case of an extended CP. A bit stream may be encoded to 20 bits by an RM code and then modulated in QPSK. Before QPSK modulation, the coded bits may be scrambled.

TABLE 7

| I | $M_{1,0}$ | $M_{1,1}$ | $M_{1,2}$ | $M_{1,3}$ | $M_{1,4}$ | $M_{1,5}$ | $M_{1,6}$ | $M_{1,7}$ | $M_{1,8}$ | $M_{1,9}$ | $M_{1,10}$ | $M_{1,11}$ | $M_{1,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated by Equation 2.

$$b_i = \sum_{n=0}^{A-1} (a_n \cdot M_{i,n}) \bmod 2 \quad \text{[Equation 2]}$$

Here, i=0, 1, 2, . . . B−1.

Table 8 illustrates a UCI field for feedback of a broadband report (a single antenna port, transmit diversity, or open loop spatial multiplexing PDSCH) CQI.

TABLE 8

| Field | Bandwidth |
|---|---|
| Broadband CQI | 4 |

Table 9 illustrates a UCI field for feedback of a broadband CQI and a PMI. This field reports transmission of a closed loop spatial multiplexing PDSCH.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial-domain differential CQI | 0 | 3 | 0 | 3 |
| PMI | 2 | 1 | 4 | 4 |

Table 10 illustrates a UCI field to feedback an RI for a broadband report.

TABLE 10

| | Bit widths | | |
|---|---|---|---|
| | | 4 antenna ports | |
| Field | 2 antenna ports | Up to 2 layers | Up to 4 layers |
| RI | 1 | 1 | 2 |

Figure 19:
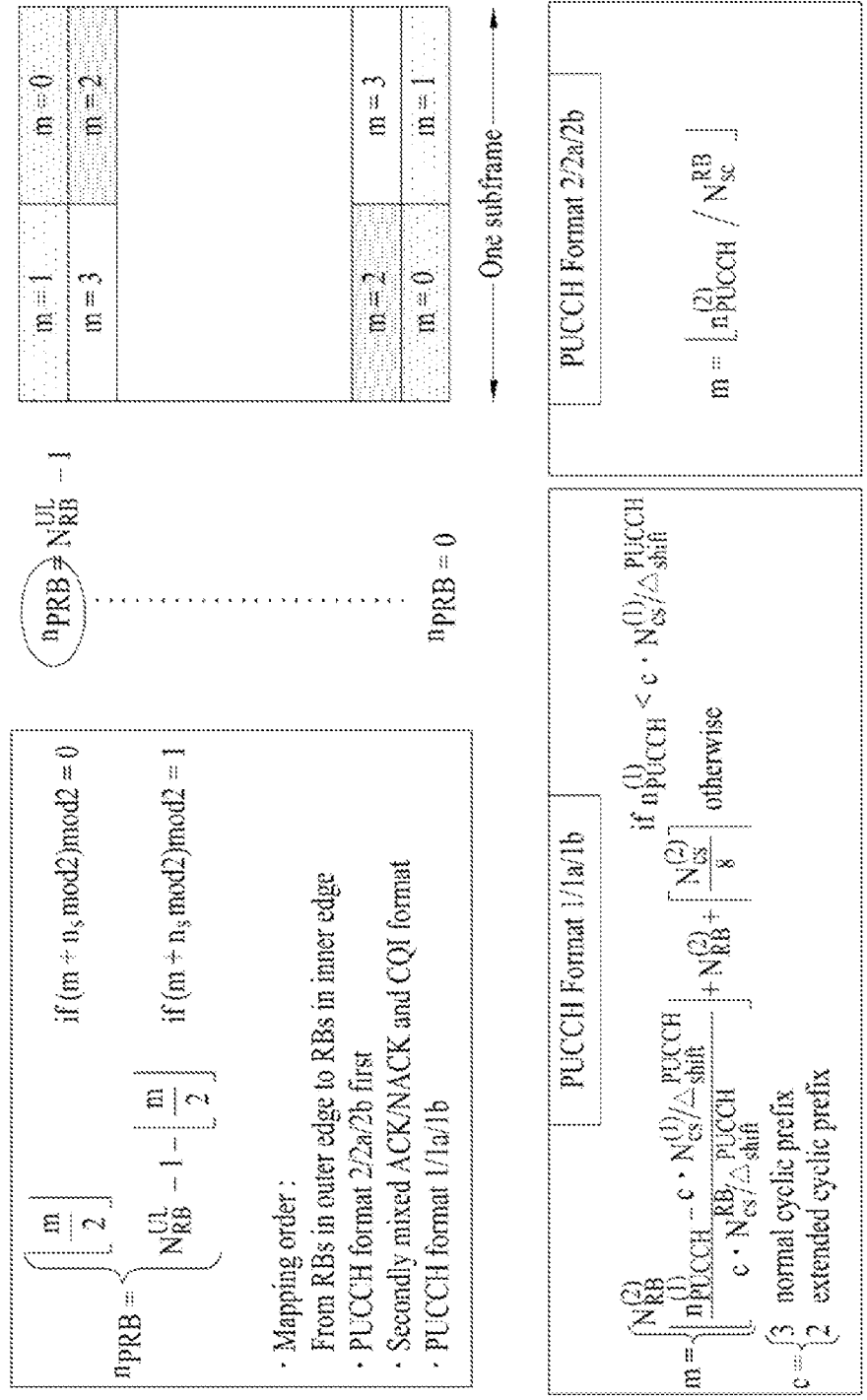
FIG. 19 illustrates allocation of physical resource blocks (PRBs)

FIG. 19 illustrates PRB allocation. Referring to FIG. 19, a PRB may be used to carry a PUCCH in slot $n_s$.

A multi-carrier system or carrier aggregation (CA) system is a system using a plurality of carriers each having a narrower bandwidth than a target bandwidth in order to support broadband. When a plurality of carriers each having a narrower bandwidth than a target band are aggregated, the bandwidth of each of the aggregated carriers may be limited to a bandwidth used in a legacy system in order to ensure backward compatibility with the legacy system. For example, the legacy LTE system supports 1.4, 3, 5, 10, 15, and 20 MHz and the LTE-A system evolved from the LTE system may support a broader bandwidth than 20 MHz using only bandwidths supported by the LTE system. Alternatively, CA may be supported by defining a new bandwidth irrespective of the bandwidths used in the legacy system. The term multi-carrier is used interchangeably with CA and spectrum aggregation. In addition, CA covers both contiguous CA and non-contiguous CA. Furthermore, CA my cover both intra-band CA and inter-band CA.

Figure 20:
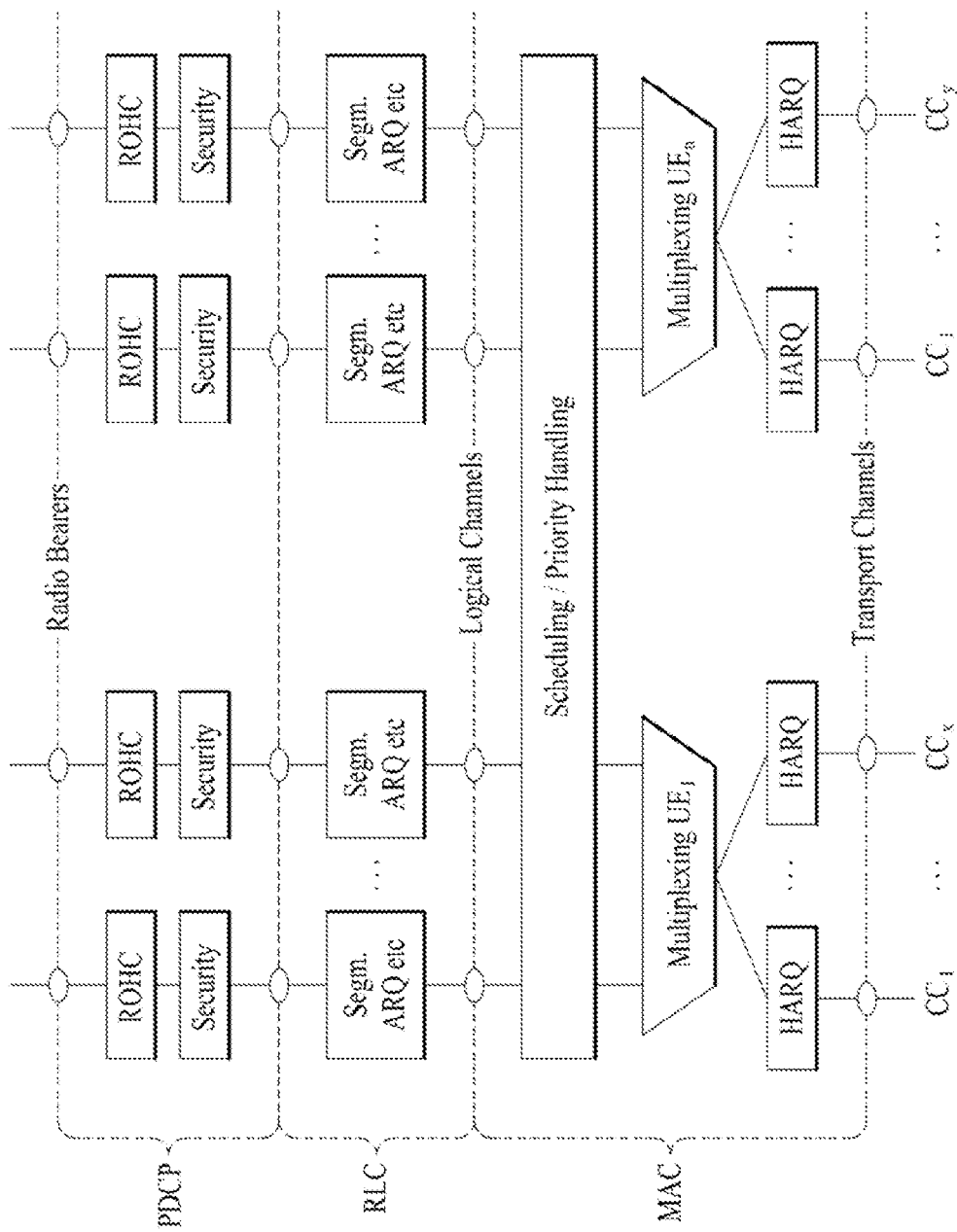
FIG. 20 illustrates a concept of management of downlink component carriers (DL CCs) in a BS.
Figure 21:
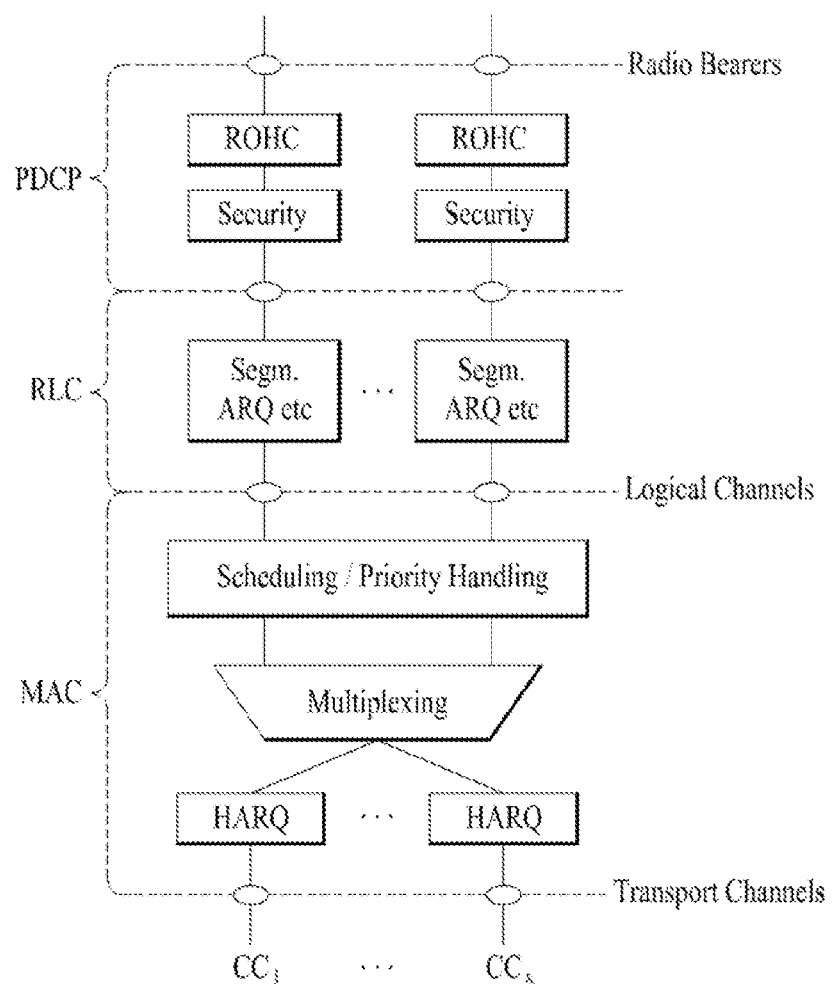
FIG. 21 illustrates a concept of management of uplink component carriers (UL CCs) in a UE.

FIG. 20 is a conceptual view illustrating DL CC management at a BS and FIG. 21 illustrates a conceptual view illustrating UL CC management at a UE. For convenience, a higher layer will be referred simply as a MAC layer in FIGS. 19 and 20.

Figure 22:
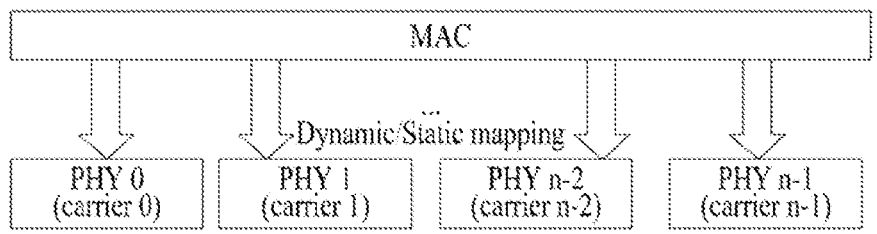
FIG. 22 illustrates a concept of management of multiple carriers by one MAC layer in a BS.
Figure 23:
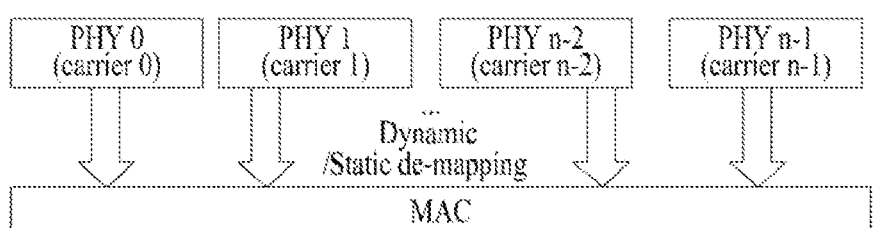
FIG. 23 illustrates a concept of management of multiple carriers by one MAC layer in a UE.

FIG. 22 is a conceptual view illustrating multi-carrier management of one MAC layer at a BS and FIG. 23 is a conceptual view illustrating multi-carrier management of one MAC layer at a UE.

Referring to FIGS. 22 and 23, one MAC layer performs transmission and reception by managing and operating one or more frequency carriers. Because the frequency carriers managed by the single MAC layer do not need to be contiguous, this multi-carrier management scheme is more flexible in terms of resource management. In FIGS. 22 and 23, one physical (PHY) layer refers to one CC, for convenience. Yet, a PHY layer is not necessarily an independent radio frequency (RF) device. While one independent RF device generally corresponds to one PHY layer, it may include a plurality of PHY layers.

Figure 24:
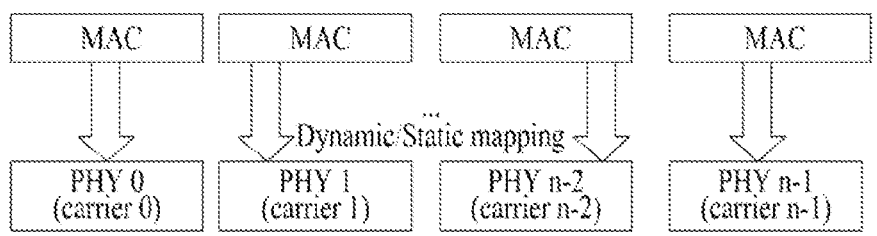
FIG. 24 illustrates a concept of management of multiple carriers by multiple MAC layers in a BS.
Figure 25:
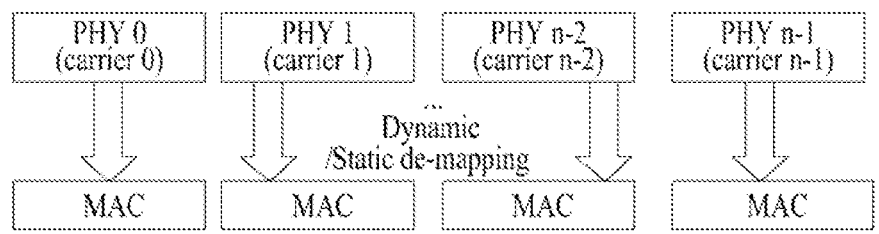
FIG. 25 illustrates a concept of management of multiple carriers by multiple MAC layers in a UE.
Figure 26:
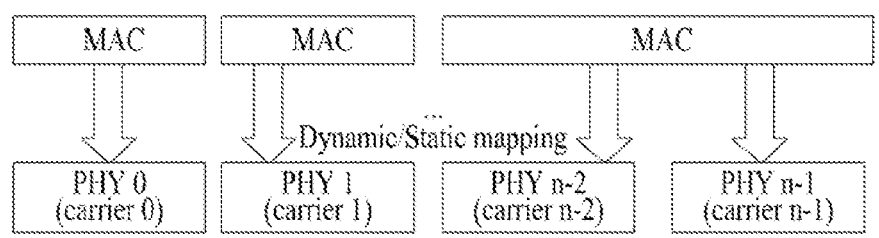
FIG. 26 illustrates a concept of management of multiple carriers by multiple MAC layers in a BS.
Figure 27:
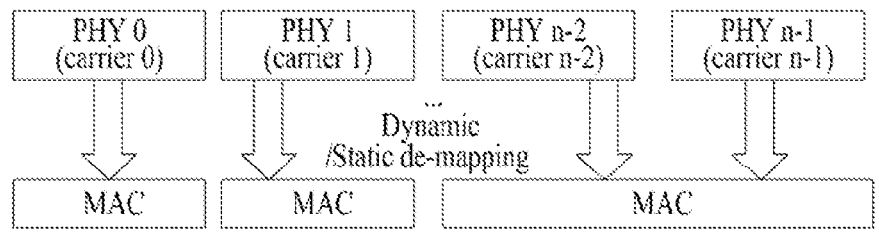
FIG. 27 illustrates a concept of management of multiple carriers by multiple MAC layers in a UE.

FIG. 24 is a conceptual view illustrating multi-carrier management of a plurality of MAC layers at a BS, FIG. 25 is a conceptual view illustrating multi-carrier management of a plurality of MAC layers at a UE, FIG. 26 is another conceptual view illustrating multi-carrier management of a plurality of MAC layers at a BS, and FIG. 27 is another conceptual view illustrating multi-carrier management of a plurality of MAC layers at a UE.

Apart from the structures illustrated in FIGS. 22 and 23, a plurality of MAC layers may control a plurality of carriers, as illustrated in FIGS. 24 to 27.

Each MAC layer may control one carrier in a one-to-one correspondence as illustrated in FIGS. 24 and 25, whereas each MAC layer may control one carrier in a one-to-one correspondence, for some carriers and one MAC layer may control one or more of the remaining carriers as illustrated in FIGS. 26 and 27.

The above-described system uses a plurality of carriers, that is, first to N-th carriers, and the carriers may be contiguous or non-contiguous irrespective of downlink or uplink. A TDD system is configured to use N carriers such that downlink transmission and uplink transmission take place on each carrier, whereas an FDD system is configured to use a plurality of carriers for each of downlink transmission and uplink transmission. The FDD system may support asymmetrical CA in which different numbers of carriers and/or carriers having different bandwidths are aggregated for downlink and uplink.

When the same number of CCs is aggregated for downlink and uplink, all CCs can be configured with backward compatibility with the legacy system. However, CCs without backward compatibility are not excluded from the present invention.

Figure 28:
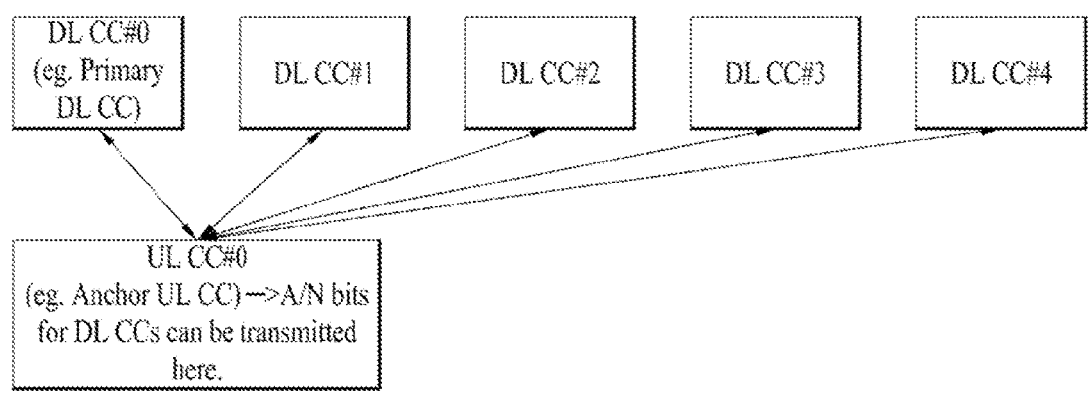
FIG. 28 illustrates asymmetrical carrier aggregation in which five DL CCs are linked to one UL CC.

FIG. 28 illustrates exemplary asymmetrical CA in which five DL CCs are linked to a single UL CC. This asymmetrical CA may be set from the perspective of transmitting UCI. Specific UCI (e.g. ACK/NACK responses) for a plurality of DL CCs are aggregated in a single UL CC and transmitted. When a plurality of UL CCs is configured, specific UCI (e.g. ACKs/NACKs for DL CCs) are transmitted on a predetermined UL CC (e.g., primary CC, primary cell or PCell). For convenience, if it is assumed that each DL CC can carry up to two codewords and the number of ACKs/NACKs for each CC depends on the maximum number of codewords set per CC (for example, if a BS sets up to two codewords for a specific CC, even though a specific PDCCH uses only one codeword on the CC, two ACKs/NACKs are set for the CC), at least two UL ACK/NACK bits are needed for each DL CC. In this case, to transmit ACKs/NACKs for data received on five DL CCs on a single UL CC, at least ten ACK/NACK bits are needed. If a Discontinuous Transmission (DTX) state is also to be indicated for each DL CC, at least 12 bits ($=5^6=3125=11.61$ bits) are required for ACK/NACK transmission. Since up to two ACK/NACK bits are available in the conventional PUCCH Formats 1a and 1b, this structure cannot transmit increased ACK/NACK information. While CA is given as an example of a cause to increase the amount of UCI, this situation may also occur due to an increase in the number of antennas and the existence of a backhaul subframe in a TDD system and a relay system. Like ACK/NACK transmission, the amount of control information to be transmitted is also increased when control information related to a plurality of DL CCs is to be transmitted on a single UL CC. For example, transmission of CQI/PMI/RI information related to a plurality of DL CCs may increase UCI payload. While ACK/NACK information related to codewords is described in the present invention by way of example, it is obviously to be understood that a transport block corresponding to a codeword exists and the same is applicable to ACK/NACK information for transport blocks.

In FIG. 28, a UL anchor CC (a UL PCC or a UL primary CC) is a CC that delivers a PUCCH or UCI, determined cell-specifically/UE-specifically. For example, a UE can determine a CC for which initial random access is attempted as the primary CC. A DTX state may be fed back explicitly or may be fed back so as to share the same state with a NACK.

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. Only one PCell can exist during CA in LTE-A release 10. The SCell may be configured after an RRC connection is established and may be used to provide additional radio resources. The PCell and the SCell may collectively be referred to as a serving cell. Accordingly, a single serving cell composed of a PCell only exists for a UE in RRC_Connected state, for which CA is not set or which does not support CA. On the other hand, one or more serving cells exist, including a PCell and entire SCells, for a UE in RRC_CONNECTED state, for which CA is set. For CA, a network may configure one or more SCells in addition to an initially configured PCell, for a UE supporting CA during connection setup after an initial security activation operation is initiated. Therefore, PCC is interchangeably used with PCell, primary (radio) resources, and primary frequency resources. Similarly, SCC is used interchangeably with SCell, secondary (radio) resources, and secondary frequency resources.

Now a description will be given of a method for efficiently transmitting increased UCI with reference to drawings. Specifically, a new PUCCH format, a signal processing operation, and a resource allocation method for transmitting increased UCI are proposed. The new PUCCH format proposed by the present invention is called CA PUCCH Format or PUCCH Format 3, considering that PUCCH Format 1 to PUCCH Format 2 are defined in legacy LTE Release 8/9. The technical features of the proposed PUCCH format may be applied to any physical channel (e.g. a PUSCH) that can deliver UCI in the same manner or in a similar manner. For example, an embodiment of the present invention is applicable to a periodic PUSCH structure for transmitting control information periodically or a non-periodic PUSCH structure for transmitting control information non-periodically.

The following drawings and embodiments of the present invention will be described focusing on a case in which the UCI/RS symbol structure of the legacy LTE PUCCH Format 1/1a/1b (in case of a normal CP) is used as a subframe-level/slot-level UCI/RS symbol structure applied to PUCCH Format 3. However, the subframe-level/slot-level UCI/RS symbol structure of PUCCH Format 3 is defined to provide an example, which should not be construed as limiting the present invention. The number and positions of UCI/RS symbols may be changed freely in PUCCH Format 3 of the present invention according to system design. For example, PUCCH Format 3 according to an embodiment of the present invention may be defined using the RS symbol structure of the legacy LTE PUCCH Format 2/2a/2b.

PUCCH Format 3 according to the embodiment of the present invention may be used to transmit UCI of any type/size. For example, information such as HARQ ACK/NACK, CQI, PMI, RI, and SR may be transmitted in PUCCH Format 3 according to the embodiment of the present invention. This information may have a payload of any size. For convenience, the following description will focus on transmission of ACK/NACK information in PUCCH Format 3 according to the present invention.

FIGS. 29 to 32 illustrate the structure of PUCCH Format 3 that can be used in the present invention and a signal processing operation for PUCCH Format 3. Especially, FIGS. 29 to 32 illustrate a DFT-based PUCCH format. According to the DFT-based PUCCH structure, a PUCCH is DFT-precoded and spread with a time-domain OC at an SC-FDMA level, prior to transmission. Hereinafter, the DFT-based PUCCH format will be referred to as PUCCH Format 3.

Figure 29:
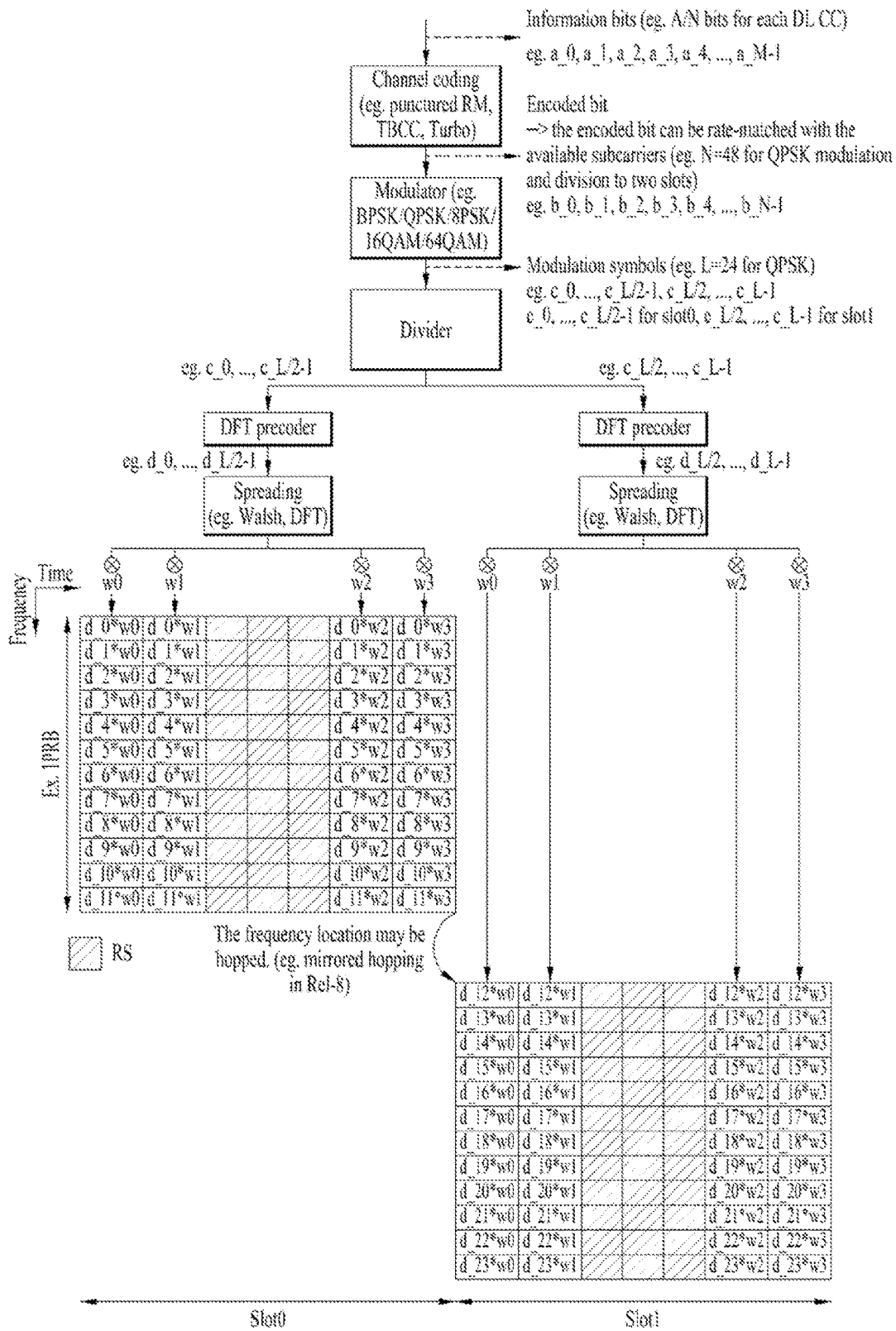
FIGS. 29 to 32 illustrate PUCCH format 3 and a signal processing procedure for the same according to an embodiment of the present invention.

FIG. 29 illustrates an exemplary structure of PUCCH Format 3 using an OC with SF=4. Referring to FIG. 29, a channel coding block channel-encodes transmission bits $a\_0, a\_1, \ldots, a\_M-1$ (e.g. multiple ACK/NACK bits), thus creating coded bits (or a codeword), $b\_0, b\_1, \ldots, b\_N-1$. M is the size of transmission bits and N is the size of coded bits. The transmission bits include UCI, for example, multiple ACKs/NACKs for a plurality of data (or PDSCHs) received on a plurality of DL CCs. Herein, the transmission bits $a\_0, a\_1, \ldots, a\_M-1$ are jointly encoded irrespective of the type, number, or size of UCI that forms the transmission bits. For example, if the transmission bits include multiple ACKs/NACKs for a plurality of DL CCs, channel coding is performed on the entire bit information, rather than per DL CC or per ACK/NACK bit. A single codeword is generated by channel coding. Channel coding includes, without being limited to, repetition, simplex coding, RM coding, punctured RM coding, tail-biting convolutional coding (TBCC), low-density parity-check (LDPC) coding, or turbo coding. While not shown, the coded bits may be rate-matched, taking into account modulation order and the amount of resources. The rate matching function may be incorporated into the channel coding block or implemented in a separate functional block. For example, the channel coding block may produce a single codeword by performing (32, 0) RM coding on a plurality of pieces of control information and may subject the single codeword to cyclic buffer rate-matching.

A modulator generates modulation symbols $c\_0, c\_1, \ldots c\_L-1$ by modulating the coded bits $b\_0, b\_1, \ldots, b\_M-1$. L is the size of modulation symbols. A modulation scheme is performed by changing the amplitude and phase of a transmission signal. The modulation scheme may be n-phase shift keying (n-PSK) or n-quadrature amplitude modulation (QAM) (n being 2 or a larger integer). More specifically, the modulation scheme may be BPSK, QPSK, 8-PSK, QAM, 16-QAM, or 64-QAM.

A divider divides the modulation symbols $c\_0, c\_1, \ldots, c\_L-1$ into slots. The order/pattern/scheme of dividing modulation symbols into slots is not limited to a specific one. For instance, the divider may divide the modulation symbols into slots, sequentially starting from the first modulation symbol (localized scheme). In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1. When the modulation symbols are allocated to the slots, they may be interleaved (or permuted). For example, even-numbered modulation symbols may be allocated to slot 0 and odd-numbered modulation symbols may be allocated to slot 1. Division may precede modulation.

A DFT precoder performs DFT precoding (e.g. 12-point DFT) on the modulation symbols allocated to the slots in order to generate a single carrier waveform. Referring to FIG. 29, the modulation symbols $c\_0, c\_1, \ldots, c\_L/2-1$ allocated to slot 0 are DFT-precoded to $d\_0, d\_1, \ldots, d\_L/2-1$ and the modulation symbols $c\_L/2, c\_L/2+1, \ldots, c\_L-1$ allocated to slot 1 are DFT-precoded to $d\_L/2, d\_L/2+1, \ldots, d\_L-1$. DFT precoding may be replaced with another linear operation (e.g. Walsh precoding).

A spreading block spreads DFT signals at an SC-FDMA symbol level (in the time domain). The SC-FDMA symbol-level time-domain spreading is performed using a spreading code (sequence). The spreading code includes a quasi-orthogonal code and an orthogonal code. The quasi-orthogonal code includes, without being limited to, a PN (pseudo noise) code. The orthogonal code includes, without being limited to, a Walsh code and a DFT code. While an orthogonal code is taken as a main example of the spreading code herein for convenience, the orthogonal code may be replaced with a quasi-orthogonal code. The maximum value of a spreading code size (or a spreading factor (SF)) is limited by the number of SC-FDMA symbols used to transmit control information. For example, if four SC-FDMA symbols carry control information in one slot, an orthogonal code of length 4, w0, w1, w2, w3 can be used in each slot. The SF means the degree to which control information is spread. The SF may be related to the multiplexing order or antenna multiplexing order of a UE. The SF may be changed to 1, 2, 3, 4, . . . depending on system requirements. An SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted to a time-domain signal by IFFT. A CP is added to the time-domain signal and the resulting SC-FDMA symbols are transmitted through an RF end.

On the assumption that ACKs/NACKs are transmitted for five DL CCs, each operation will be described in greater detail. If each DL CC can deliver two PDSCHs, ACK/NACK bits for the PDSCHs may be 12 bits, including a DTX state. Given QPSK and time spreading with SF=4, the size of a coding block (after rate matching) may be 48 bits. The coded bits are modulated to 24 QPSK symbols and the QPSK symbols are divided into two slots, 12 QPSK symbols for each slot. The 12 QPSK symbols of each slot are converted into 12 DFT symbols by 12-point DFT, spread to four SC-FDMA symbols using an OC with SF=4 in the time domain, and then mapped. Because 12 bits are transmitted on [2 bits×12 subcarriers×8 SC-FDMA symbols], the coding rate is 0.0625 (=12/192). If SF=4, up to four UEs may be multiplexed per PRB.

Figure 30:
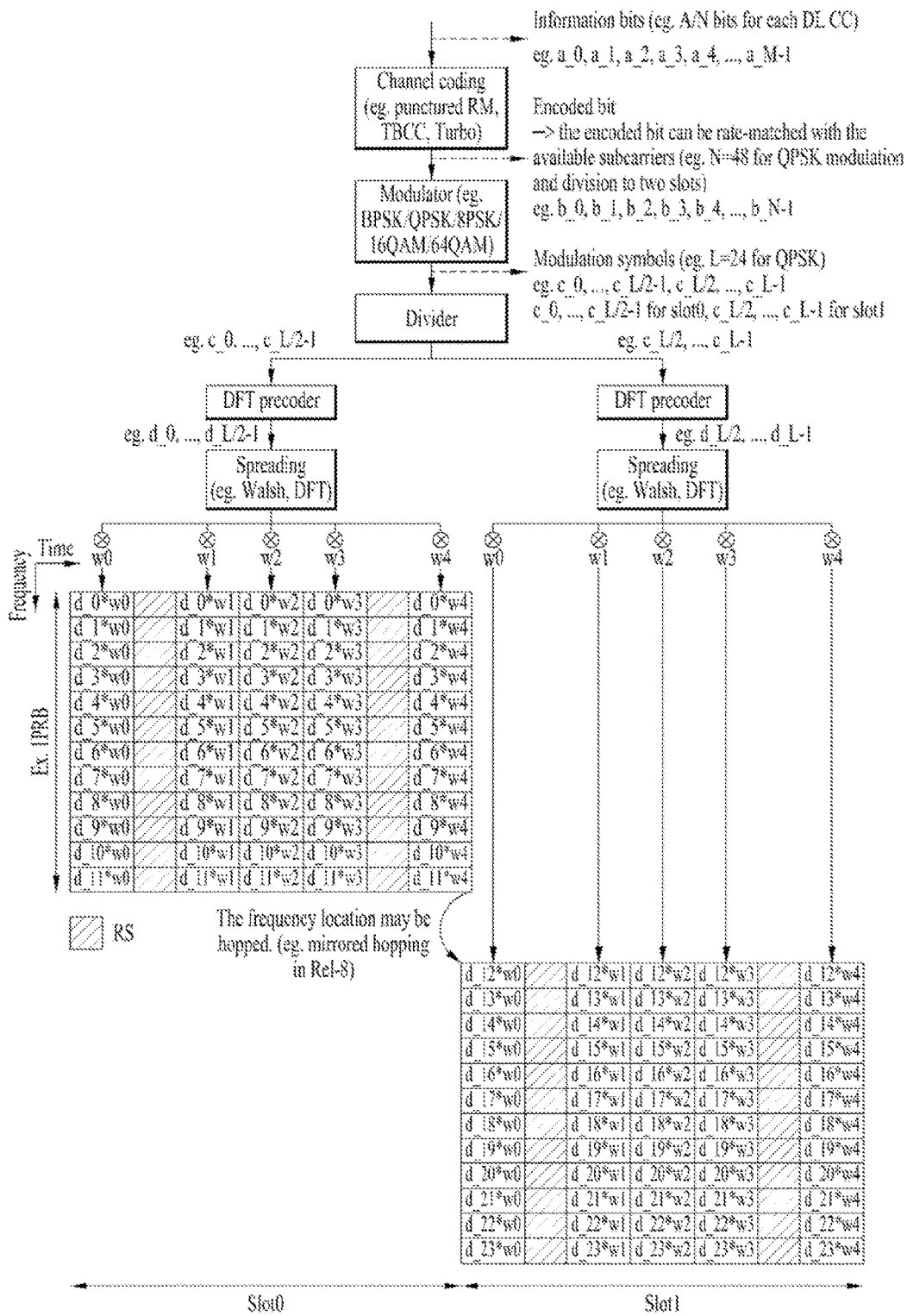

FIG. 30 illustrates an exemplary structure of PUCCH Format 3 using an OC with SF=5.

The basic signal processing operation is performed in the same manner as described with reference to FIG. 29 except for the number and positions of UCI SC-FDMA symbols and RS SC-FDMA symbols. A spreading block may be generated in advance at the front end of a DFT precoder.

In FIG. 30, RSs may be configured in the same configuration as used in the LTE system. For example, a base sequence may be cyclically shifted. The multiplexing capacity of a data part is 5 in view of SF=5. However, the multiplexing capacity of an RS part is determined by a CS interval $\Delta_{shift}^{PUCCH}$. For example, given a multiplexing capacity of $12/\Delta_{shift}^{PUCCH}$, the multiplexing capacities for the cases where $\Delta_{shift}^{PUCCH}=1$, $\Delta_{shift}^{PUCCH}=2$, and $\Delta_{shift}^{PUCCH}=3$ are respectively 12, 6, and 4. In FIG. 30, while the multiplexing capacity of the data part is 5 due to SF=5, the multiplexing capacity of the RS part is 4 in case of $\Delta_{shift}^{PUCCH}$. Therefore, overall multiplexing capacity may be limited to the smaller of the two values, 4.

Figure 31:
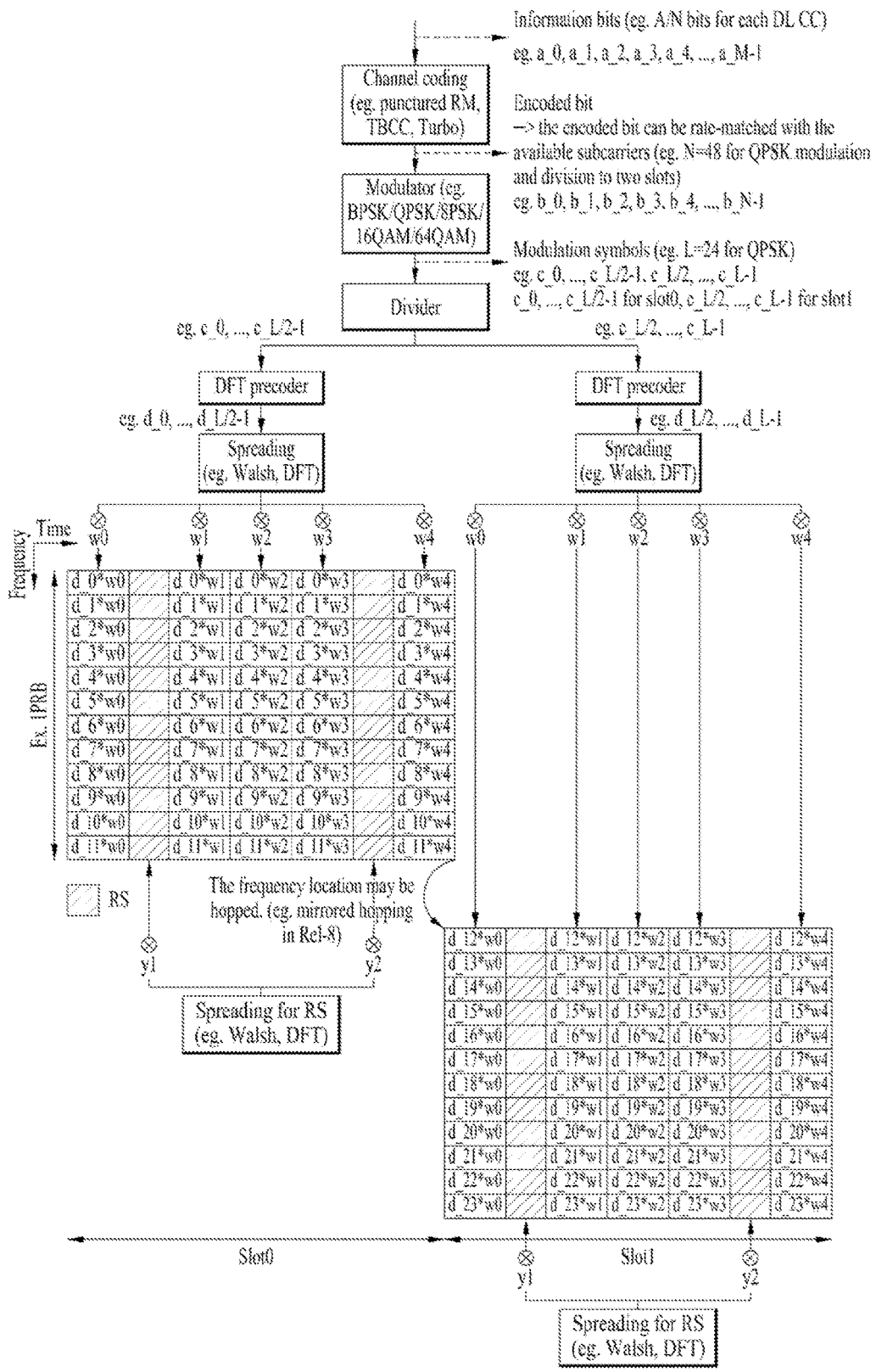

FIG. 31 illustrates an exemplary structure of PUCCH Format 3 that can increase a multiplexing capacity at a slot level.

Overall multiplexing capacity can be increased by applying SC-FDMA symbol-level spreading described with reference to FIGS. 29 and 30 to RSs. Referring to FIG. 31, the multiplexing capacity is doubled by applying a Walsh cover (or a DFT code cover) within a slot. As a consequence, the multiplexing capacity is 8 even in case of $\Delta_{shift}^{PUCCH}$, thereby preventing a decrease in the multiplexing capacity of a data part. In FIG. 31, an OC for RSs may be [y1 y2], [1 1], [y1 y2], [1 −1], or their modification (e.g. [j j] [j −j], [1 j] [1 −j], etc.).

Figure 32:
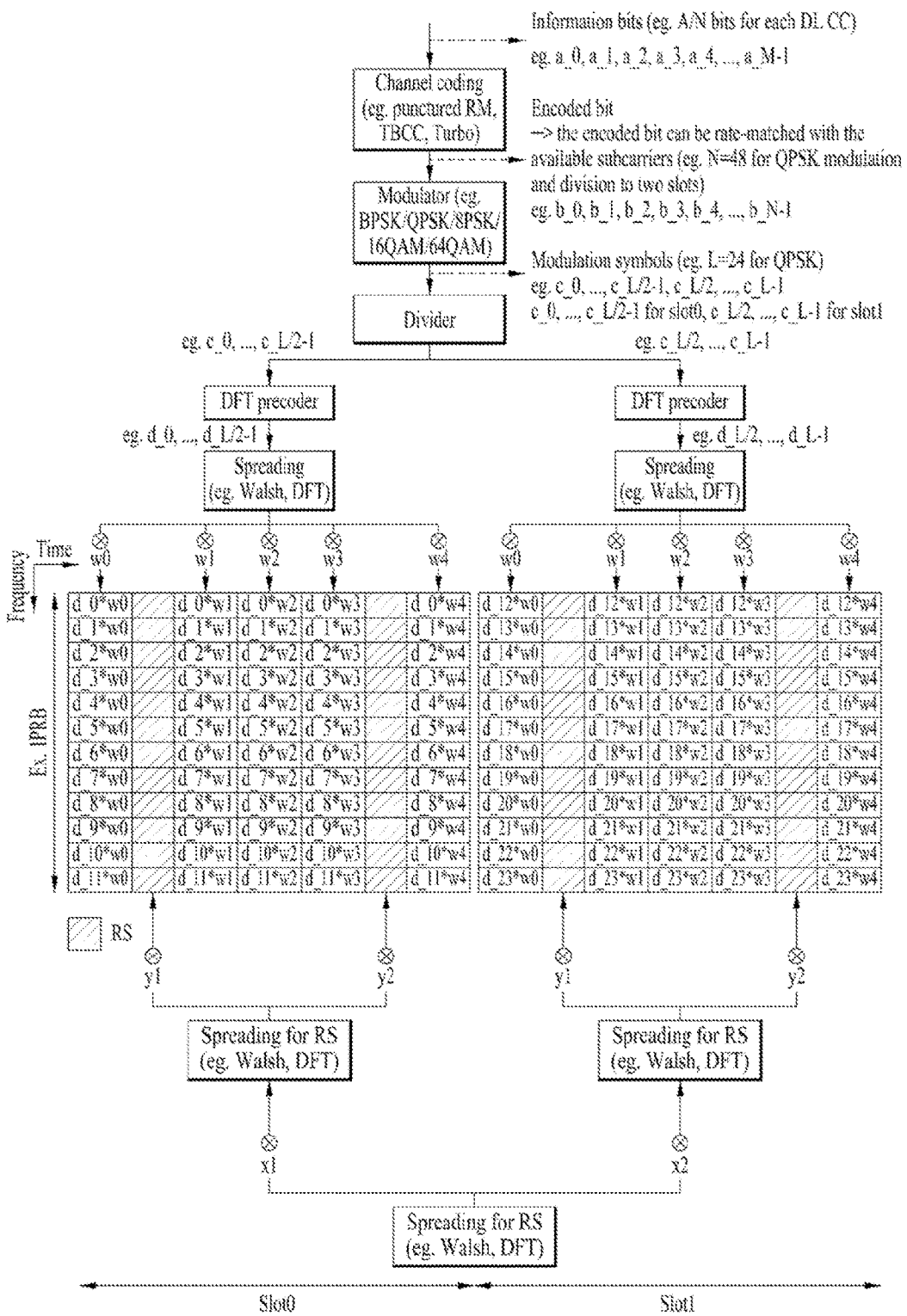

FIG. 32 illustrates an exemplary structure of PUCCH Format 3 that can increase a multiplexing capacity at a subframe level.

Without slot-level frequency hopping, use of a Walsh cover on a slot basis can further double a multiplexing capacity. As described before, [x1 x2]=[1 1], [1 −1], or a modification thereof may be used as an OC.

For reference, the processing operation of PUCCH Format 3 is not limited to the orders illustrated in FIGS. 29 to 32.

FIG. 33 illustrates an ACK/NACK information transmission structure using channel selection to which the present invention is applied. Referring to FIG. 33, two PUCCH resources or PUCCH channels (PUCCH resources #0 and #1 or PUCCH channels #0 and #1) can be set for PUCCH format 1b for 2-bit ACK/NACK information.

If 3-bit ACK/NACK information is transmitted, 2 bits of the 3-bit ACK/NACK information can be represented according to PUCCH format 1b and the remaining 1 bit can be represented according to which one of the two PUCCH resources is selected. For example, 1 bit (2 cases) can be represented by selecting transmission of the ACK/NACK information using PUCCH resource #0 or transmission of the ACK/NACK information using PUCCH resource #1. In this manner, the 3-bit ACK/NACK information can be represented.

Table 11 shows an example of transmission of 3-bit ACK/NACK information using channel selection on the assumption that two PUCCH resources are set.

TABLE 11

| ACK/NACK | Ch1 RS | Ch1 Data | Ch2 RS | Ch2 Data |
|---|---|---|---|---|
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |
| A, N, A | 0 | 0 | 1 | −j |

TABLE 11-continued

| ACK/NACK | Ch1 RS | Ch1 Data | Ch2 RS | Ch2 Data |
|---|---|---|---|---|
| A, A, N | 0 | 0 | 1 | j |
| A, A, A | 0 | 0 | 1 | −1 |

In Table 11, 'A' denotes ACK information and 'N' denotes NACK information or NACK/DTX information. In addition, '1, −1, j and −j' represent four complex modulated symbols obtained by modulating 2 bits of information, b(0)b(1), transmitted in a PUCCH format, according to QPSK. Here, b(0)b(1) correspond binary bits transmitted using a selected PUCCH resource. For example, b(0)b(1) can be mapped to a complex modulated symbol and transmitted through a PUCCH resource.

TABLE 12

| Modulation | Binary transmission bits b(0), b(1) | Complex modulation symbol |
|---|---|---|
| QPSK | 0, 0 | 1 |
|  | 0, 1 | −j |
|  | 1, 0 | j |
|  | 1, 1 | −1 |

FIG. 34 illustrates an ACK/NACK information transmission structure using enhanced channel selection to which the present invention is applied. While FIG. 34 shows that PUCCH #0 and PUCCH #1 correspond to different time/frequency regions, PUCCH #0 and PUCCH #1 can be configured to use different codes in the same time/frequency region. Referring to FIG. 34, two PUCCH resources (PUCCH resources #0 and #1) can be set for PUCCH format 1a for 1-bit ACK/NACK information transmission.

If 3-bit ACK/NACK information is transmitted, 1 bit thereof can be represented using PUCCH format 1a and another 1 bit can be represented according to which one of the PUCCH resources (PUCCH resources #0 and #1) is used to transmit the ACK/NACK information. The remaining 1 bit can be represented based on a reference signal corresponding to a corresponding PUCCH resource. While the reference signal is preferably transmitted in the time/frequency region corresponding to a PUCCH resource (PUCCH resource #0 or #1) selected first, the reference signal may be transmitted in a time/frequency region with respect to the PUCCH resource corresponding thereto.

That is, 2 bits (4 cases) can be represented by selecting one of a case in which the ACK/NACK information is transmitted through PUCCH resource #0 and a reference signal corresponding to PUCCH resource #0 is transmitted, a case in which the ACK/NACK information is transmitted through PUCCH resource #1 and a reference signal corresponding to PUCCH resource #1 is transmitted, a case in which the ACK/NACK information is transmitted through PUCCH resource #0 and a reference signal corresponding to PUCCH resource #1 is transmitted, and a case in which the ACK/NACK information is transmitted through PUCCH resource #1 and a reference signal corresponding to PUCCH resource #0 is transmitted. In this manner, the 3-bit ACK/NACK information can be represented.

Table 13 shows an example of transmission of 3-bit ACK/NACK information using enhanced channel selection on the assumption that two PUCCH resources are set.

TABLE 13

| ACK/NACK | Ch1 | | Ch2 | |
| --- | --- | --- | --- | --- |
| | RS | Data | RS | Data |
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

In the case of transmission of 3-bit ACK/NACK information using enhanced channel selection, shown in Table 13, symbols mapped to PUCCH resources can be obtained according to BPSK, distinguished from ACK/NACK information transmission using channel selection, shown in Table 12. However, complex symbols can be obtained according to QPSK using PUCCH format 1b, differently from the example of FIG. 13. In this case, the number of bits that can be transmitted through the same PUCCH resource can be increased.

While FIGS. 33 and 34 illustrate a case in which two PUCCH resources are set for 3-bit ACK/NACK information transmission, the number of bits of transmitted ACK/NACK information and the number of PUCCH resources can be varied. Furthermore, the ACK/NACK information transmission structures can be equally applied to transmission of uplink control information other than ACK/NACK information or simultaneous transmission of ACK/NACK information and uplink control information.

Table 14 shows an example of transmission of six ACK/NACK states using channel selection when two PUCCH resources are set.

TABLE 14

| HARQ-ACK(0), HARQ-ACK(1) | $n^{(1)}_{PUCCH}$ | b(0), b(1) |
| --- | --- | --- |
| ACK, ACK | $n^{(1)}_{PUCCH, 1}$ | 1, 1 |
| ACK, NACK/DTX | $n^{(1)}_{PUCCH, 0}$ | 0, 1 |
| NACK/DTX, ACK | $n^{(1)}_{PUCCH, 1}$ | 0, 0 |
| NACK/DTX, NACK | $n^{(1)}_{PUCCH, 1}$ | 1, 0 |
| NACK, DTX | $n^{(1)}_{PUCCH, 0}$ | 1, 0 |
| DTX, DTX | N/A | N/A |

Table 15 shows an example of transmission of eleven ACK/NACK states using channel selection when three PUCCH resources are set.

TABLE 15

| HARQ-ACK(0), HARQ-ACK(1), HARQ-ACK(2) | $n^{(1)}_{PUCCH}$ | b(0), b(1) |
| --- | --- | --- |
| ACK, ACK, ACK | $n^{(1)}_{PUCCH, 2}$ | 1, 1 |
| ACK, ACK, NACK/DTX | $n^{(1)}_{PUCCH, 1}$ | 1, 1 |
| ACK, NACK/DTX, ACK | $n^{(1)}_{PUCCH, 0}$ | 1, 1 |
| ACK, NACK/DTX, NACK/DTX | $n^{(1)}_{PUCCH, 0}$ | 0, 1 |
| NACK/DTX, ACK, ACK | $n^{(1)}_{PUCCH, 2}$ | 1, 0 |
| NACK/DTX, ACK, NACK/DTX | $n^{(1)}_{PUCCH, 1}$ | 0, 0 |
| NACK/DTX, NACK/DTX, ACK | $n^{(1)}_{PUCCH, 2}$ | 0, 0 |
| DTX, DTX, NACK | $n^{(1)}_{PUCCH, 2}$ | 0, 1 |
| DTX, NACK, NACK/DTX | $n^{(1)}_{PUCCH, 1}$ | 1, 0 |
| NACK, NACK/DTX, NACK/DTX | $n^{(1)}_{PUCCH, 0}$ | 1, 0 |
| DTX, DTX, DTX | N/A | N/A |

Table 16 shows an example of transmission of twenty ACK/NACK states using channel selection when four PUCCH resources are set.

TABLE 16

| HARQ-ACK(0), HARQ-ACK(1), HARQ-ACK(2), HARQ-ACK(3) | $n^{(1)}_{PUCCH}$ | b(0), b(1) |
| --- | --- | --- |
| ACK, ACK, ACK, ACK | $n^{(1)}_{PUCCH, 1}$ | 1, 1 |
| ACK, ACK. ACK, NACK/DTX | $n^{(1)}_{PUCCH, 1}$ | 1, 0 |
| NACK/DTX, NACK/DTX, NACK, DTX | $n^{(1)}_{PUCCH, 2}$ | 1, 1 |
| ACK, ACK, NACK/DTX, ACK | $n^{(1)}_{PUCCH, 1}$ | 1, 0 |
| NACK, DTX, DTX, DTX | $n^{(1)}_{PUCCH, 0}$ | 1, 0 |
| ACK, ACK, NACK/DTX, NACK/DTX | $n^{(1)}_{PUCCH, 1}$ | 1, 0 |
| ACK, NACK/DTX, ACK, ACK | $n^{(1)}_{PUCCH, 3}$ | 0, 1 |
| NACK/DTX, NACK/DTX, NACK/DTX, NACK | $n^{(1)}_{PUCCH, 3}$ | 1, 1 |
| ACK, NACK/DTX, ACK, NACK/DTX | $n^{(1)}_{PUCCH, 2}$ | 0, 1 |
| ACK, NACK/DTX, NACK/DTX, ACK | $n^{(1)}_{PUCCH, 0}$ | 0, 1 |
| ACK, NACK/DTX, NACK/DTX, NACK/DTX | $n^{(1)}_{PUCCH, 0}$ | 1, 1 |
| NACK/DTX, ACK, ACK, ACK | $n^{(1)}_{PUCCH, 3}$ | 0, 1 |
| NACK/DTX, NACK, DTX, DTX | $n^{(1)}_{PUCCH, 1}$ | 0, 0 |
| NACK/DTX, ACK, ACK, NACK/DTX | $n^{(1)}_{PUCCH, 2}$ | 1, 0 |
| NACK/DTX, ACK, NACK/DTX, ACK | $n^{(1)}_{PUCCH, 3}$ | 1, 0 |
| NACK/DTX, ACK, NACK/DTX, NACK/DTX | $n^{(1)}_{PUCCH, 1}$ | 0, 1 |
| NACK/DTX, NACK/DTX, ACK, ACK | $n^{(1)}_{PUCCH, 3}$ | 0, 1 |
| NACK/DTX, NACK/DTX, ACK, NACK/DTX | $n^{(1)}_{PUCCH, 2}$ | 0, 0 |
| NACK/DTX, NACK/DTX, NACK/DTX, ACK | $n^{(1)}_{PUCCH, 3}$ | 0, 0 |
| DTX, DTX, DTX, DTX | N/A | N/A |

A UE collects responses to cases that require a plurality of ACK/NACK feedbacks received from a PCell DL CC and SCell DL CCs (through multiplexing, bundling, etc., for example) and transmits the responses using a PUCCH in a UL CC in a PCell.

Cases that require HARQ ACK/NACK feedback for a DL CC can include the following three.

First, HARQ ACK/NACK feedback can be required in the case of Table 17.

TABLE 17

For a PDSCH(s) transmission indicated by the detection of a corresponding PDCCH(s) in subframe(s) n − k, where k ∈ K and K is a set of M elements {k$_0$, k$_1$, . . . k$_{M-1}$} depending on the subframe n and the UL-DL configuration.

Table 17 represents a PDSCH(s) that requires normal A/N feedback. The PDSCH can be present in DL PCell and SCells. This PDSCH is called TDSCH with PDCCH' in the following description for convenience.

HARQ ACK/NACK feedback can be required in the case of Table 18.

TABLE 18

For a PDCCH(s) indicating downlink SPS release in subframe(s) n − k, where k ∈ K and K is a set of M elements {k$_0$, k$_1$, . . . k$_{M-1}$} depending on the subframe n and the UL-DL configuration.

Table 18 represents A/N feedback for PDCCH(s) for SPS release. Here, only one PDSCH without corresponding PDCCH can be present over one or more DL cells in one subframe. A/N feedback for PDCCH(s) indicating DL SPS (semi-persistent scheduling) release may be performed whereas A/N feedback for PDCCH(s) indicating DL SPS activation may not be performed. This PDCCH can be present only in a DL PCell. This case is referred to as 'DL SPS release' in the following description for convenience.

HARQ ACK/NACK feedback can be required in the case of Table 19.

TABLE 19

For a PDSCH(s) transmission where there is not a corresponding PDCCH detected in subframe(s) n − k, where k ∈ K and K is a set of M elements {$k_0, k_1, \ldots k_{M-1}$} depending on the subframe n and the UL-DL configuration.

Table 19 represents A/N feedback for PDSCH(s) without PDCCH(s) indicating SPS. Only one PDSCH without corresponding PDCCH can be present over one or more DL cells in one subframe. This PDSCH can be present only in a DL PCell. This case is referred to as 'DL SPS' in the following description for convenience.

HARQ ACK/NACK feedback events described using Tables 17, 18 and 19 are exemplary and HARQ ACK/NACK feedback may be performed when other events are generated.

In Tables 17, 18 and 19, M denotes the number of elements of a set K and HARQ-ACK transmission timing for DL reception and K can be represented according to subframe position (n) and TDD UL-DL configuration, as shown in Table 20.

TABLE 20

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 35:
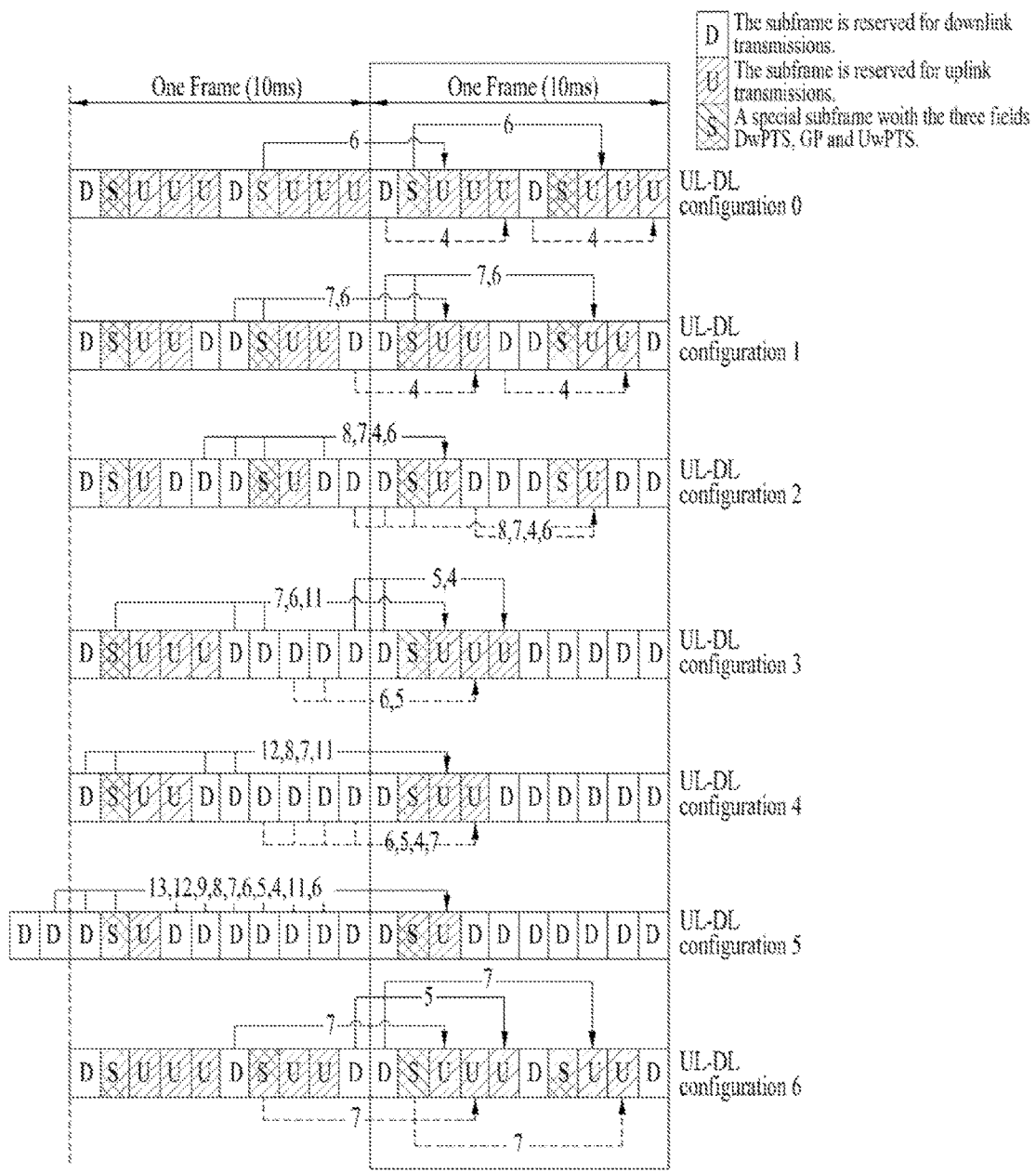
FIG. 35 illustrates an example of ACK/NACK feedback in TDD with respect to the present invention.
Figure 37:
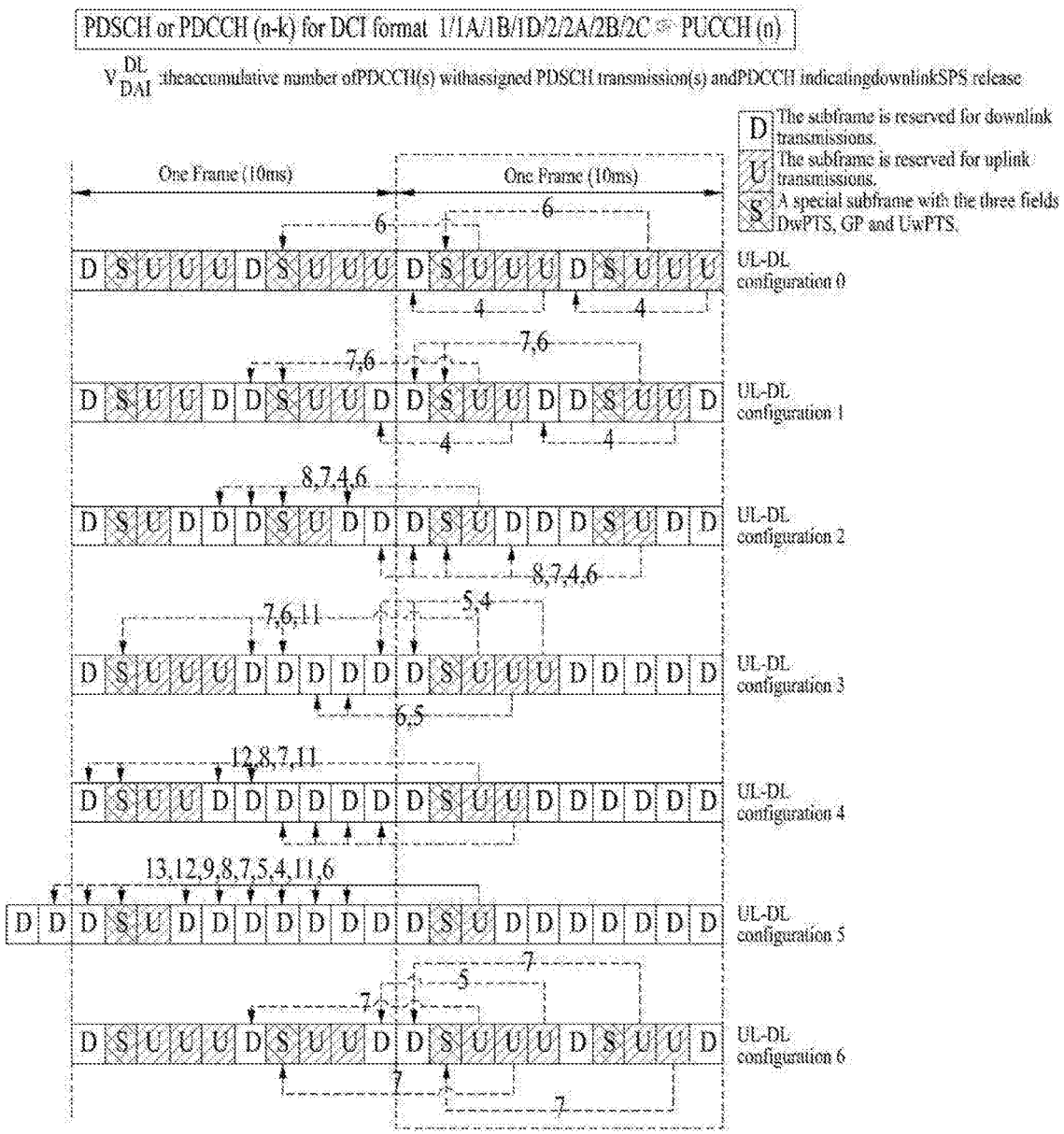
FIG. 37 illustrates a PDSCH or PDCCH in a subframe n−k corresponding to PUCCH transmission in a subframe n for DCI format 1/1A/1B/1D/2/2A/2B/2C.

Table 20 can be represented as FIG. 35 or 37.

FIGS. 35 and 37 illustrate ACK/NACK feedback for DL subframes according to Table 20 when ACK/NACK feedback is performed in UL subframes in the second of two frames.

For example, in the case of UL-DL configuration #0 shown in FIG. 35, six UL subframes are present in one frame. In the first UL subframe of the second frame, ACK/NACK for a special subframe (of the first frame) corresponding to the sixth subframe from the first UL subframe is fed back. In the second UL subframe of the second frame, no ACK/NACK is fed back. In the third UL subframe of the second frame, ACK/NACK for a DL subframe corresponding to the fourth subframe from the third UL subframe and being prior to the third UL subframe is fed back. In the fourth UL subframe of the second frame, ACK/NACK for a special subframe corresponding to the sixth subframe from the fourth UL subframe and being prior to the fourth UL subframe is fed back. In the fifth UL subframe of the second frame, no ACK/NACK is fed back. In the sixth UL subframe of the second frame, ACK/NACK for a DL subframe corresponding to the fourth subframe from the sixth UL subframe and being prior to the sixth UL subframe is fed back.

In the case of UL-DL configuration #1 shown in FIG. 35, four UL subframes are present in one frame. In the first UL subframe of the second frame, ACK/NACK for a DL subframe (of the first frame), which is the seventh one from the first UL subframe, and ACK/NACK for a special subframe (of the first frame), which is the sixth one from the first UL subframe, are multiplexed or bundled and fed back. In the second UL subframe, ACK/NACK for a DL subframe (of the first frame), which is the fourth one from the second UL subframe, is fed back. In the third UL subframe, ACK/NACK for a DL subframe, which is the seventh one from the third UL subframe, and ACK/NACK for a special subframe, which is the sixth one from the third UL subframe, are multiplexed or bundled and fed back. In the fourth UL subframe, ACK/NACK for a DL subframe, which is the fourth subframe from the fourth UL subframe, is fed back. While description of operations in other UL-DL configurations is omitted for convenience, ACK/NACK feedback is performed in the same manner as in UL-DL configurations #0 and #1.

That is, the position of a DL subframe corresponding to ACK/NACK fed back in each UL subframe depends on TDD UL-DL configuration and UL subframe position in TDD.

In FDD, M is always 1 and K is always {$k_0$}={4}.

In the meantime, cross-scheduling from a PCell to an SCell(s) may be supported whereas cross-scheduling from the SCell(s) to the PCell may not be supported.

When a cell(s) cross-scheduled from another cell is present, additional PDSCH allocation may not be performed in the cell(s). That is, a specific cell can be cross-scheduled only from a specific cell.

Cross-carrier scheduling is a scheme in which a control channel transmitted through a primary CC schedules a data channel transmitted through the primary CC or another CC using a carrier indicator field (CIF).

Figure 36:
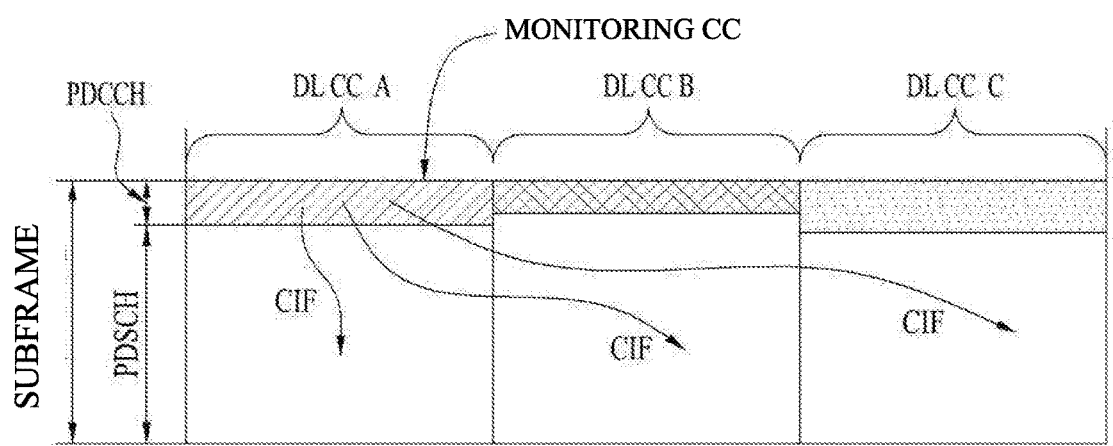
FIG. 36 illustrates cross-carrier scheduling with respect to the present invention.

FIG. 36 illustrates cross-carrier scheduling. In FIG. 36, the number of cells (or CCs) allocated to a relay node is 3 and cross-carrier scheduling is performed using the CIF as described above. Here, DL cell (or DL CC) #A is assumed as a primary DL CC (i.e. primary cell; PCell) and other CCs #B and #C are assumed as secondary CCs (i.e. secondary cells; SCells).

It is assumed that a UE is configured to performed communication through two CCs in the following.

One of the two CCs is referred to as a primary CC (PCC or PCell) and the other is referred to as a secondary CC (SCC or SCell).

In addition, it is assumed that the UE receives various control signals including a PDCCH through the PCell and data transmission and reception of the SCell is cross-carrier scheduled according to a control signal in the PCell.

The following description is given based on an FDD system using CC #1 (DL PCell, LTE-A frequency band), CC #3 (UL PCell, LTE-A frequency band) and CC #2 (SCell, unlicensed band).

Intra-band CA is considered first for a CA environment, in general. A band used in intra-band and inter-band refers to an operating band and can be defined as follows.

That is, the operating band represents a frequency range in E-UTRA operating in a paired or unpaired manner and can be defined as a specific set according to technical requirements.

For example, operating bands used in LTE can be defined as shown in Table 21.

TABLE 21

| E-UTRA Operating Band | Uplink (UL) operating band BS receive UE transmit $F_{UL\,low}$-$F_{UL\,high}$ | Downlink (DL) operating band BS transmit UE receive $F_{DL\,low}$-$F_{DL\,high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 [1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note
[1] Band 6 is not applicable.

Intra-band CA refers to positioning of a plurality of DL CCs and/or UL CCs in the frequency domain in a contiguous or non-contiguous manner.

In other words, intra-band CA can refer to positioning of carrier frequencies of a plurality of DL CCs and/or UL CCs in the same (operating) band.

Accordingly, a plurality of CCs can be designed on the assumption that the CCs have similar propagation characteristics through intra-band CA. The propagation characteristics include propagation/path delay, propagation/path loss, fading channel impact, etc. depending on frequency (or center frequency).

The UE sets uplink transmission timing for a primary cell UL CC.

Uplink transmission timing for the secondary cell corresponds to uplink transmission timing for the primary cell on the above assumption (that CCs have similar propagation/path delays). However, PRACH (physical random access channel) transmission timing may be different.

Through the above-described procedure, inter-cell UL subframe boundaries in the UE can be adjusted to correspond to each other. Accordingly, the UE can perform communication in a CA environment using a single radio frequency (RF) terminal.

However, one or more cells may not be contiguous to other cells in the frequency domain in a CA environment because of problems with respect to frequency allocation to mobile carriers (allocation of remaining frequencies, reuse of frequencies previously used for other purposes, etc.) for mobile communication.

For example, if two cells construct a CA environment, the carrier frequency of one cell can be 800 MHz (UL/DL) and the carrier frequency of the other can be 2.5 GHz (UL/DL).

Alternatively, the carrier frequency of one cell can be 800 MHz (UL/DL) and the carrier frequency of the other can be 2.6 GHz (UL/DL).

Otherwise, the carrier frequency of one cell can be 700 MHz (UL/DL) and the carrier frequency of the other can be 1.7(UL)/2.1(DL) GHz (TDD). Here, the carrier frequency refers to the carrier frequency of a DL CC or UL CC.

An environment in which CCs are spaced apart in the frequency domain, as described above, can be referred to as inter-band CA.

In other words, carrier frequencies of a plurality of DL CCs and/or UL CCs are present in different bands.

In the inter-band CA environment, the assumption that cells have similar propagation characteristics cannot be maintained.

That is, it cannot be assumed that inter-cell (UL) subframe boundaries are adjusted to correspond to each other in the inter-band CA environment. Accordingly, cells need different uplink transmission timings and the UE may use a plurality of RF terminals to perform communication in a CA environment.

Time for detecting a PDSCH (with or without corresponding PDCCH) or PDCCH indicating DL SPS release, which corresponds to PUCCH transmission timing (n-th subframe), can be defined as follows.

A HARQ-ACK response to a PDCCH or PDSCH indicating DL SPS release in subframe n−4 is transmitted through a PUCCH in subframe n in an FDD environment.

HARQ-ACK responses to a PDCCH and/or PDSCH indicating DL SPS release in subframe n−4 are transmitted through a PUCCH in subframe n in a TDD environment. Here, k can depend on TDD UL/DL configuration and subframe position in the TDD UL/DL configuration and have one or more values as a set K (K={$k_0, k_1, \ldots, k_{M-1}$}) in a specific subframe. In other words, a single PUCCH can include HARQ-ACK responses to one or more PDCCHs and/or a PDSCHs indicating DL SPS release. The set K can be configured as shown in Table 20.

A DAI (UL-DL configurations #1 to #6) in DCI format 1/1A/1B/1D/2/2A/2B/2C of a PDCCH can represent the accumulative number of PDCCHs with assigned PDSCH transmission in subframe n−k in each serving cell and a PDCCH indicating DL SPS release.

FIG. 37 illustrates a PDSCH or a PDCCH in subframe n−k corresponding to PUCCH transmission in subframe n for DCI format 1/1A/1B/1D/2/2A/2B/2C. Here, k can depend on TDD UL/DL configuration and subframe position in the TDD UL/DL configuration and have one or more values as a set K (K={$k_0, k_1, \ldots, k_{M-1}$}) in a specific subframe. In other words, a single PUCCH can include HARQ-ACK responses to one or more PDCCHs and/or PUSCHs indicating DL SPS release. The set K can be configured as shown in Table 20.

DCI format 0 or DCI format 4 detection time corresponding to PUSCH transmission time (n-th subframe) can be defined as follows.

DCI format 0 or DCI format 4 in subframe n−k' represents PUSCH allocation in subframe n in TDD.

Here, DAI, $V_{DAI}^{UL}$ (UL-DL configurations #1 to #6), represents the total number of subframes with PDCCH transmission with DCI format 0 or 4 and with PDCCH indicating downlink SPS release within subframe n−k'.

Table 22 shows uplink information regarding index k' for TDD.

TABLE 22

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

Figure 38:
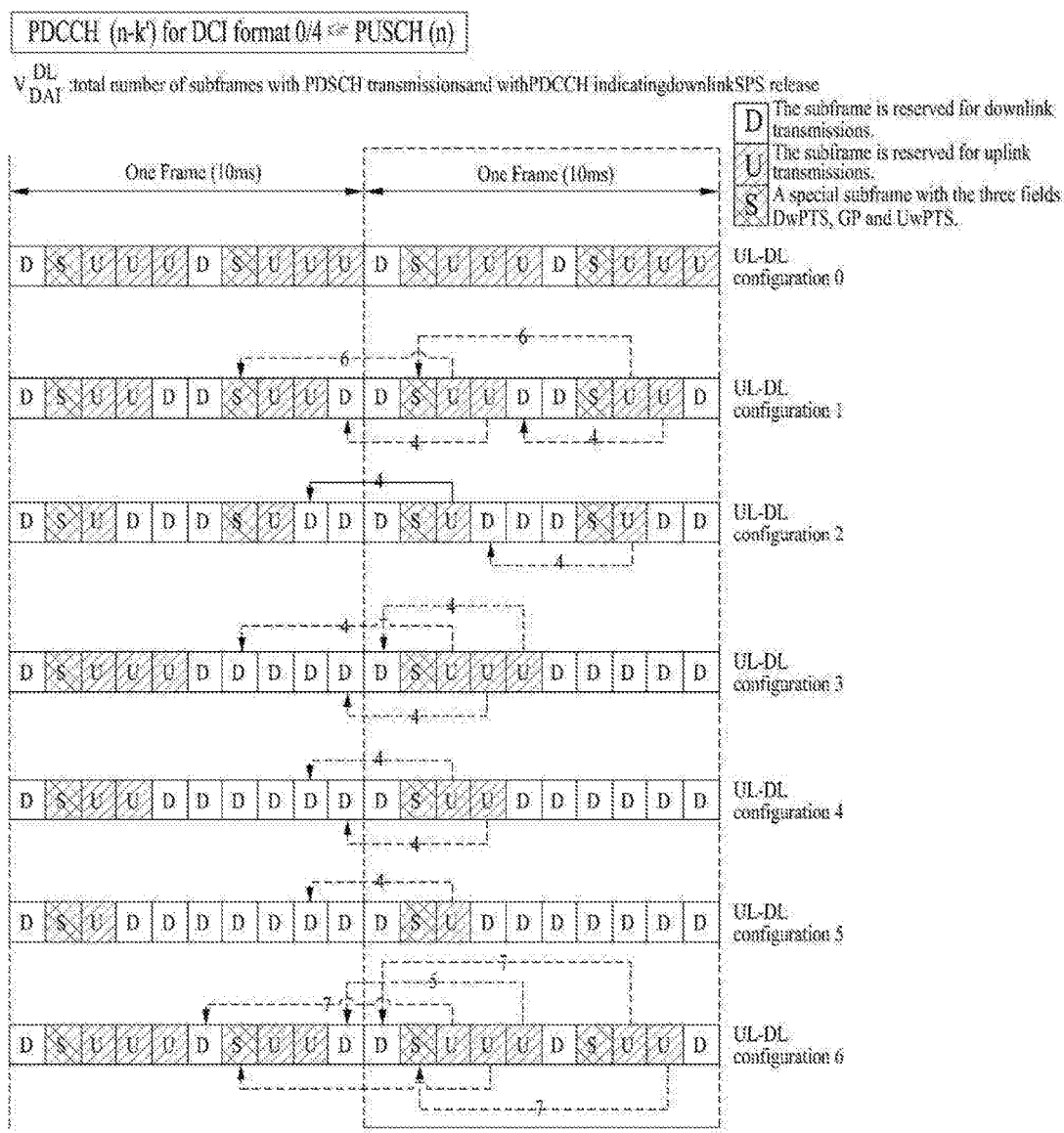
FIG. 38 illustrates a PDCCH subframe n−k' transmitting DCI format 0/4 for allocating a PUSCH in a subframe n.

FIG. 38 illustrates PDCCH subframe n−k' through which DCI format 0/4 for PUSCH allocation in subframe n is transmitted.

PUSCH transmission time corresponding to PDCCH or PHICH detection time (n-th subframe) can be defined as follows.

For FDD and normal HARQ operation, a PDCCH with DCI format 0 or DCI format 4 and/or PHICH transmission in subframe n are associated with a PUSCH in subframe n+4

For FDD and subframe bundling operation, a PDCCH with DCI format 0 in subframe n and/or PHICH transmission in subframe n−5 are associated with the first PUSCH in subframe n+4.

For TDD, normal HARQ operation and UL/DL configurations #1 to #6, a PDCCH with a DCI format and/or PHICH transmission in subframe n are associated with a PUSCH in subframe n+k.

For TDD, normal HARQ operation and UL/DL configuration #0, a PDCCH with a DCI format and/or PHICH transmission in subframe n are associated with (1) a PUSCH in subframe n+k when the MSB of the UL index is set to 1 in the PDCCH with uplink DCI format or the PHICH is received in subframe n=0 or 5 of the resource corresponding to $I_{PHICH}$=0, (2) a PUSCH in subframe n+7 when the LSB of the UL index in DCI format 0 or DCI format 4 is set to 1, the PHICH is received in subframe n=0 or 5 of the resource corresponding to $I_{PHICH}$=0 or the PHICH is received in subframe n=1 or 6 and (3) a PUSCH in subframes n+k and n+7 when both the MSB and LSB of the UL index in the PDCCH using the uplink DCI format are set in subframe n.

For TDD, subframe bundling operation and UL/DL configurations #0 to #6, a PDCCH with DCI format 0 in subframe n and/or PHICH transmission in subframe n−1 are associated with the first PUSCH in subframe n+k.

A PDCCH with DCI format 0 in subframe n and/or PHICH transmission in subframe n−1 can be associated with (1) the first PUSCH in subframe n+k when the MSB of the UL index in DCI format 0 is set to 1 or $I_{PHICH}$=0 for TDD, subframe bundling operation and UL/DL configuration #0 and (2) a PUSCH in subframe n+7 when the LSB of the UL index in the PDCCH using DCI format 0 is set to 1 or $I_{PHICH}$=0 for TDD, UL/DL configuration #0 and subframe bundling operation.

Table 23 shows the value k TDD configurations #0 to #6.

TABLE 23

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Table 23 shows the value k TDD configurations #0, #1 and #6.

TABLE 24

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 9 | 6 | | | | 9 | 6 | | |
| 1 | | 2 | | 3 | | | 2 | | | 3 |
| 6 | 5 | 5 | | | | 6 | 6 | | | 8 |

Figure 39:
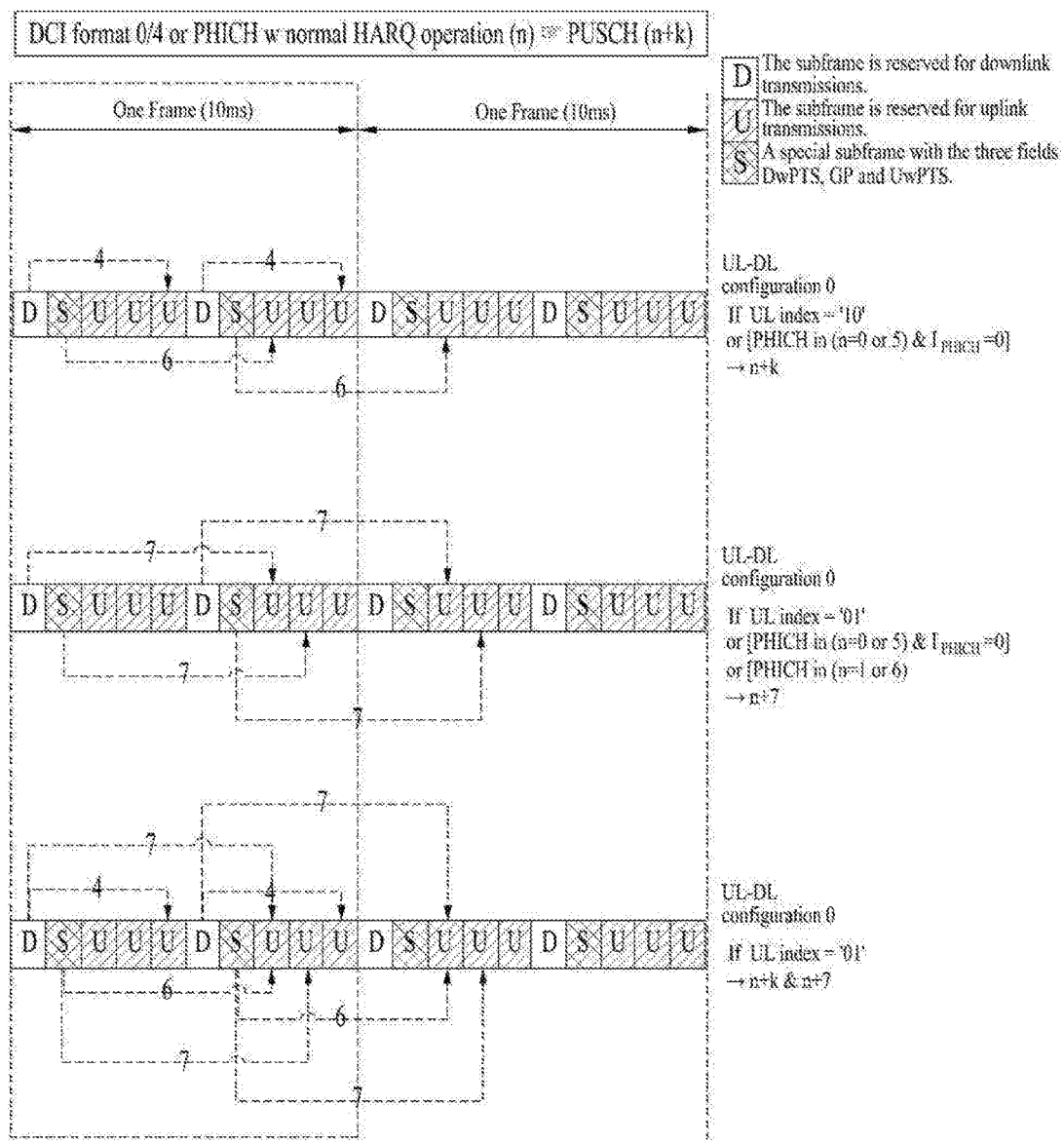
FIG. 39 illustrates a subframe n+k to which a PUSCH is allocated when DCI format 0/4 or a PHICH for normal HARQ operation is transmitted in a subframe n.

FIG. 39 illustrates subframe n+k to which a PUSCH is allocated when DCI format 0/4 or a PHICH for a normal HARQ operation is transmitted in subframe n.

Figure 40:
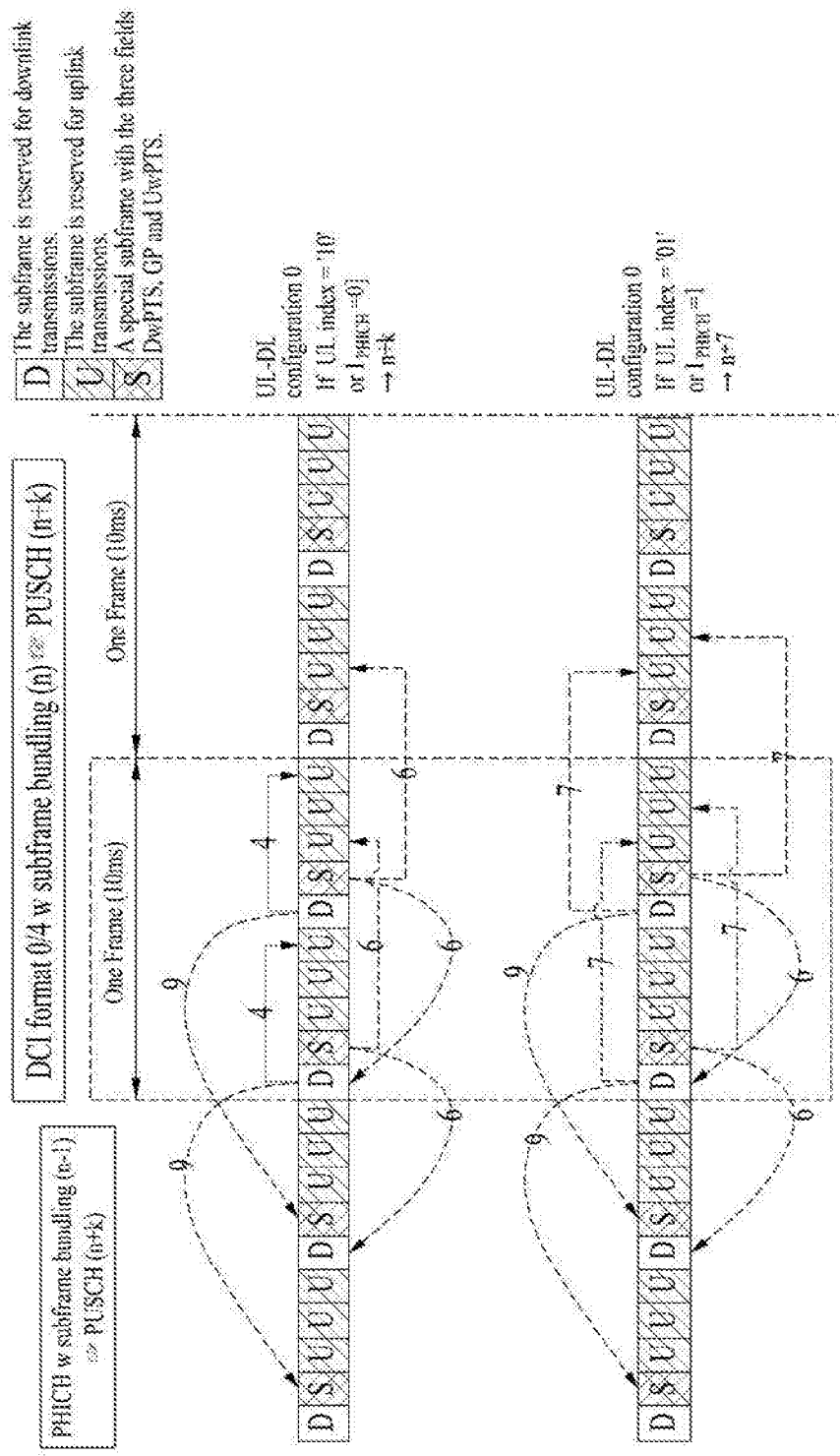
FIG. 40 illustrates an example of transmission of a PUSCH in a subframe n+k when a PHICH corresponding to the PUSCH is transmitted in a subframe n−1 using subframe bundling in TDD UL/DL configuration #0 and an example of transmission of a PUSCH in subframe n+k when DCI format 0/4 is transmitted in subframe n using subframe bundling.

FIG. 40 illustrates transmission of a PUSCH in subframe n+k when a PHICH using subframe bundling is transmitted in subframe n−1 in TDD UL/DL configuration #0 and transmission of a PUSCH in subframe n+k when DCI format 0/4 using subframe bundling is transmitted in subframe n.

Figure 41:
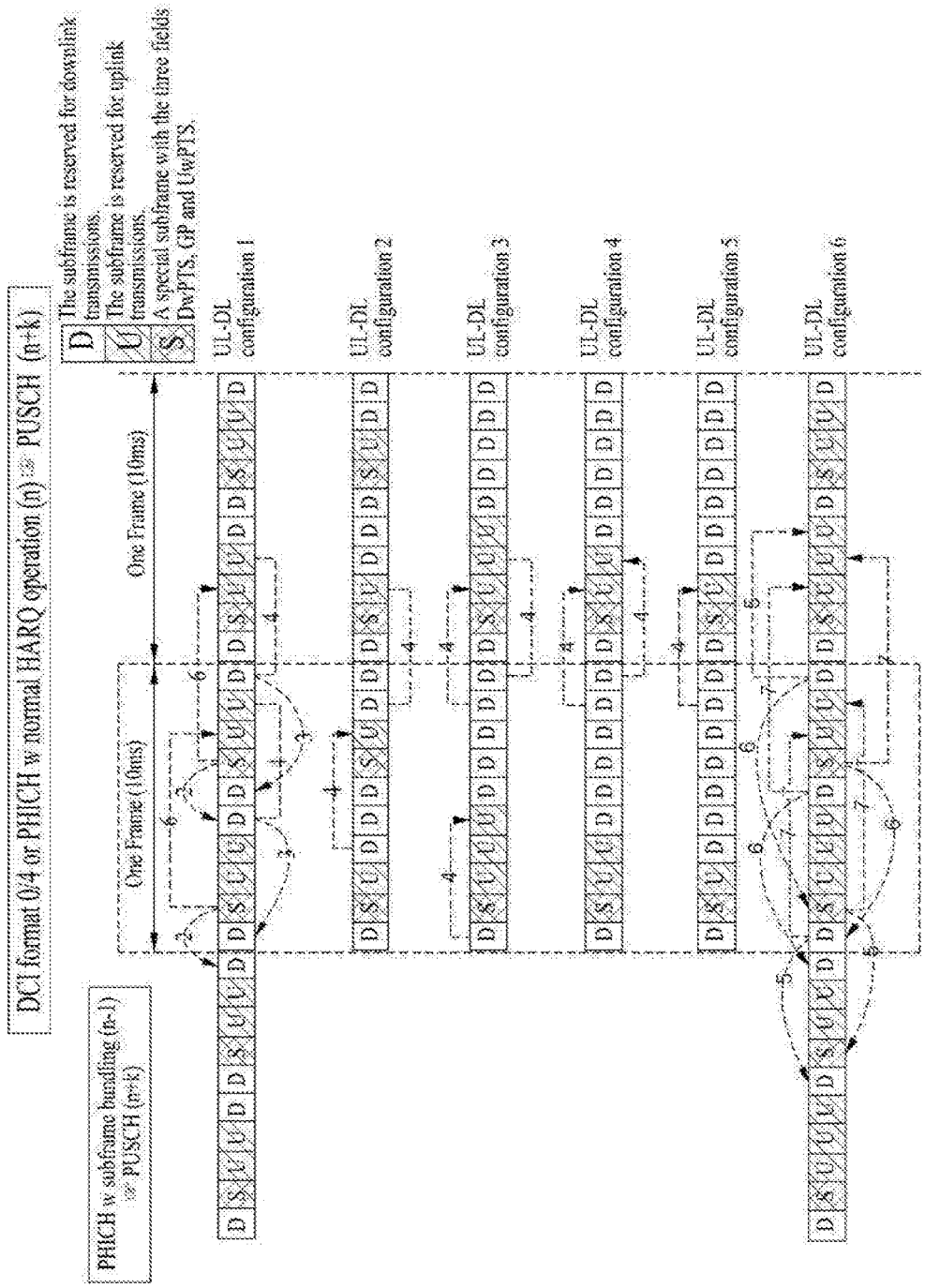
FIG. 41 illustrates an example of transmission of a PUSCH in a subframe n+k when a PHICH corresponding to the PUSCH is transmitted in a subframe n−1 using subframe bundling in TDD UL/DL configurations #1 to #6 and an example of transmission of a PUSCH in the subframe n+k when DCI format 0/4 is transmitted in the subframe n using subframe bundling.

FIG. 41 illustrates transmission of a PUSCH in subframe n+k when a PHICH using subframe bundling is transmitted in subframe n−1 in TDD UL/DL configurations #1 to #6 and transmission of a PUSCH in subframe n+k when DCI format 0/4 using subframe bundling is transmitted in subframe n.

PHICH reception time corresponding to PUSCH transmission time (n-th subframe) can be defined as follows.

That is, a HARQ-ACK response to a PUSCH in subframe n is transmitted through a PHICH in subframe n+4 in an FDD environment.

A HARQ-ACK response to a PUSCH in subframe n is transmitted through a PHICH in subframe $n+k_{PHICH}$ in a TDD environment.

Table 25 shows $k_{PHICH}$ in TDD.

TABLE 25

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Figure 42:
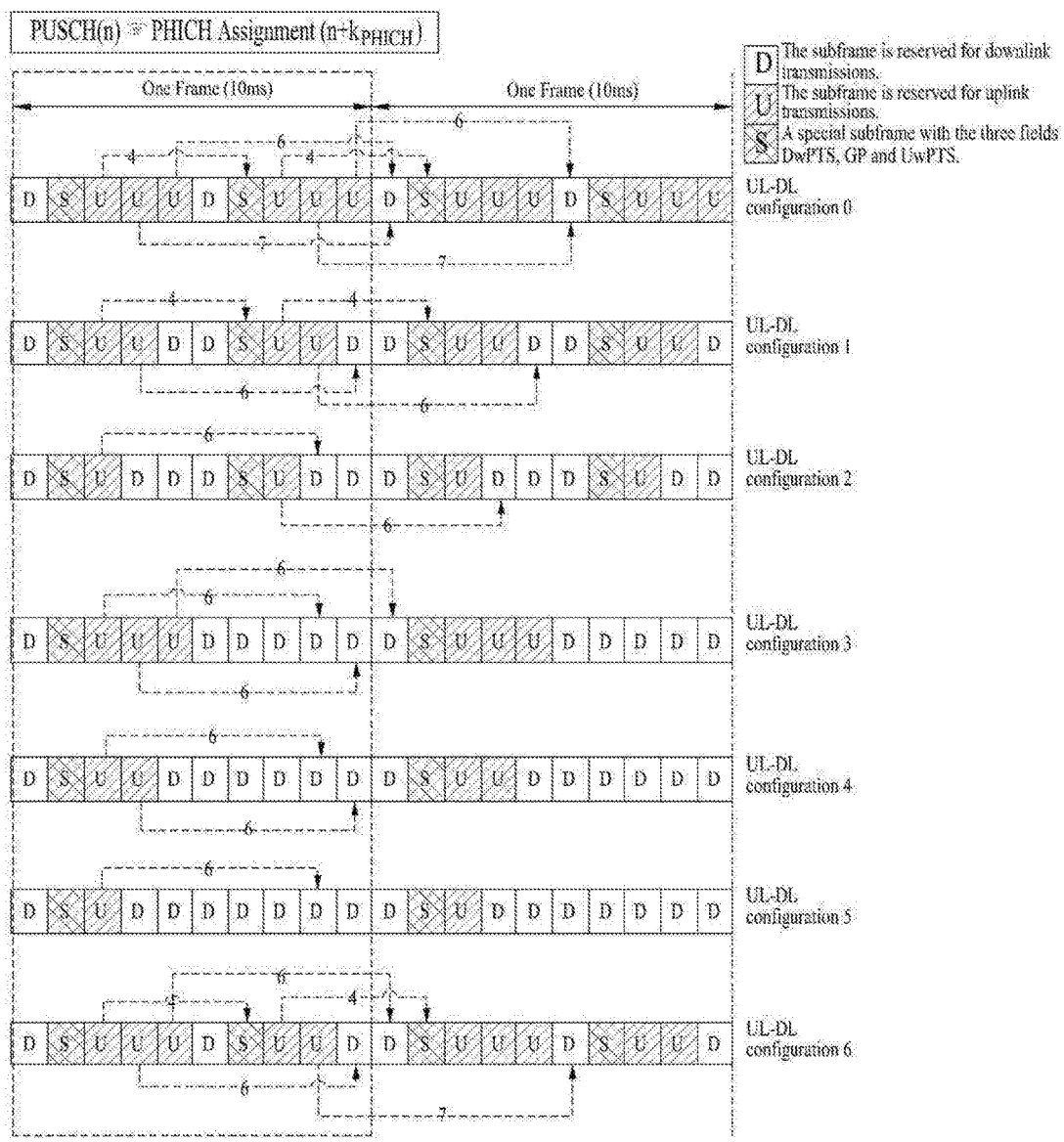
FIG. 42 illustrates an example of transmission of a HARQ-ACK response to a PUSCH in a subframe n through a PHICH in a subframe n+$k_{PHICH}$.

FIG. 42 illustrates transmission of a HARQ-ACK response to a PUSCH in subframe n through a PHICH in subframe $n+k_{PHICH}$.

PHICH reception time (n-th subframe) and PUSCH transmission time corresponding to the above response can be defined as follows.

A HARQ-ACK response to a PUSCH in subframe i−4 is received through a PHICH in subframe i in an FDD environment.

A HARQ-ACK response to a PUSCH in subframe i−k is received through a PHICH in subframe i in the case of TDD and UL/DL configurations #1 to #6.

In addition, a HARQ-ACK response to a PUSCH in subframe i−k is received through a PHICH in subframe i in the case of TDD and UL/DL configuration #0. Here, a HARQ-ACK response to a PUSCH in subframe i−k can be received through a PHICH in a resource corresponding to $I_{PHICH}=0$ in subframe i and a HARQ-ACK response to a PUSCH in subframe i−6 can be received through a PHICH in a resource corresponding to $I_{PHICH}=1$ in subframe i.

Table 26 shows k applied to TDD configurations #0 to #6.

TABLE 26

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | 7 | 4 | | | | 6 |

Figure 43:
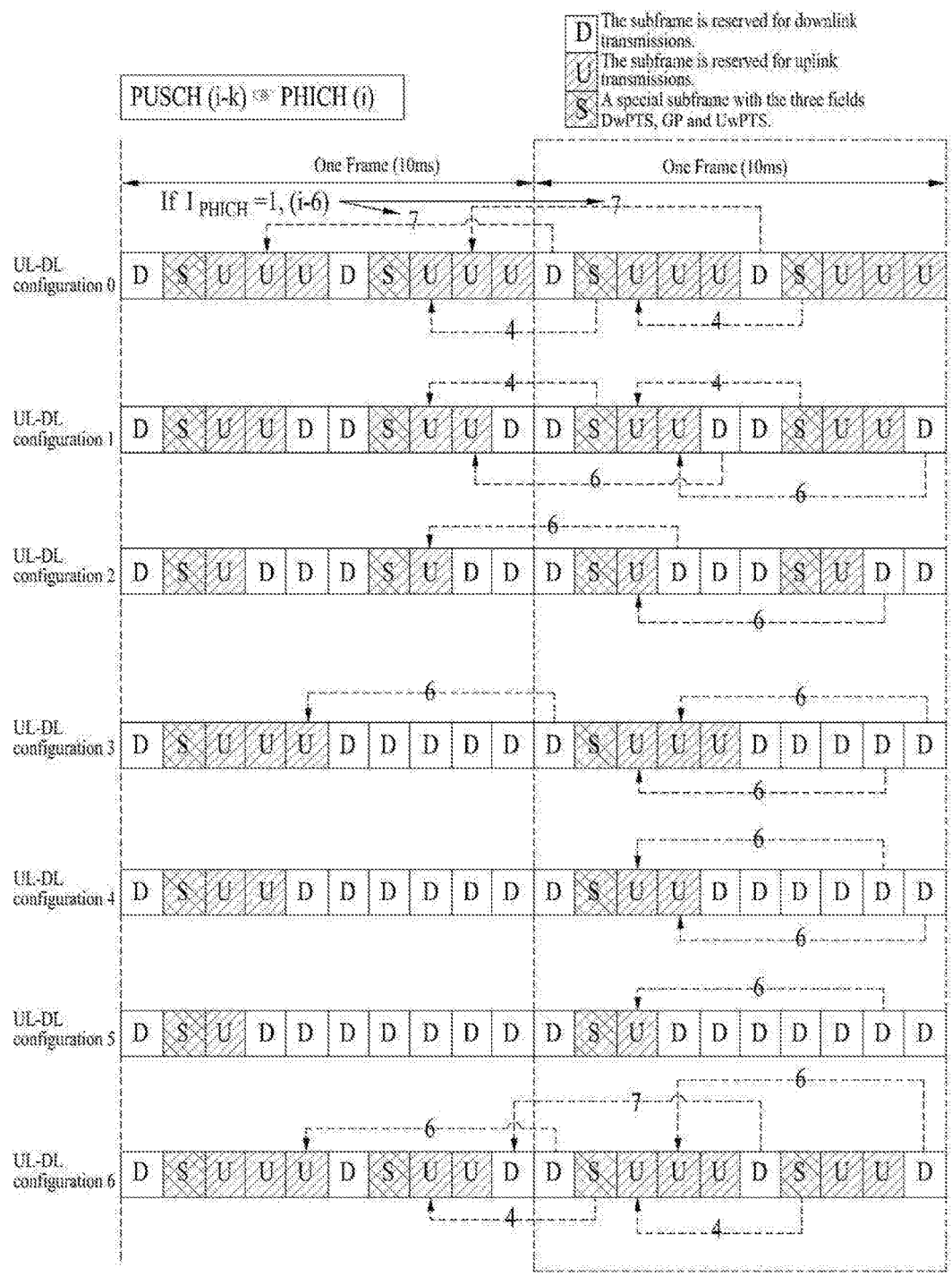
FIG. 43 illustrates an example in which a HARQ-ACK response received through a PHICH in a subframe i corresponds to a PUSCH in a subframe i−k.

FIG. 43 shows that a HARQ-ACK response received through a PHICH in subframe i corresponds to a PUSCH in subframe i−k.

A description will be given of a PDCCH structure applicable to the present invention.

A PDCCH carries a downlink control information (DCI) message. Here, the DCI message can include resource allocation information and other control information.

In general, a plurality of PDCCHs is transmitted in subframes. Each PDCCH is transmitted using one or more control channel elements (CCEs) which correspond to nine sets of four physical resource elements in resource element groups (REGs).

Four QPSK symbols are respectively mapped to REGs. REs mapped to reference symbols are not included in REGs, which means that the number of REGs corresponding to given OFDM symbols depends on whether or not cell-specific reference signals are present.

The concept of REGs is applicable to other DCI (e.g. PCFICH, PHICH, etc.).

Four PDCCH formats can be supported as shown in Table 27.

TABLE 27

| PDCCH format | Number of CCEs(n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered and used consecutively. A PDCCH with a format consisting of n CCEs may only start with a CCE with a number equal to a multiple of n in order to simplify decoding operation.

The number of CCEs used for transmission of a particular PDCCH is determined by the BS according to channel conditions.

For example, if the PDCCH is intended for a UE with a good downlink channel, one CCE is likely to be sufficient. However, for a UE with a poor downlink channel, eight CCEs may be required in order to achieve sufficient robustness. Furthermore, the power level of a PDCCH may be adjusted to match the channel conditions.

A description will be given of PDCCH transmission and blind decoding.

A set of CCE locations in which the UE may find PDCCHs thereof can be considered a search space. In LTE, the search space has a different size for each PDCCH format. A dedicated search space (or UE-specific search space) and a common search space are present. The dedicated search space is configured individually per UE and the common search space is applicable to all UEs. The dedicated search space and the common search space may overlap for a given UE.

With a small search space, the BS cannot find CCE resources to send PDCCHs to all UEs in a given subframe because information related to some allocated CCE locations is not present for a specific UE.

To solve this problem, a UE-specific hopping sequence can be applied to the starting position of the dedicated search space. The sizes of the dedicated search space and common search space are listed in Table 28.

TABLE 28

| PDCCH format | Number of CCEs(n) | Number of candidates in common search space | Number of candidates in dedicated search space |
|---|---|---|---|
| 0 | 0 | — | 6 |
| 1 | 2 | — | 6 |
| 2 | 4 | 4 | 2 |
| 3 | 8 | 2 | 2 |

In order to control the computational load generated due to the total number of blind decoding attempts, the UE is not required to simultaneously search for all DCI formats.

In general, the UE always searches for formats 0 and 1A in the dedicated search space. Formats 0 and 1A have the same size and are distinguished by a flag in a message.

The UE may be required to receive a further format (e.g. format 1, 1B or 2).

The UE may be configured to search for formats 1A and 1C in the common search space.

In addition, the UE may be configured to search for format 3 or 3A. Formats 3 and 3A which have the same size as formats 0 and 1A and may be distinguished by having CRC scrambled by a different identity.

Transmission modes for configuring the multi-antenna technique and the information content of the different DCI formats are listed below.

(1) Transmission mode 1: transmission from a single BS antenna port
(2) Transmission mode 2: transmit diversity
(3) Transmission mode 3: open-loop spatial multiplexing
(4) Transmission mode 4: closed-loop spatial multiplexing
(5) Transmission mode 5: multi-user MIMO
(6) Transmission mode 6: closed-loop rank-1 precoding
(7) Transmission mode 7: transmission using UE-specific reference signals A description will be given of configuration of information content of different DCI formats.

(1) Format 0: resource grants for PUSCH transmission
(2) Format 1: resource assignments for single codeword PDSCH transmission (transmission modes 1, 2 and 7)
(3) Format 1A: compact signaling of resource assignments for single codeword PDSCH (all modes)
(4) Format 1B: compact resource assignments for PDSCH using rank-1 closed loop precoding (mode 6)
(5) Format 1C: compact resource assignment for PDSCH (e.g. paging/broadcast system information)
(6) Format 1D: compact resource assignments for PDSCH using multi-user MIMO (mode 5)
(7) Format 2: resource assignments for PDSCH for closed-loop MIMO operation (mode 4)
(8) Format 2A: resource assignments for PDSCH for open-loop MIMO operation (mode 3)
(9) Format 3/3A: power control commands for PUCCH and PUSCH with 2-bit/1-bit power adjustment Considering the above, the UE to which carrier aggregation is not applied may be required to carry out a maximum of forty-four blind decoding operations in any subframe.

This does not include checking the same message with different CRC values, which requires only small additional computational complexity.

A description will be given of a PDCCH resource assignment procedure.

A control region can consist of a set of CCEs, numbered from 0 to $N_{CCE,k}-1$, where $N_{CCE,k}$ denotes the total number of CCEs in the control region of subframe k.

A UE needs to monitor a set of PDCCH candidates for control information in every non-DRX subframe, where monitoring can imply attempting to decode each of the PDCCHs in the set according to all monitored DCI formats.

The set of PDCCH candidates to be monitored can be defined in terms of search spaces. Here, search space $S_k^{(L)}$ at aggregation level L∈{1, 2, 4, 8} can be defined by a set of PDCCH candidates.

CCEs corresponding to PDCCH candidates m of the search space $S_k^{(L)}$ can be determined according to Equation 3.

$$L\{(Y_k+m) \bmod N_{CCE,k}/L\}+i \quad \text{[Equation 3]}$$

In Equation 3, i=0, . . . , L−1 and m=0, . . . , $M^{(L)}$−1. In addition, $M^{(L)}$ is the number of PDCCH candidates to monitor in a predetermined search space.

The UE needs to monitor a UE-specific search space at aggregation levels 1, 2, 4 and 8 and a common search space at aggregation levels 4 and 8.

The common search space and the UE-specific search space may overlap.

Aggregation levels defining search spaces are listed in Table 29. DCI formats that need to be monitored by the UE depend on the configured transmission mode.

TABLE 29

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For the common search space $Y_k$ is set to 0 for the two aggregation levels L=4 and L=8 in Expression 3. For the UE-specific search space $S_k^{(L)}$ at aggregation level L, the variable $Y_k$ is defined using Equation 4.

$$a_{k,i} = d(n), \quad n = 0, \ldots, 61 \quad \text{[Equation 4]}$$
$$k = n - 31 + \frac{N_{RB}^{DL} N_{sc}^{RB}}{2}$$

Here, $Y_{-1}=n_{RNTI}\neq 0$, A=39827, D=65537 and $n_s$ is the slot number within a radio frame.

A description will be given of heterogeneous deployments to which the present invention is applicable.

Heterogeneous networks can be implemented by placing low-power nodes throughout a macro-cell layout.

Figure 44:
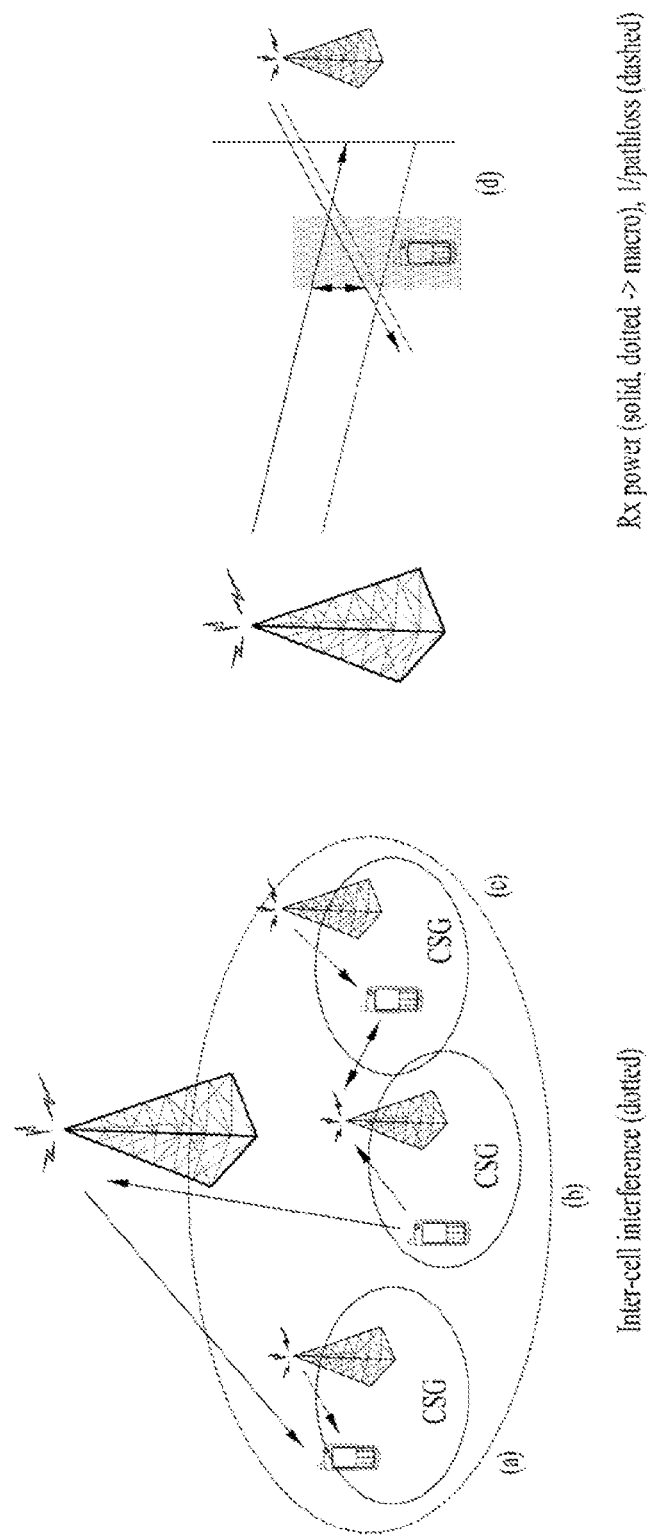
FIG. 44 illustrates interference generated in a mobile network, which is different from interference generated in a homogeneous network with respect to the present invention.

Interference characteristics in a heterogeneous deployment are significantly different from those in a homogeneous deployment. This is described with reference to FIG. 44.

Referring to FIG. 44(a), a home eNB (HeNB) may interfere with a macro UE with no access to a closed subscriber group (CGS) cell.

Referring to FIG. 44(b), a macro UE may cause severe interference towards the HeNB.

Referring to FIG. 44(c), a CGS UE may be interfered by another CSG HeNB.

Referring to FIG. 44(d), path-loss based cell association may improve the uplink at the cost of increasing downlink interference of non-macro UEs at the cell edge.

In these scenarios, preliminary results indicate that methods for handling uplink and downlink interference as well as L1/L2 control signals, synchronization signals and reference signals are important. Such methods may operate in time, frequency and/or spatial domains.

In macro-pico heterogeneous network scenarios, a macro cell can cause severe interference to UEs served by a pico cell, especially, pico UEs at the edge of the serving pico cell. With time domain ICIC, the interfering macro cell provides a subframe, a so called Almost Blank subframe (ABS or ABS), protected from the dominant interference due to the macro cell.

Figure 45:
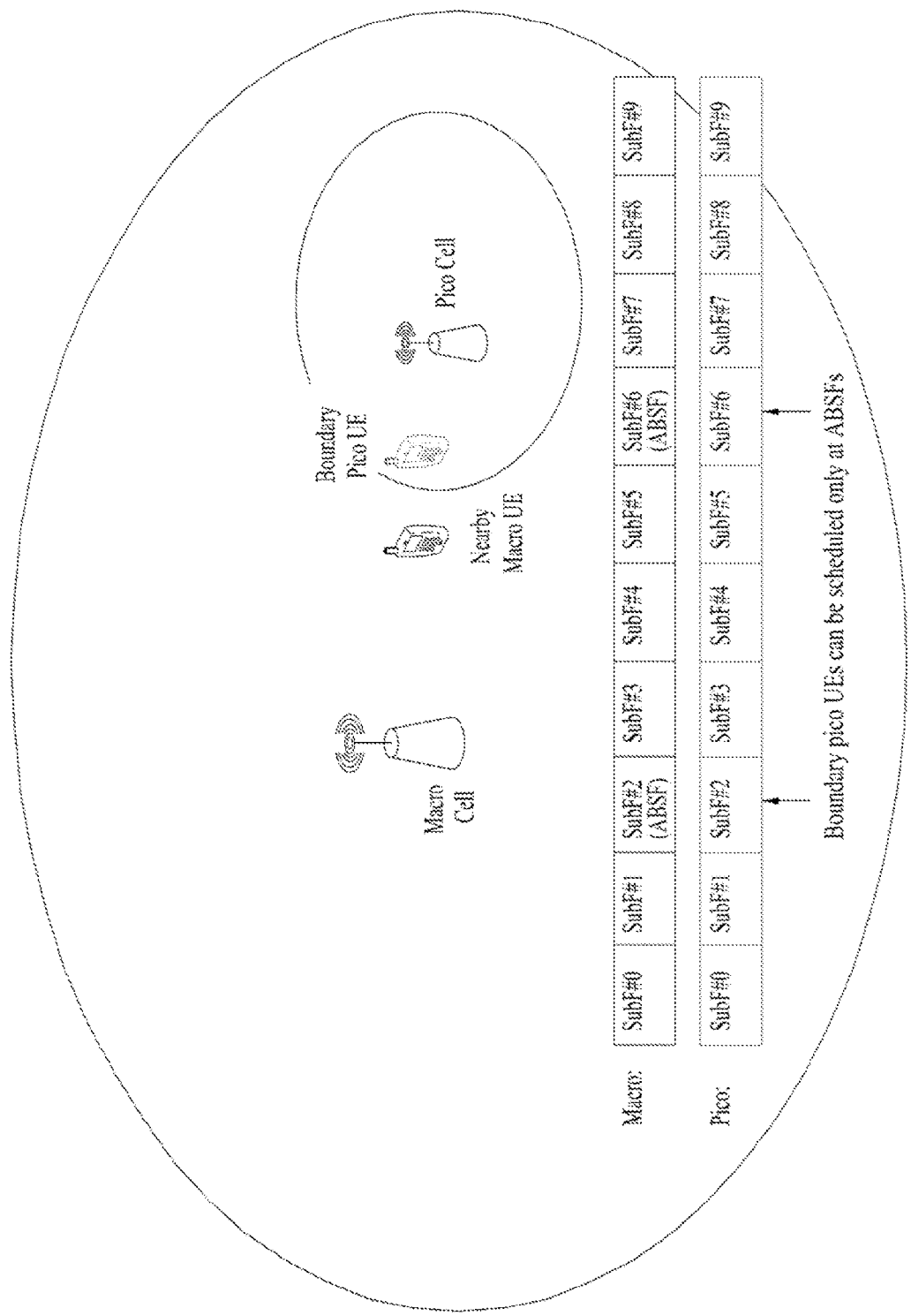
FIG. 45 illustrates an exemplary ABS configuration of a macro cell in macro-pico scenarios according to the present invention.

FIG. 45 illustrates an exemplary configuration of ABS in macro-pico scenarios.

Referring to FIG. 45, a macro cell for which subframes #2 and #6 are configured as ABSFs and information related thereto can be indicated to a pico cell via backhaul. Based on this information, the pico cell can schedule UEs corresponding thereto, especially UEs at the boundary of the macro cell and the pico cell.

If the UEs are to be scheduled only in ABSFs, CSI measurement is only performed in the ABSFs. Otherwise, two types of subframes are configured for CSI measurement such that CSI measurement can be respectively performed in the normal subframe and ABSF.

A description will be given of detailed embodiments with respect to heterogeneous networks.

CSG Scenario

Dominant interference may occur when non-member UEs are in close proximity to a CSG cell.

In this case, it may be possible to divert UEs suffering from inter-cell interference to another E-UTRA carrier or other RAT.

Time domain ICIC may be used to allow such non-member UEs to remain served by the macro cell on the same frequency layer.

Such interference may be mitigated by the CSG cell utilizing almost blank subframes to protect subframes of the corresponding macro cell from the interference.

A non-member UE may be signaled to utilize protected resources for cell measurements (RRM), radio link monitoring (RLM) and CSI measurements for the serving macro cell, allowing a UE to continue to be served by the macro cell under strong interference from the CSG cell.

Figure 46:
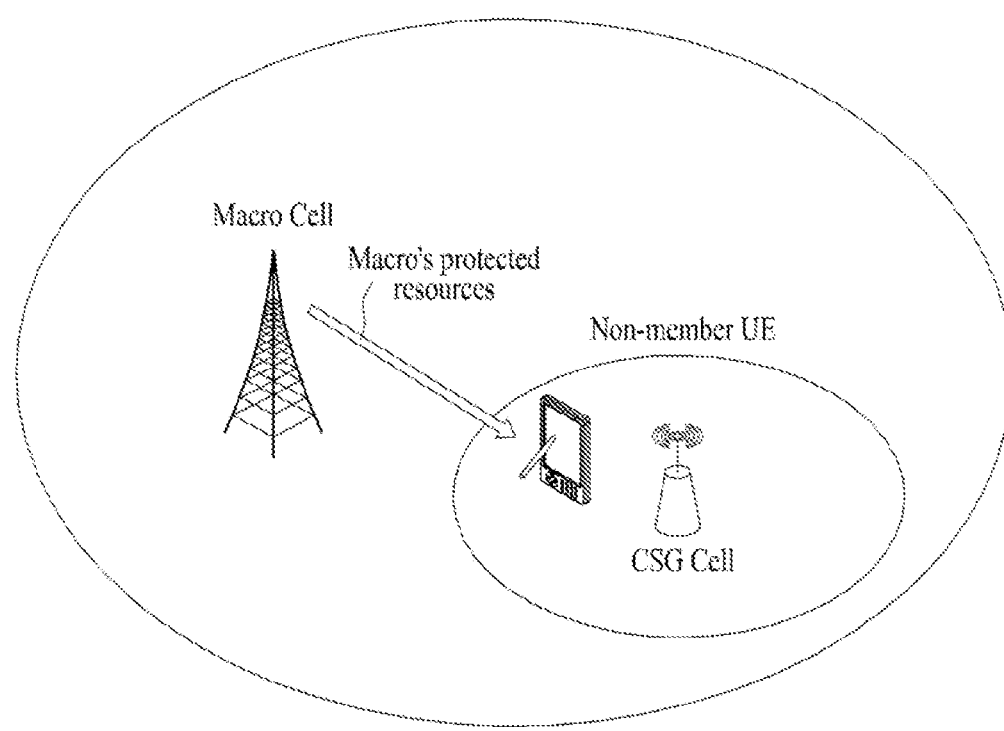
FIG. 46 illustrates an exemplary CSG scenario according to the present invention.

FIG. 46 illustrates an exemplary CSG scenario.

Pico Scenario

Time domain ICIC may be utilized for pico UEs operating at the edge of a serving pico cell (e.g. for traffic off-loading from a macro cell to a pico cell).

Time domain ICIC may be utilized to allow such UEs to remain served by the pico cell on the same frequency layer.

Such interference may be mitigated by the macro cell utilizing almost blank subframes to protect the corresponding subframes of the pico cell from the interference.

A UE served by a pico cell can use protected resources for cell measurements (RRM), radio link monitoring (RLM) and CSI measurements for the serving pico cell.

For a UE served by a pico cell, RRM/RLM/CSI measurement resource restriction may allow more accurate measurement of the pico cell under strong interference from the macro cell.

The pico cell may selectively configure the RRM/RLM/CSI measurement resource restriction only for UEs subject to strong interference from the macro cell.

In addition, for a UE served by the macro cell, the network may configure RRM measurement resource restriction for neighbour cells in order to facilitate mobility from the macro cell to the pico cell.

Figure 47:
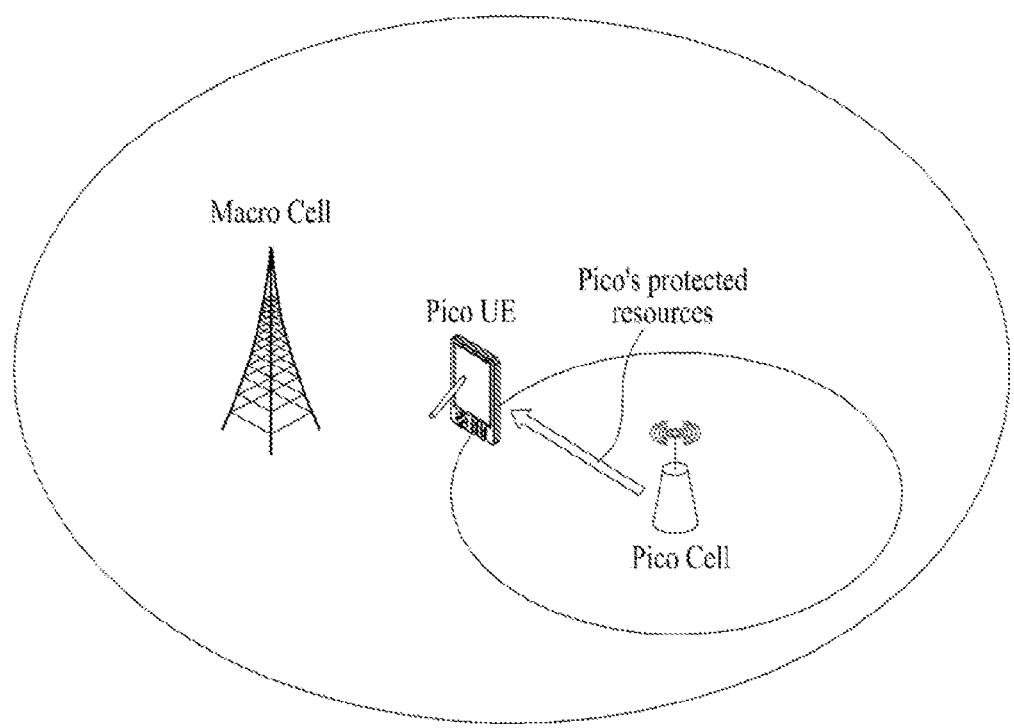
FIG. 47 illustrates an exemplary pico scenario according to the present invention.

FIG. 47 illustrates an example of the above-described pico scenario.

An IE can provide information about which subframe is configured as an almost blank subframe by a BS and transmitted and which subset of almost blank subframes is configured for measurements for a UE.

Here, almost blank subframes correspond to subframes with reduced power on some physical channels and/or reduced activity.

Table 30 shows ABS information.

| IE/Group Name | Presence | Range | IE type and reference | Semantics description |
|---|---|---|---|---|
| CHOICE ABS Information | M | | | |
| >FDD | | | | |
| >>ABS Pattern Info | M | | BIT STRING (SIZE(40)) | Each position in the bitmap represents a subframe, for which value "1" indicates 'blanked in DL' and value "0" indicates 'not blanked in DL'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . .) | P(number of antenna ports for cell - specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | | |
| >>ABS Pattern Info | M | | BIT STRING (1 . . . 70) | Each position in the bitmap represents a subframe for which value "1" indicates 'blanked in DL' and value "0" indicates 'not blanked in |

-continued

| IE/Group Name | Presence | Range | IE type and reference | Semantics description |
|---|---|---|---|---|
| | | | | DL'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . .) | P(number of antenna ports for cell- specific reference signals) defined in TS 36.211 [10] |
| >>Measurement Subset | M | | BIT STRING (1 . . . 70) | Indicates a subset of the ABS Pattern Info above, and is used to configure specific measurements towards the UE |
| >ABS Inactive | M | | NULL | Indicates that interference coordination by means of almost blank sub frames is not active |

Referring to FIG. 30, the maximum number of subframes of an ABS pattern may be 20 for UL/DL subframe configurations #1 to #5, 60 for UL/DL subframe configuration #6 or 70 for UL/DL configuration #0.

Since the duration of an LTE subframe is 1 ms, the ABS pattern is 20 ms, 60 ms or 70 ms.

That is, an ABS can have periodicity of 20 ms for UL/DL subframe configurations #1 to #5, 60 ms for UL/DL subframe configuration #6 and 70 ms for UL/DL configuration #0.

The ABS Status IE is used to aid the BS in designating ABS to evaluate the need for modification of the ABS pattern.

Information related thereto is shown in Table 31.

TABLE 31

| IE/Group Name | Presence | Range | IE type and reference | Semantics description |
|---|---|---|---|---|
| DL ABS status | M | | INTEGER (0 . . . 100) | Percentage of resource blocks of ABS allocated for UEs protected by ABS from inter-cell interference. This includes resource blocks of ABS unusable due to other reasons. The denominator of the percentage calculation is indicated in the Usable ABS Information. |
| CHOICE Usable ABS Information | M | | | |
| >FDD | | | | |
| >>Usable ABS Pattern Info | M | | BIT STRING (SIZE(40)) | Each position in the bitmap represents a subframe, for which value "1" indicates 'ABS that has been designated as protected from inter - cell |

TABLE 31-continued

| IE/Group Name | Presence | Range | IE type and reference | Semantics description |
|---|---|---|---|---|
| | | | | interference' and value "0" indicates 'ABS that is not usable as protected ABS from inter-cell interference'. The pattern represented by the bitmap is a subset of, or the same as, the corresponding ABS Pattern InfoIE conveyed in the LOAD INDICATION message. |
| >TDD | | | | |
| >> Usable ABS Pattern Info | M | | BIT STRING (1 . . . 70) | Each position in the bitmap represents a subframe, for which value "1" indicates 'ABS that has been designated as protected from inter-cell interference' and value "0" indicates 'ABS that is not usable as protected ABS from inter-cell interference'. The pattern represented by the bitmap is a subset of, or the same as, the corresponding ABS Pattern Info IE conveyed in the LOAD INDICATION message. |

When ABSs are used, it is necessary to discriminate ABSs from non-ABSs when a UE measures RSRP (reference signal received power), RSRQ (reference signal received quality), etc. and performs radio link monitoring.

That is, when ABSs are used, the UE is required to perform measurement only in specific subframe sets (e.g. ABSs or non-ABSs) rather than all subframes.

Time domain measurement resource restriction associated with ABSs is given in such a manner that an ABS pattern has 40 bits for FDD, 20 bits for TDD configurations #1 to #5, 70 bits for TDD configuration #0 and 60 bits for TDD configuration #6 and thus have periodicity of 40 ms, 20 ms, 70 ms and 60 ms.

The UE can be configured with resource-restricted CSI measurement if subframe sets $C_{CSI,0}$ and $C_{CSI,1}$ are configured by higher layers.

IE MeasSubframePattern can be used to specify time domain measurement resource restriction.

The first/leftmost bit corresponds to the subframe #0 of the radio frame satisfying SFN mod x=0 (where x is the size of the bit string devided by 10). Here, "1" represents that the corresponding subframe is used for measurement.

MeasSubframePattern information element is shown in Table 32.

TABLE 32

MeasSubframePattern information element

-- ASN1START
MeasSubframePattern-r10::= CHOICE {
    SubframePatternFDD-r10    BIT STRING (SIZE(40)),
    SubframePatternTDD-r10    CHOICE {
        SubframeConfig1-5-r10    BIT STRING (SIZE(20)),
        SubframeConfig0-r10    BIT STRING (SIZE(70)),
        SubframeConfig6-r10    BIT STRING (SIZE(60)),
    }
}
-- ASN1STOP A subframe pattern for the time domain measurement resource restriction with respect to ABS can be configured in CQI-ReportConfig from among radio resource control information elements of Table 32.

IE CQI-ReportConfig can be used to specify CQI reporting configuration. Fields added for LTE-A release 10 CQI-ReportConfig are shown in Table 33.

TABLE 33

CQI-ReportConfig-r10 ::= SEQUENCE {.1
    cqi-ReportModeA perio dic-r10    ENUMERATED {,1
        rm12, rm20, rm22, rm30, rm31,.1
        spare3, spare2, spare1}    OPTIONAL  -- Need OR.1
    nomPDSCH-RS-EPRE-Offset-r10    INTEGER (−1..6)..1
    cqi-ReportPERIODIC-R10    CQI-ReportPeriodic-r10    OPTIONAL  -- Need ON.1
    aperiodicCSI-Trig ger-10    SEQUENCE { .1
        trigger1-r10    BIT STRING (SIZE (8))..1
        trigger2-r10    BIT STRING (SIZE (8)).1
    }    OPTIONAL  -- Need ON.1
    pmi-RI-Report-r9    ENUMERATED {setup}    OPTIONAL  -- Cond PMIRI.1
    csi-SubframePatternConfig-r10    CHOICE {.1
        release    NULL..1
        setup    SEQUENCE {.1
            csi-SubframePattern-r10    SEQUENCE {.1
                csi-SubframeSet1-r10    MeasSubframePattern-r10,.1

TABLE 33-continued

|  |  |  |  |
|---|---|---|---|
| csi-SubframeSet2-r10 | MeasSubframePattern-r10,1 | | |
| },.1 | | | |
| cqi-ReportPeriodicIndex-r10 | SEQUENCE{.1 | | |
| cqi-pmi-ConfigIndex2-r10 | INTEGER (0..1023)..1 | | |
| ri-ConfigIndex2-r10 | INTEGER (0..1023) | OPTIONAL | -- Need OR.1 |
| } OPTIONAL | | | -- Cond Periodic.1 |
| },.1 | | | |
| } | | OPTIONAL | -- Need ON.1 |
| },.1 | | | |

|  |  |  |  |
|---|---|---|---|
| CQI-ReportConfigSCell-r10 ::= | SEQUENCE {.1 | | |
| cqi-ReportModeA periodic-r10 | ENUMERATED {,1 | | |
| | rm12, rm20, rm22, rm30, rm31,.1 | | |
| | spare3, spare2, spare1} OPTIONAL | | -- Need OR.1 |
| | INTEGER (−1..6)..1 | | |
| nomPDSCH-RS-EPRE-Offset-r10 | | | |
| .1 | CQI-ReportPeriodic-r10 | OPTIONAL | -- Need ON.1 |
| cqi-ReportPeriodicSCell-r10 | ENUMERATED {setup} | OPTIONAL | -- Cond PMIRI.1 |
| pmi-RI-Report-r9 | | | |
| }.1 | | | |

|  |  |  |  |
|---|---|---|---|
| CQI-ReportPeriodic-r10 ::= CHOICE {.1 | | | |
| release | NULL.1 | | |
| setup | SEQUENCE {.1 | | |
| cqi-PUCCH-Resourceindex-r10 | INTEGER (0..1184),.1 | OPTIONAL | -- Need OR.1 |
| cqi-PUCCH-ResourceindexP1-r10 | INTEGER (0..1184) | | |
| cqi-pmi-ConfigIndex-r10 | INTEGER (0..1123),.1 | | |
| cqi-FormatIndicatorPeriodic-r10 | CHOICE {.1 | | |
| widebandCQI-r10 | SEQUENCE {.1 | | |
| csi-ReportMode-r10 ENUMERATED {submode1, submode2} | | OPTIONAL | -- Need OR.1 |
| },.1 | | | |
| subbandCQI-r10 | SEQUENCE {.1 | | |
| k-r10 | INTEGER (0..4),.1 | | |
| periodicityFactor-r10 | ENUMERATED {n2, n4}.1 | | |
| }.1 | | | |
| },.1 | | | |
| ri-ConfigIndex-r10 | INTEGER (0..1123) | OPTIONAL, | -- Need OR.1 |
| simultaneousAckNackAndCQI-r10 | BOOLEAN,.1 | | |
| cqi-Mask-r9 | ENUMERATED {setup} | OPTIONAL | -- Need OR.1 |
| }.1 | | | |
| }.1 | | | |

A subframe for time domain measurement resource restriction with respect to the ABS is configured in RadioResourceConfigDedicated.

RadioResourceConfigDedicated is shown in Table 35 in detail.

Furthermore, if a predetermined subframe for restricted radio link monitoring is configured, the UE can assume that subframes other than the indicated subframe are configured as ABSs.

TABLE 34

|  |  |  |  |
|---|---|---|---|
| RadioResourceConfigDedicated ::= | SEQUENCE {.1 | | |
| srb-ToAddModList | SRB-ToAddModList | OPTIONAL, | -- Cond HO-Conn.1 |
| drb-ToAddModList | DRB-ToAddModList | OPTIONAL, | -- Cond HO-Conn.1 |
| drb-ToReleaseList | DRB-ToReleaseList | OPTIONAL, | -- Need ON.1 |
| mac-MainConfig | CHOICE {.1 | | |
| explicitValue | MAC-MainConfig,.1 | | |
| defaultValue | NULL.1 | | |
| } OPTIONAL, | | | -- Cond HO-toEUTRA2.1 |
| sps-Config | sps-Config | OPTIONAL, | -- Need On.1 |
| physicalConfigDedicated | physicalConfigDedicated | OPTIONAL, | -- Need ON .1 |
| ...,.1 | | | |
| [[ rlf-TimersAndConstants-r9 | RLF-TimersAndConstants-r9 | OPTIONAL, | -- Need ON.1 |
| ]],.1 | | | |
| [[ measSubframePattern-Serv-r10 | CHOICE {.1 | | |
| release | NULL,.1 | | |
| setup | MeasSubframePattern-r10.1 | | |
| } | | OPTIONAL, | -- Need ON.1 |
| ]].1 | | | |
| }.1 | | | |

If the subframe sets $C_{CSI,0}$ and $C_{CSI,1}$ are configured, a UE can assume that one of the subframe sets is configured as a non-ABS set and the other is configured as an ABS set.

The present invention provides a procedure and method through which a UE uses a new downlink control channel when the new downlink control channel is introduced.

In a cellular network based wireless communication system, interference between homogeneous networks or between heterogeneous networks is present and may affect not only data channels but also control channels.

In LTE/LTE-A, ABSs can be assigned to a victim cell such that the victim cell receives an interference-free signal or a signal with weak interference or orthogonal frequency regions can be allocated to UEs located at a cell edge using scheduling information of BSs in order to mitigate interference of data channels (PDSCHs).

However, control channels (e.g. PDCCH, PCFICH and PHICH) have difficulty in avoiding interference since they can be transmitted in all subframes and are assigned to the entire downlink bandwidth and transmitted. Accordingly, a technique for mitigating or avoiding interference with respect to the control channels is needed.

Figure 48:
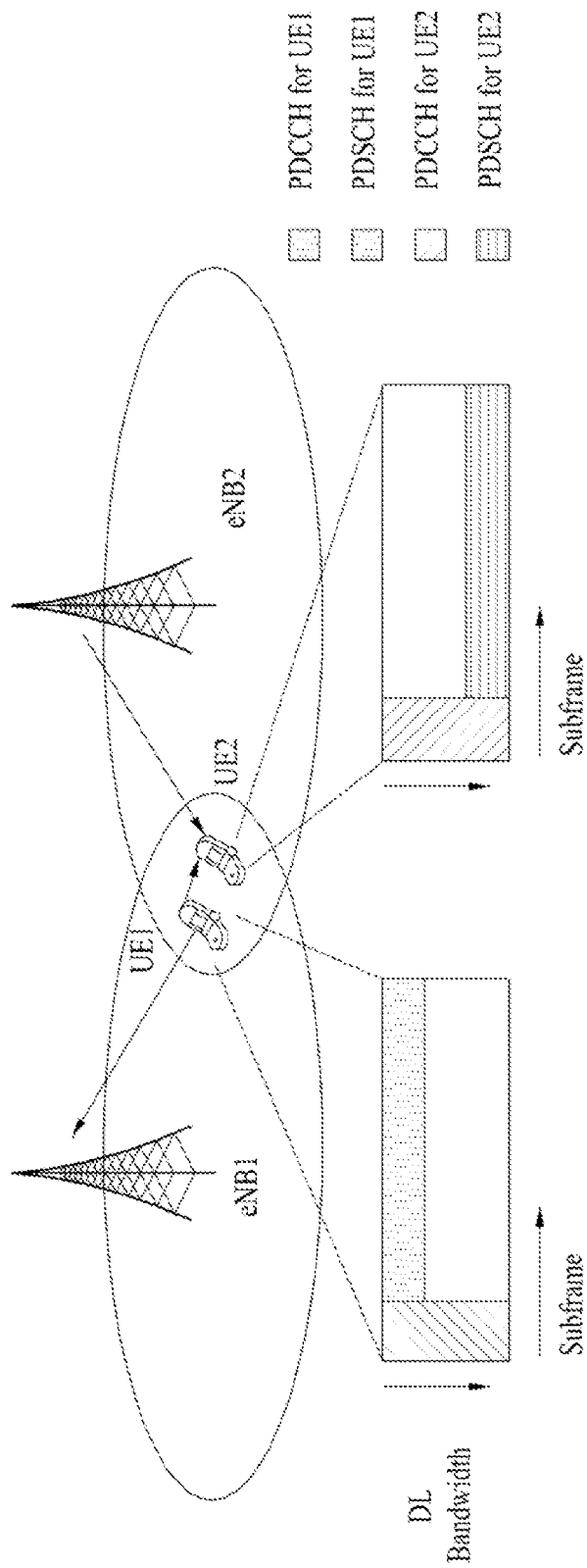
FIG. 48 illustrates a method for mitigating interference by allocating PDSCHs in orthogonal frequency regions to UEs located at a cell edge, which is used when BS s exchange scheduling information according to the present invention.

FIG. 48 illustrates a method of allocating PDSCIIs to cell edge UEs in orthogonal frequency regions to mitigate interference according to the present invention, which can be used when eNBs exchange scheduling information.

Figure 49:
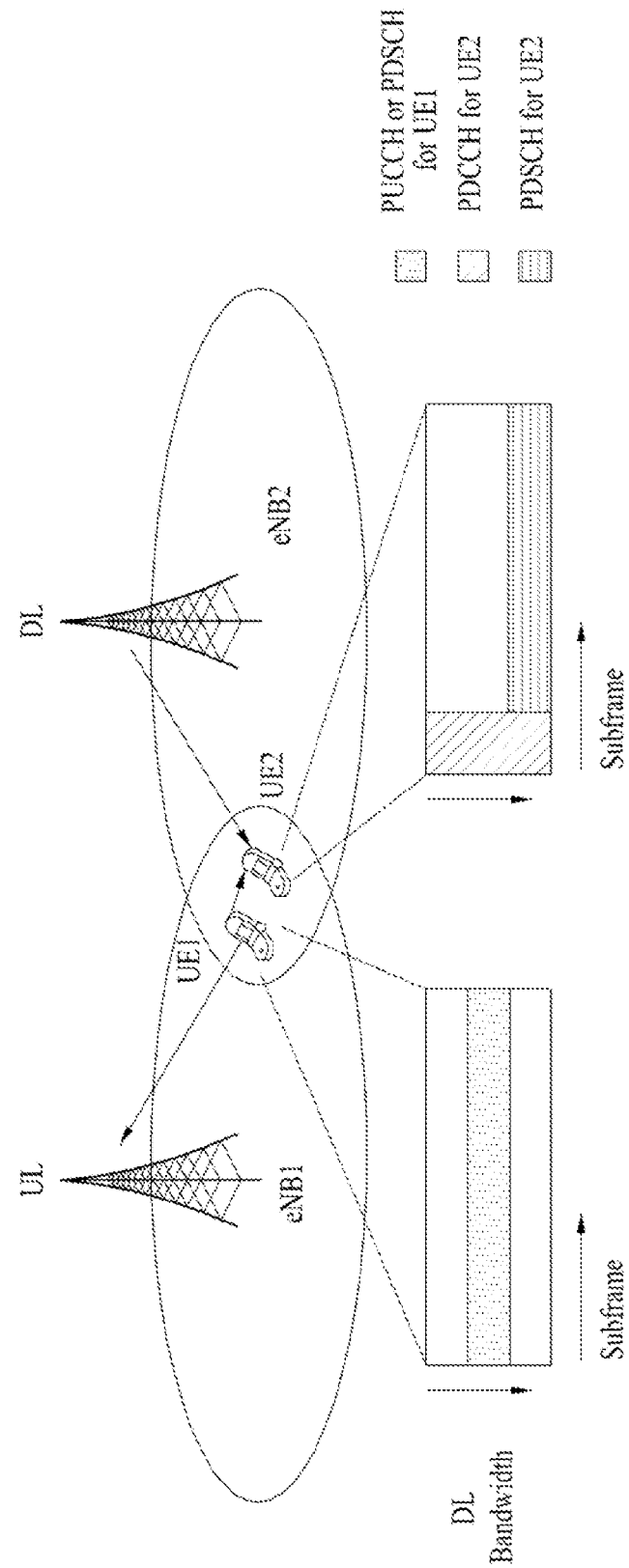
FIG. 49 illustrates influence of interference in different UL/DL configurations with respect to the present invention.

FIG. 49 illustrates influence of interference in different UL/DL configurations according to the present invention.

Referring to FIG. 48, since a PDCCH is transmitted using the entire DL bandwidth, expected interference cannot be mitigated.

In addition, new interference may be generated when BSs have different UL/DL configurations. Referring to FIG. 49, a PUCCH or a PUSCH transmitted by UE1 may act as interference on a PDCCH and PDSCH that need to be received by UE2.

Here, if scheduling information is exchanged between the eNBs, the interference acting on the PDSCII can be avoided by allocating the UEs to orthogonal frequency regions.

However, the PDCCH transmitted using the entire DL bandwidth is affected by the PUCCH or PUSCH transmitted from UE1.

Accordingly, in order to reduce the influence of the interference, introduction of an advanced or enhanced PDCCH (ePDCCH) distinguished from the PDCCH is discussed.

The ePDCCH may be used not only to mitigate interference but also to introduce new technology.

For example, the ePDCCH can be introduced to effectively support CoMP (coordinated multipoint transmission).

The present invention relates to a communication procedure of a UE with respect to the ePDCCH when the ePDCCH is introduced.

The ePDCCH can be configured such that the ePDCCH and the existing PDCCH region do not overlap.

FIGS. 50 to 57 illustrate subframes configured such that ePDCCHs and the existing PDCCH region do not overlap.

The ePDCCHs may be configured after OFDM symbols constituting the PDCCH.

Here, OFDM symbols constituting the PDCCII and OFDM symbols constituting the ePDCCHs may be consecutively configured or the number of starting OFDM symbols of the ePDCCHs may be indicated through additional signaling (according to RRC or PDCCH) irrespective of the order of OFDM symbols.

In this case, one or more OFDMA symbols may be present between the PDCCH region and ePDCCH region in the time domain.

While the PDCCH region and ePDCCH region are consecutively present in the following description, the present invention is not limited thereto.

Figure 50:
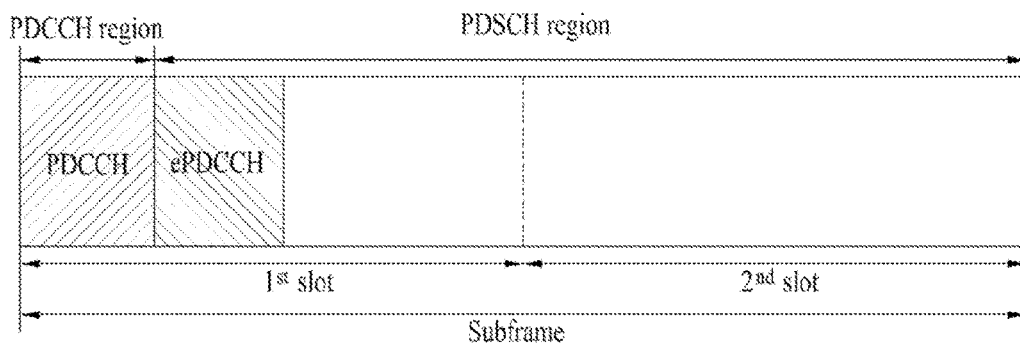
FIG. 50 illustrates an ePDCCH in the time domain according to the present invention.

FIG. 50 illustrates the ePDCCH in the time domain according to the present invention.

Referring to FIG. 50, as many preceding OFDM symbols as the number indicated by a PCFICH in a subframe can be used as a PDCCH.

As many consecutive OFDM symbols as the number indicated by RRC or PDCCH can be used as an ePDCCH.

Figure 51:
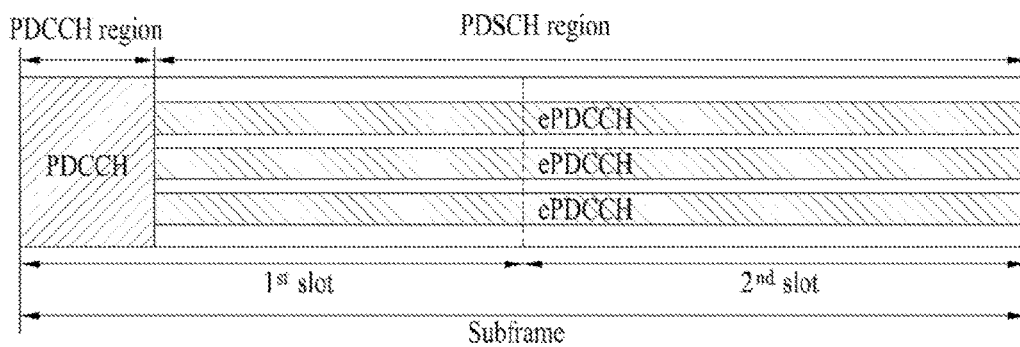
FIG. 51 illustrates a configuration of an ePDCCH occupying a subframe according to the present invention.

FIG. 51 illustrates a configuration of ePDCCHs occupying a subframe according to the present invention.

Referring to FIG. 51, as many preceding OFDM symbols as the number indicated by a PCFICH in the subframe can be used as a PDCCH.

The remaining OFDM symbols in the subframe can be used as ePDCCHs.

Here, frequency regions of the ePDCCH may be indicated by RRC or PDCCH.

Figure 52:
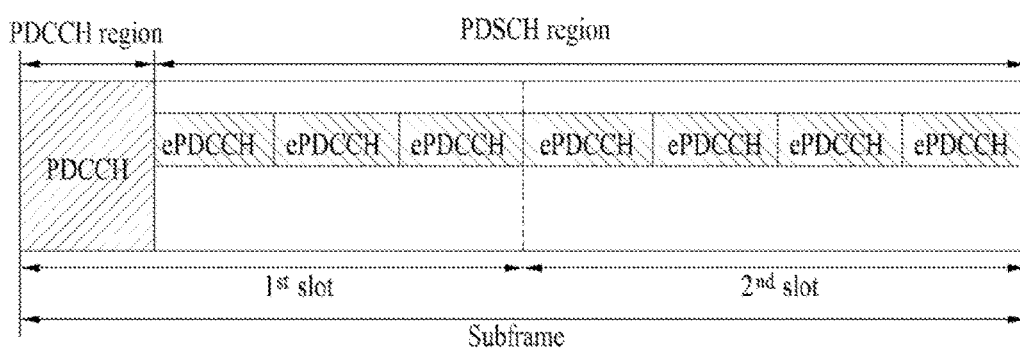
FIG. 52 illustrates a configuration of a TDM ePDCCH occupying a subframe according to the present invention.

FIG. 52 illustrates an ePDCCH configuration in TDM within a subframe.

Referring to FIG. 52, as many preceding OFDM symbols as the number indicated by a PCFICH in the subframe can be used as a PDCCH.

The remaining OFDM symbols in the subframe can be used as ePDCCHs.

In addition, ePDCCHs for respective UEs may be time-division-multiplexed as shown in FIG. 52. Here, frequency regions of the ePDCCHs can be indicated by RRC or PDCCH.

Figure 53:
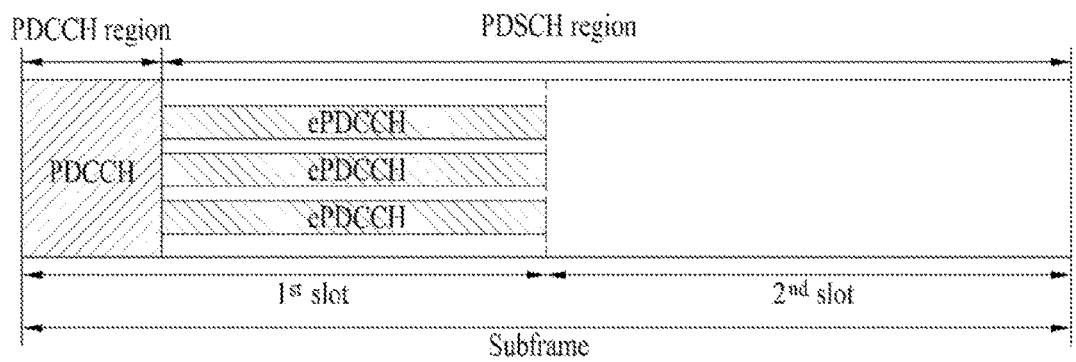
FIG. 53 illustrates a configuration of an ePDCCH occupying a first slot according to the present invention.

FIG. 53 illustrates an ePDCCH configuration in the first slot of a subframe according to the present invention.

Referring to FIG. 53, as many preceding OFDM symbols as the number indicated by a PCFICH in the subframe can be used as a PDCCH.

The remaining OFDM symbols in the first slot of the subframe can be used as ePDCCHs. Here, frequency regions of the ePDCCHs can be indicated by RRC or PDCCII.

Figure 54:
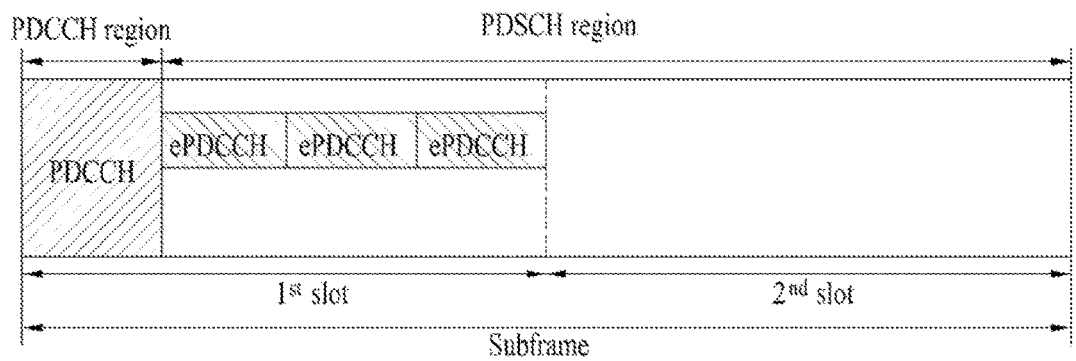
FIG. 54 illustrates a configuration of a TDM ePDCCH occupying a first slot according to the present invention.

FIG. 54 illustrates an ePDCCH configuration in TDM within the first slot of a subframe according to the present invention.

Referring to FIG. 54, as many preceding OFDM symbols as the number indicated by a PCFICH in the subframe can be used as a PDCCH.

The remaining OFDM symbols in the first slot of the subframe can be used as ePDCCHs.

In addition, ePDCCIIs for respective UEs may be time-division-multiplexed as shown in FIG. 54.

Here, frequency regions of the ePDCCHs can be indicated by RRC or PDCCH.

According to an embodiment of the present invention, various methods can be used to signal the time or frequency region of the ePDCCH to a UE.

The methods for signaling the time or frequency region of the ePDCCH to the UE will now be described. However, the following description is exemplary and the present invention is not limited thereto.

The UE can be informed of the time or frequency region of the ePDCCH through RRC signaling (or configuration).

The UE can be informed of the time or frequency region of the ePDCCH using a specific format or specific field of a predetermined PDCCH through RRC signaling (or configuration).

When an eNB indicates the frequency region of the ePDCCH, the following methods can be used.

Indices of PRBs (or VRBs) corresponding to the ePDCCH from among all PRBs (or VRBs) can be indicated.

The lowest PRB (or VRB) index used for the ePDCCH from among all PRB (or VRB) indices can be indicated. Here, the UE can be aware of positions of PRBs (or VRBs) used for the ePDCCH according to a predetermined rule (e.g. consecutive VRBs, etc.). Otherwise, the eNB may indicate information about the number of PRBs (or VRBs) to be used.

Alternatively, PRBs (or VRBs) used for the ePDCCH are indicated through a bitmap of all PRBs (or VRBs). For example, bits of the PRBs (or VRBs) can be used in such a manner that each bit indicates whether or not each PRB (or VRB) is used for the ePDCCH as 0 (indicating that the corresponding PRB is not used for the ePDCCH or 1 (indicating that the corresponding PRB is used for the ePDCCH).

Mapping of a sequence to resource elements depends on frame structure.

The UE cannot assume that the primary synchronization signal is transmitted through the same antenna port as a predetermined downlink reference signals.

In addition, the UE cannot assume that any transmission instance of the primary synchronization signal is transmitted through the same antenna port or ports, or used for any other transmission instance of the primary synchronization signal.

Sequence d(n) can be mapped to resource elements according to Equation 5.

$$a_{k,l} = d(n), \quad n = 0, \ldots, 61$$
$$k = n - 31 + \frac{N_{RB}^{DL} N_{sc}^{RB}}{2}$$
[Equation 5]

For frame structure type 1, the primary synchronization signal needs to be mapped to the last OFDM symbol in slots 0 and 10.

For frame structure type 2, the primary synchronization signal needs to be mapped to the third OFDM symbol in slots 1 and 6.

Resource elements (k,l) in OFDM symbols used for transmission of the primary synchronization signal can be determined according to Equation 6. The resource elements are reserved and not used for transmission of the primary synchronization signal.

$$k = n - 31 + \frac{N_{RB}^{DL} N_{sc}^{RB}}{2}$$
$$n = -5, -4, \ldots, -1, 62, 63, \ldots, 66$$
[Equation 6]

In a subframe for frame structure type 1 and in a half-frame for frame structure type 2, the same antenna port as for the primary synchronization signal cannot be used for the secondary synchronization signal.

The sequence d(n) can be mapped to resource elements according to Equation 7.

$$a_{k,l} = d(n), \quad n = 0, \ldots, 61$$
$$k = n - 31 + \frac{N_{RB}^{DL} N_{sc}^{RB}}{2}$$
$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$
[Equation 7]

The resource elements are determined according to Equation 8. The resource elements are reserved and not used for transmission of the secondary synchronization signal.

$$k = n - 31 + \frac{N_{RB}^{DL} N_{sc}^{RB}}{2}$$
$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$
$$n = -5, -4, \ldots, -1, 62, 63, \ldots, 66$$
[Equation 8]

The block of complex-valued symbols $Y^{(p)}(0), \ldots, y^{(p)}(M_{symb}-1)$ for each antenna port is transmitted through 4 consecutive radio frames starting in each radio frame satisfying $n_f \mod 4 = 0$ and mapped in a sequence starting with y(0) corresponding to resource elements.

Mapping to resource elements which are not reserved for transmission of reference signals increases in order of index k, then the index in slot 1 in subframe 0 and finally the radio frame number. The resource-element indices are determined according to Equation 9.

$$k = \frac{N_{RB}^{DL} N_{sc}^{RB}}{2} - 36 + k', \quad k' = 0, 1, \ldots, 71$$
$$l = 0, 1, \ldots, 3$$
[Equation 9]

Here, resource elements reserved for reference signals need to be excluded.

The mapping operation needs to assume cell-specific reference signals for antenna ports 0-3 being present irrespective of the actual configuration.

Furthermore, though the UE needs to assume the resource elements reserved for reference signals in the mapping operation, resources that are not used for transmission of reference signals are not available for PDSCH transmission.

The UE may not make any other assumptions about the resource elements.

Figure 55:
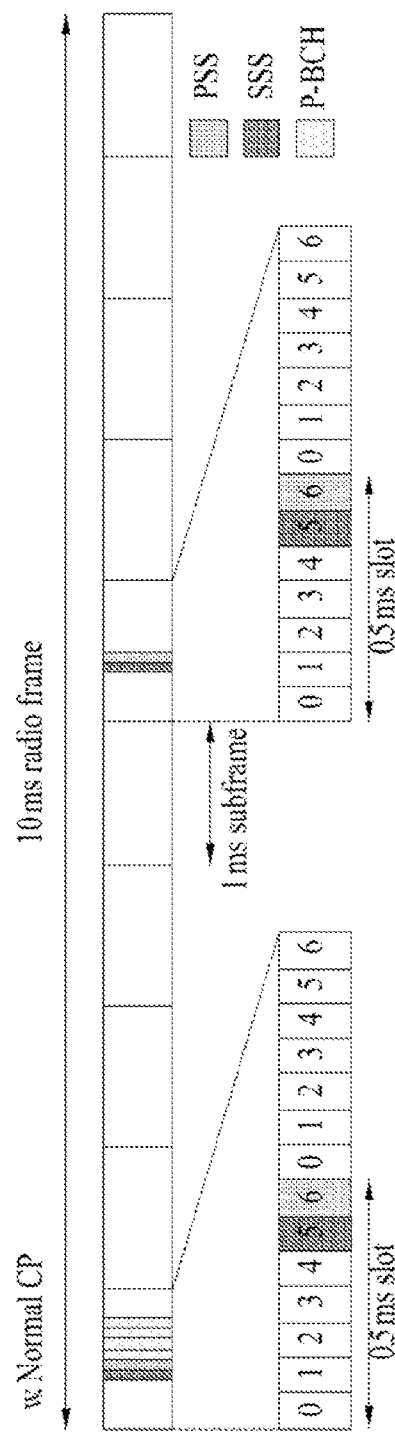
FIG. 55 illustrates temporal positions of a PSS, SSS and PBCH in frame structure type 1 according to the present invention.
Figure 56:
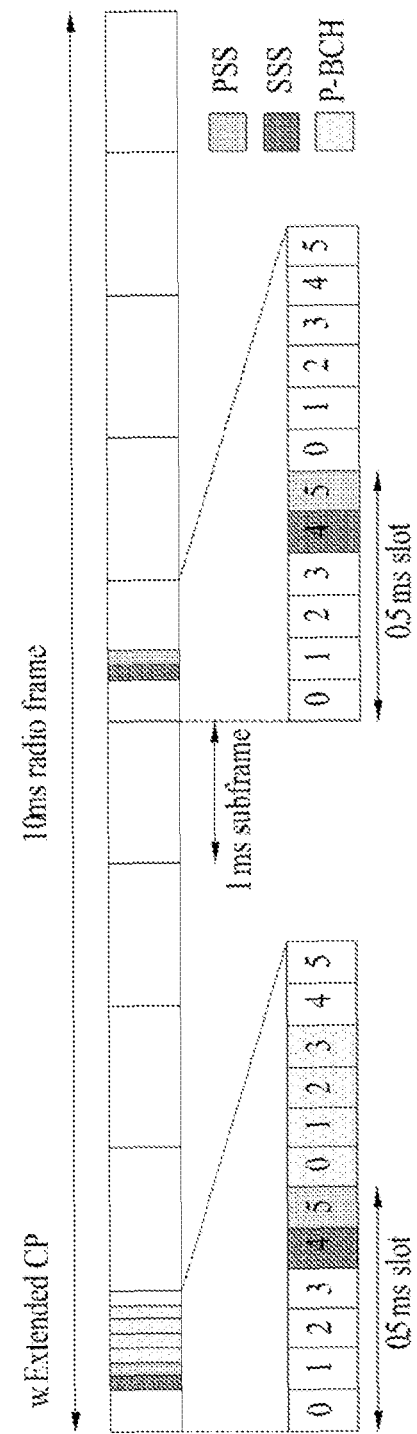
FIG. 56 illustrates temporal positions of a PSS, SSS and PBCH in frame structure type 1 according to the present invention.

FIGS. 55 and 56 illustrate temporal positions of a PSS, SSS and PBCH in frame structure type 1 according to the present invention.

Figure 57:
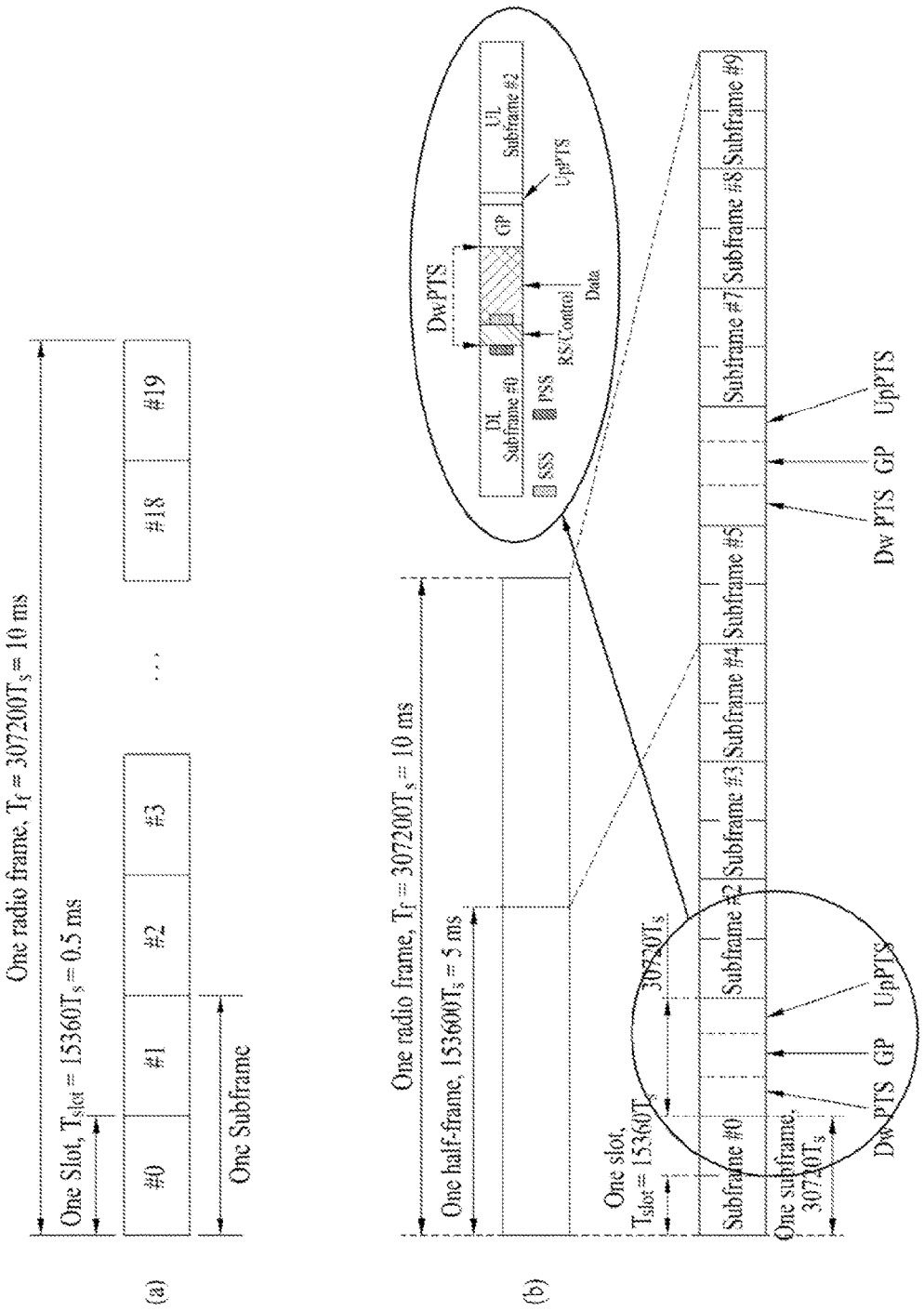
FIG. 57 illustrates temporal positions of a PSS, SSS and PBCH in frame structure type 2 according to the present invention.

FIG. 57 illustrates temporal positions of a PSS and SSS in frame structure type 2 according to the present invention.

A PDCCH of LTE release 8/9 uses only as many preceding OFDMA symbols as the number indicated by a PCFICH in a subframe.

Here, transmission of a specific control signal, such as a synchronization signal (SS) or PBCH, does not collide with the position of a preceding PDCCH in the subframe.

As described above, the SS is transmitted only through symbols #5 and #6 (in the case of normal CP) or symbols #4 and #5 (in the case of extended CP) of slot 0 of a specific FDD subframe. In TDD, the SS is transmitted through the last symbol of a specific subframe and the third symbol of a special subframe. The PBCH is transmitted only through OFDMA symbols #0 to #3 of slot 1 of subframe #0.

However, if PDSCH transmission and special subframe transmission overlap in the frequency domain, the UE assumes that PDSCH transmission is not performed.

The UE may not be expected to receive PDSCH resource blocks transmitted through antenna port 5, 7, or 8 in two PRBs to which a pair of VRBs is mapped if either one of the two PRBs overlaps in frequency with transmission of a PBCH or primary or secondary synchronization signal in the same subframe.

The UE may monitor PDCCHs in the corresponding subframe in order to receive a PDCCH indicating SPS activation or release, DCI format 3/3A in a PDCCH for power control, etc. even though PDSCH transmission in the corresponding time/frequency region is not expected.

The ePDCCH is present after a PDCCH in the time domain (when the ePDCCH occupies the entire region (other than the PDCCH) of a slot or subframe, particularly) and may collide with transmission of a special control signal such as the SS or PBCH in the frequency region within the subframe.

In this case, the UE is not expected to receive the ePDCCH in the frequency region within the subframe in order to reduce the number of unnecessary ePDCCH blind decoding operations or prevent misdetection of information.

That is, the UE is not expected to receive ePDCCH resources in two RPBs to which a pair of VRBs is mapped if either one of the two PRBs overlaps in frequency with transmission of either PBCH or a primary or secondary synchronization signal in the same subframe.

Through this UE operation, the eNB can easily signal the time and/or frequency regions corresponding to the ePDCCH to the UE irrespective of presence or absence of a special control signal and the UE can reduce the number of unnecessary blind decoding operations.

As described above, the UE may not be expected to receive the ePDCCH in a subframe set to an ABS in order to reduce the number of unnecessary blind decoding attempts of the UE and prevent misdetection of information.

Embodiments of the present invention will now be described.

First, a case in which subframe set $C_{CSI,0}$ is used as an ABS is described.

A UE can be configured with resource-restricted CSI measurements if subframe sets $C_{CSI,0}$ and $C_{CSI,1}$ are configured by higher layers.

Within subframe set $C_{CSI,0}$ the UE is not expected to receive ePDCCH resource blocks associated with a subframe that overlaps with transmission of either PBCH or a primary or secondary synchronization signal in the same subframe.

That is, when subframe set $C_{CSI,0}$ is used as an ABS, the UE is not expected to receive an ePDCCH in subframe set $C_{CSI,0}$.

A case in which subframe set $C_{CSI,1}$ is used as an ABS will now be described.

The UE can be configured with resource-restricted CSI measurements if subframe sets $C_{CSI,0}$ and $C_{CSI,1}$ are configured by higher layers.

Within subframe set $C_{CSI,1}$, the UE is not expected to receive ePDCCH resource blocks associated with a subframe that overlaps with transmission of either PBCH or a primary or secondary synchronization signal in the same subframe.

That is, when subframe set $C_{CSI,1}$ is used as an ABS, the UE is not expected to receive an ePDCCH in subframe set $C_{CSI,1}$.

A case in which subframe set $C_{CSI,0}$ or $C_{CSI,1}$ is used as an ABS will now be described.

The UE can be configured with resource-restricted CSI measurements if subframe sets $C_{CSI,0}$ and $C_{CSI,1}$ are configured by higher layers.

Within subframe set $C_{CSI,1}$, the UE is not expected to receive ePDCCH resource blocks associated with a subframe that overlaps with transmission of either PBCH or primary or secondary synchronization signal in the same subframe.

The UE can be configured with resource-restricted CSI measurements if subframe sets $C_{CSI,0}$ and $C_{CSI,1}$ are configured by higher layers.

If a PDCCH is detected in a subframe set between $C_{CSI,0}$ and $C_{CSI,1}$, the UE can recognize that one subframe set is for non-ABSs and the other subframe set is for ABSs.

Within an ABS subframe set, the UE is not expected to receive ePDCCII resource blocks associated with a subframe that overlaps with transmission of either PBCH or primary or secondary synchronization signal in the same subframe.

That is, the UE can assume that the subframe set $C_{CSI,0}$ or $C_{CSI,1}$ in which the PDCCH is detected is a subframe set for non-ABSs and the other subframe set is a subframe for ABSs.

The UE is not expected to receive ePDCCHs in subframes corresponding to an ABS set.

If higher-layer signaling indicates predetermined subframes for restricted radio link monitoring, the UE is not expected to receive ePDCCH resource blocks associated with a subframe that overlaps with transmission of either PBCH or primary or secondary synchronization signal in the same subframe.

That is, when subframes for restricted radio link monitoring are signaled and/or configured, the UE is not expected to receive an ePDCCH when the SS or PBCH is transmitted in subframes other than the subframes.

The ABS is supported by LTE-A release-10 UEs and UEs following the same. Accordingly, LTE-A release-10 UEs supporting the ABS may not be expected to receive a PDCCH in subframes set to the ABS.

A case in which subframe set $C_{CSI,0}$ is used as an ABS will now be described.

The UE can be configured with resource-restricted CSI measurements if subframe sets $C_{CSI,0}$ and $C_{CSI,1}$ are configured by higher layers.

Within subframe set $C_{CSI,0}$ the UE is not expected to receive PDCCH resource blocks associated with a subframe that overlaps with transmission of either PBCH or a primary or secondary synchronization signal in the same subframe.

That is, when subframe set $C_{CSI,0}$ is used as an ABS, the UE is not expected to receive a PDCCH in subframe set $C_{CSI,0}$.

A case in which subframe set $C_{CSI,1}$ is used as an ABS will now be described.

The UE can be configured with resource-restricted CSI measurements if subframe sets $C_{CSI,0}$ and $C_{CSI,1}$ are configured by higher layers.

Within subframe sets $C_{CSI,1}$ the UE is not expected to receive PDCCH resource blocks associated with a subframe that overlaps with transmission of either PBCH or a primary or secondary synchronization signal in the same subframe.

That is, when subframe set $C_{CSI,1}$ is used as an ABS, the UE is not expected to receive a PDCCH in subframe set $C_{CSI,0}$.

When higher layer signaling is for predetermined restricted radio link monitoring, the UE is not expected to receive PDCCH resource blocks associated with a subframe that overlaps with transmission of either PBCH or a primary or secondary synchronization signal in the same subframe.

That is, when subframes for restricted radio link monitoring are signaled and/or configured, the UE is not expected to receive a PDCCII when the SS or PBCII is transmitted in subframes other than the subframes.

The above-described embodiments of the present invention may be applied to both the ePDCCH and PDCCH such that the UE is not expected to receive the ePDCCH and PDCCH.

In addition, the ABS is only supported by UEs that support LTE-A release 10 and up, and thus the above-described configuration may be set such that the legacy LTE release-8/9 UE procedure is not changed.

The UE may not be expected to receive an ePDCCH in subframes set for paging in order to reduce the number of unnecessary blind decoding attempts of the UE and prevent misdetection of information as described above.

Specifically, the UE can be configured with resource-restricted CSI measurements if subframe sets $C_{CSI,0}$ and $C_{CSI,1}$ are configured by higher layers.

Within subframe set $C_{CSI,1}$, the UE is not expected to receive PDCCH resource blocks associated with a subframe that overlaps with transmission of either PBCH or a primary or secondary synchronization signal in the same subframe.

That is, when $C_{CSI,1}$ is used as an ABS, the UE is not expected to receive an ePDCCH in subframe set $C_{CSI,1}$.

That is, the UE is not expected to receive an ePDCCH in a paging subframe.

Methods of configuring, allocating and indicating a paging subframe can be implemented as follows.

The purpose of a paging procedure is to transmit paging information to a UE in RRC_IDLE mode, to inform UEs in RRC_IDLE state and UEs in RRC_CONNECTED state about system information variation, to transmit an ETWS primary notification and/or ETWS secondary notification and/or to transmit inform about a CMAS notification.

The UE may use discontinuous reception (DRX) in the idle mode in order to reduce power consumption.

One paging occasion (PO) is a subframe where there may be P-RNTI transmitted on PDCCH addressing the paging message.

One paging frame (PF) is one radio frame, which may contain one or multiple paging occasions.

When DRX is used, the UE needs to monitor one PO per DRX cycle.

PF and PO are determined by the following equation using DRX parameters provided through system information.

PF is determined by Equation 10.

$$SFN \bmod T = (T \operatorname{div} N)*(UE\_ID \bmod N) \qquad \text{[Equation 10]}$$

Index i_s pointing to PO from a subframe pattern can be determined by Equation 11.

$$i\_s = \text{floor}(UE\_ID/N) \bmod Ns \qquad \text{[Equation 11]}$$

System Information DRX parameters stored in the UE can be updated locally in the UE whenever DRX parameter values are changed in the system information.

If the UE has no IMSI, the UE can use as default identity UE_ID=0 and i_s as represented by Equations 10 and 11.

The following parameters can be used for calculation of the PF and i_s.

T denotes DRX cycle of the UE. T can be determined by the shortest of the UE specific DRX values and, if allocated by upper layers, a default DRX value may broadcast through the system information.

In addition, nB may be 4T, 2T, T, T/2, T/4, T/8, T/16, T/32
N may be min(T,nB)
Ns may be max(1,nB/T)
UE_ID may be IMSI mod 1024.
Here, IMSI is given as a sequence of digits of type Integer (0 . . . 9).

For example, IMSI can be represented as Equation 12.

$$IMSI = 12(\text{digit1}=1, \text{digit2}=2) \qquad \text{[Equation 12]}$$

Table 35 shows subframe patterns in FDD in association with the paging procedure.

TABLE 35

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Table 36 shows TDD subframe patterns in all UL/DL configurations in association with the paging procedure.

TABLE 36

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In applications of the present invention, UEs supporting LTE-A release 10 or more can be replaced by UEs supporting carrier aggregation.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'access point (AP)', etc. The term 'UE' may be replaced with the term 'terminal', 'mobile station (MS)', 'mobile subscriber station (MSS)', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and device for transmitting information in a wireless communication system according to the present invention are applied to 3GPP LTE in the above description, the present invention is applicable to various wireless communication systems in addition to the 3GPP LTE system.

The invention claimed is:

1. A method of receiving a downlink control channel by a user equipment (UE) in a wireless communication system, the method comprising:
   receiving, from a base station (BS) via radio resource (RRC) signaling, enhanced physical downlink control channel (ePDCCH) frequency resource configuration; and
   performing blind decoding for receiving the ePDCCH based on the ePDCCH frequency configuration,
   wherein the ePDCCH frequency resource configuration includes first information indicating a number of resource blocks (RBs) for the ePDCCH and second information indicating a RB index for the ePDCCH, and
   wherein when at least part of the RBs for the ePDCCH overlaps in frequency with a transmission of a predetermined signal in a same subframe, blind decoding for a corresponding ePDCCH is not performed in the same subframe.

2. The method of claim 1, wherein the predetermined signal is a broadcast signal having a fixed location in the same subframe.

3. The method of claim 1, wherein the predetermined signal comprises at least one of a physical broadcast channel (PBCH), a primary synchronization signal (PSS), or a second synchronization signal (SSS).

4. The method of claim 1, wherein blind decoding for a PDCCH other than the ePDCCH is performed in the same subframe in which the at least part of the RBs for the ePDCCH overlaps in frequency with the transmission of either the PBCH, the PSS, or the SSS.

5. The method of claim 1, further comprising:
   receiving, from the BS via RRC signaling, ePDCCH time resource configuration including a subframe pattern indicating whether a corresponding subframe is capable of carrying the ePDCCH or not.

6. The method of claim 1, wherein the blind decoding for receiving the ePDCCH performed in subframes capable of carrying the ePDCCH.

7. The method of claim 1, wherein:
   when a start orthogonal frequency division multiplexing (OFDM) symbol information is configured via RRC signaling, the ePDCCH starts from a OFDM symbol indicated by the start OFDM symbol information, and
   when the start OFDM symbol information is not configured via RRC signaling, the ePDCCH starts from a OFDM symbol determined by a physical control format indicator channel (PCFICH).

8. A non-transitory computer readable medium recorded thereon a program for executing the method of claim 1.

9. A method of transmitting a downlink control channel by a base station (BS) in a wireless communication system, the method comprising:
   transmitting, to a user equipment (UE) via radio resource (RRC) signaling, enhanced physical downlink control channel (ePDCCH) frequency resource configuration; and
   transmitting, to the UE, the ePDCCH based on the ePDCCH frequency configuration,
   wherein the ePDCCH frequency resource configuration includes first information indicating a number of resource blocks (RBs) for the ePDCCH and second information indicating a RB index for the ePDCCH, and
   wherein when at least part of the RBs for the ePDCCH overlaps in frequency with a transmission of a predetermined signal in a same subframe, a corresponding ePDCCH is not transmitted in the same subframe.

10. The method of claim 9, wherein the predetermined signal is a broadcast signal having a fixed location in the same subframe.

11. The method of claim 9, wherein the predetermined signal comprises at least one of a physical broadcast channel (PBCH), a primary synchronization signal (PSS), or a second synchronization signal (SSS).

12. The method of claim 9, wherein blind decoding for a PDCCH other than the ePDCCH is performed in the same subframe in which the at least part of the RBs for the ePDCCH overlaps in frequency with the transmission of either the PBCH, the PSS, or the SSS.

13. The method of claim 9, further comprising:
   transmitting, to the UE via RRC signaling, ePDCCH time resource configuration including a subframe pattern indicating whether a corresponding subframe is capable of carrying the ePDCCH or not.

14. The method of claim 9, wherein:
   when a start orthogonal frequency division multiplexing (OFDM) symbol information is configured via RRC signaling, the ePDCCH starts from a OFDM symbol indicated by the start OFDM symbol information, and
   when the start OFDM symbol information is not configured via RRC signaling, the ePDCCH starts from a OFDM symbol determined by a physical control format indicator channel (PCFICH).

15. A non-transitory computer readable medium recorded thereon a program for executing the method of claim 9.

16. A user equipment (UE) comprising:
   a receiver configured to receive, from a base station (BS) via radio resource (RRC) signaling, enhanced physical downlink control channel (ePDCCH) frequency resource configuration; and a processor configured to perform blind decoding for receiving the ePDCCH based on the ePDCCH frequency configuration, wherein the ePDCCH frequency resource configuration includes first information indicating a number of resource blocks (RBs) for the ePDCCH and second information indicating a RB index for the ePDCCH, and wherein when at least part of the RBs for the ePDCCH overlaps in frequency with a transmission of a predetermined signal in a same subframe, blind decoding for a corresponding ePDCCH is not performed in the same subframe.

17. A base station (BS) comprising:

a transmitter configured to transmit, to a user equipment (UE) via radio resource (RRC) signaling, enhanced physical downlink control channel (ePDCCH) frequency resource configuration, and to transmit, to the UE, the ePDCCH based on the ePDCCH frequency configuration; and a processor configured to control the transmitter, wherein the ePDCCH frequency resource configuration includes first information indicating a number of resource blocks (RBs) for the ePDCCH and second information indicating a RB index for the ePDCCH, and wherein when at least part of the RBs for the ePDCCH overlaps in frequency with a transmission of a predetermined signal in a same subframe, a corresponding ePDCCH is not transmitted in the same subframe.

* * * * *